United States Patent
Cao

(10) Patent No.: US 7,551,173 B2
(45) Date of Patent: Jun. 23, 2009

(54) PIXEL ACCURATE EDGES FOR SCANLINE RENDERING SYSTEM

(75) Inventor: Cuong Hung Robert Cao, Panania (AU)

(73) Assignee: Canon Kabushiki Kaisha, Tokyo (JP)

(*) Notice: Subject to any disclaimer, the term of this patent is extended or adjusted under 35 U.S.C. 154(b) by 578 days.

(21) Appl. No.: 10/994,367

(22) Filed: Nov. 23, 2004

(65) Prior Publication Data

US 2005/0116955 A1   Jun. 2, 2005

(30) Foreign Application Priority Data

Nov. 25, 2003   (AU) ............................... 2003906520

(51) Int. Cl.
*G06T 11/20*   (2006.01)
(52) U.S. Cl. .................... 345/441; 345/442; 345/443; 345/613; 345/642; 382/199; 382/202; 382/266
(58) Field of Classification Search ................ 345/441, 345/442, 443, 642
See application file for complete search history.

(56) References Cited

U.S. PATENT DOCUMENTS

| | | | | |
|---|---|---|---|---|
| 4,951,230 A * | 8/1990 | Dalrymple et al. | .......... | 345/573 |
| 5,278,949 A * | 1/1994 | Thayer | .......... | 345/426 |
| 5,625,768 A * | 4/1997 | Dye | .......... | 345/441 |
| 6,876,366 B2 * | 4/2005 | Chen | .......... | 345/613 |
| 6,882,342 B2 | 4/2005 | Suzuki et al. | .......... | 345/422 |
| 6,882,444 B1 * | 4/2005 | Nishi | .......... | 358/1.9 |
| 7,161,597 B2 * | 1/2007 | Cao | .......... | 345/441 |

OTHER PUBLICATIONS

Pineda, "A Parallel Algorithm for Polygon Rasterization", ACM, 1988, pp. 17-20.*
Foley et al. "Computer Graphics: Principles and Practice" Addison-Wesley; 2nd edition (Jun. 15, 1990). pp. 72-79.*
Porter, T. et al., "Compositing Digital Images," Computer Graphics, vol. 18, No. 3 (1984) pp. 253-259.

* cited by examiner

*Primary Examiner*—Antonio A Caschera
(74) *Attorney, Agent, or Firm*—Fitzpatrick, Cella, Harper & Scinto

(57) ABSTRACT

A method (2500) of converting a monotonic curve into edge information is disclosed. A method (2800A) of determining an integer edge crossing value, Xi, for a new edge crossed by a scanline (i.e., an inactive edge being crossed by the scanline for the first time) is also disclosed. Further, a method (2800B) of determining an integer edge crossing value, Xi, for an active edge crossed by a scanline, is also disclosed. The disclosed methods have general application in the representation of monotonic curves. The described methods allow monotonic curves to be accurately represented in terms of edges where the original curve can be reconstructed from the edges. Furthermore, the methods allow edge tracking to be performed such that any resulting error is restricted to a fixed-point division error. At transition points between adjoining segments, an original edge crossing point may be determined to avoid accumulated error.

9 Claims, 38 Drawing Sheets

| Edge 84 | Edge 92 |
|---|---|
| X=10 | X=40 |
| NY = 70 | NY = 70 |
| DX = 1 | DX = 0 |
| DDX = 0 | DDX = 0 |
| P = 1 | P = 0 |
| u = (−1) | u = (+1) |
| Addr = Irrelevant in this example | Addr = Irrelevant in this example |

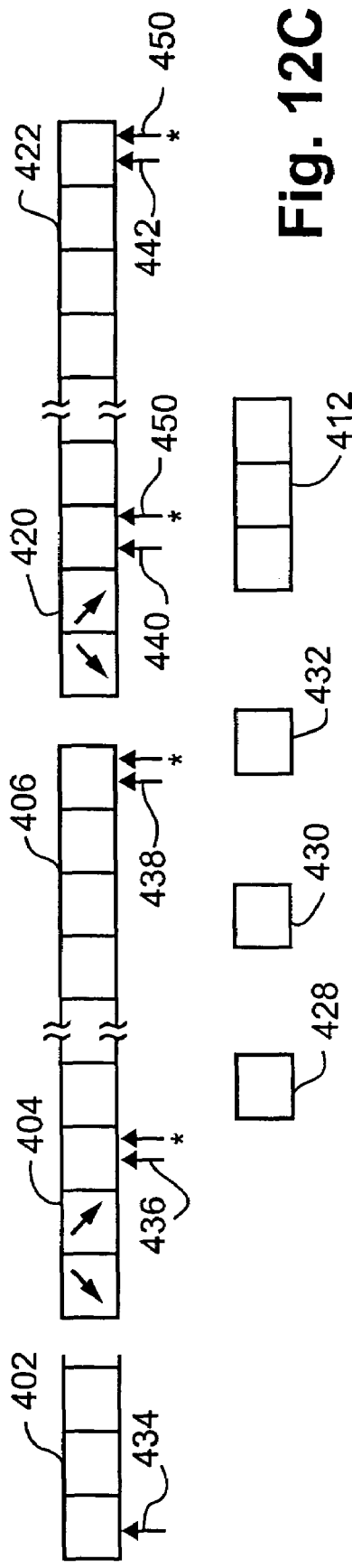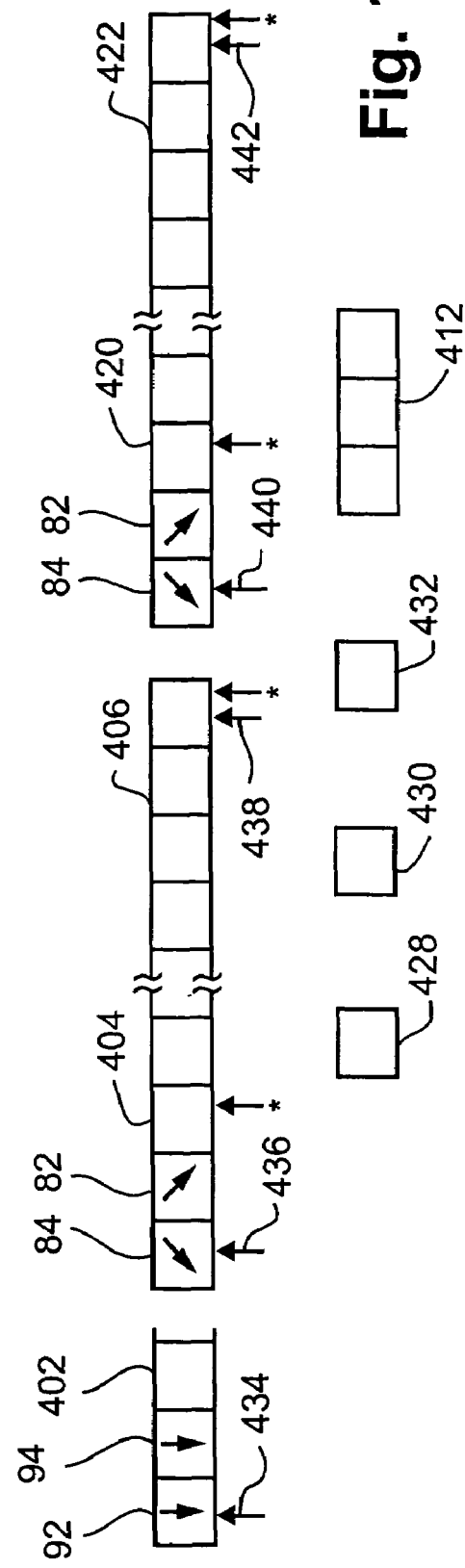

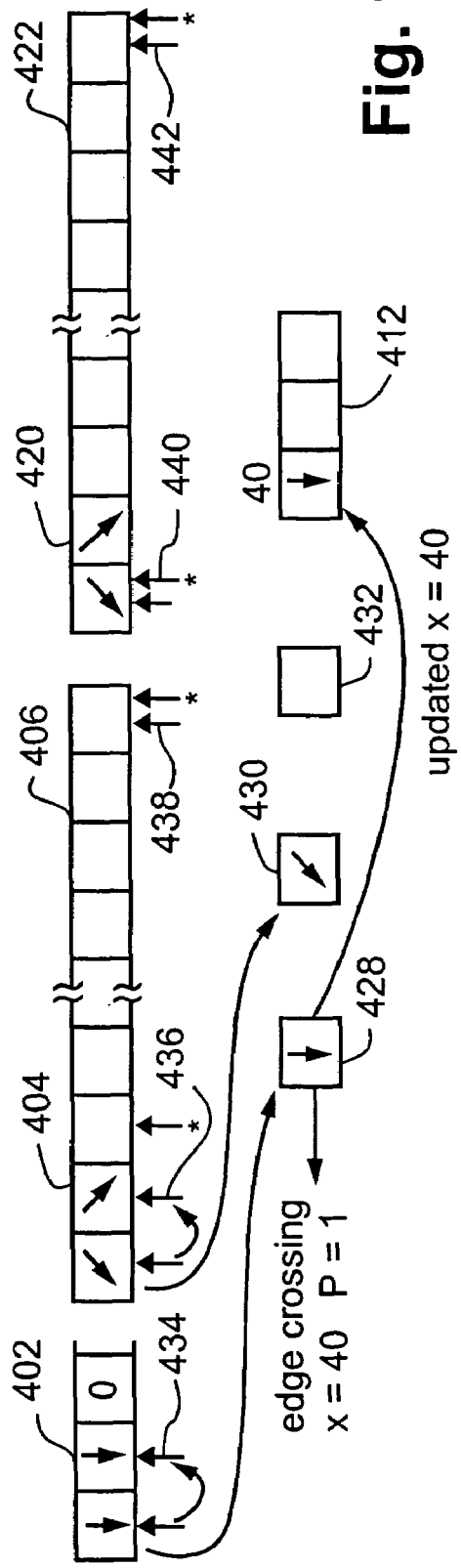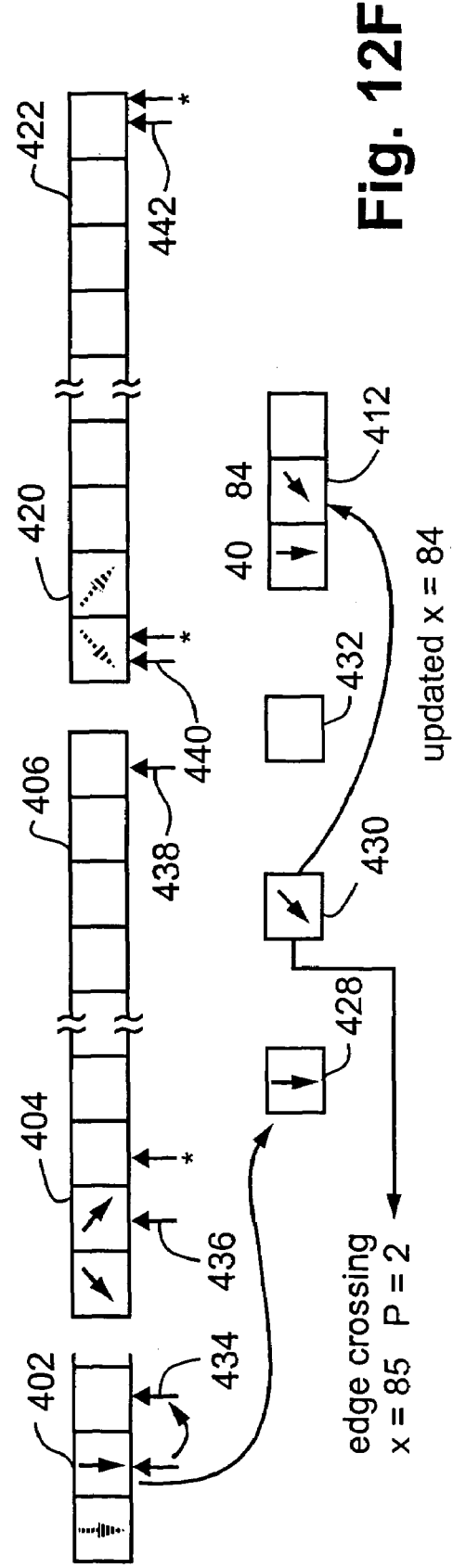

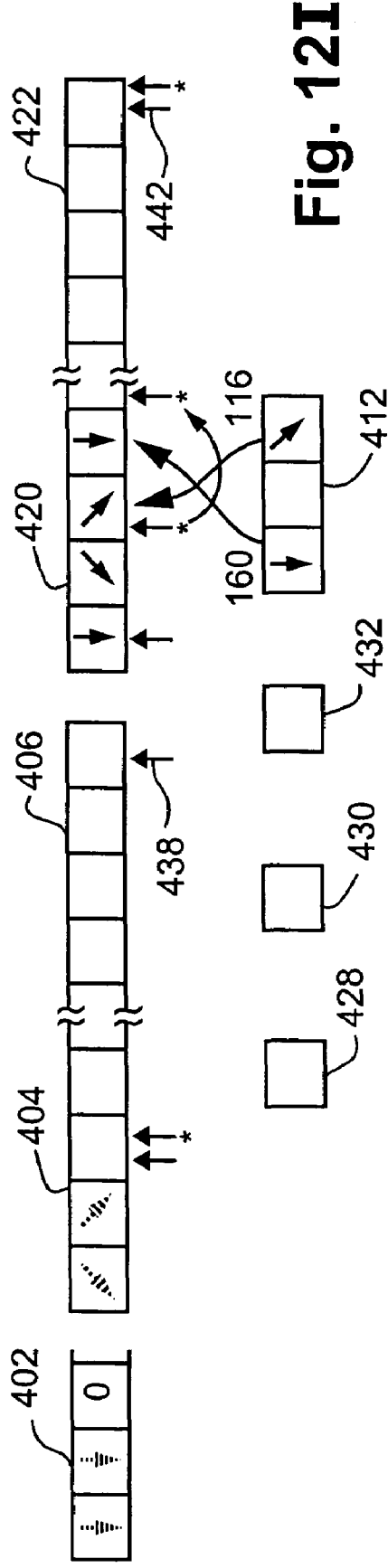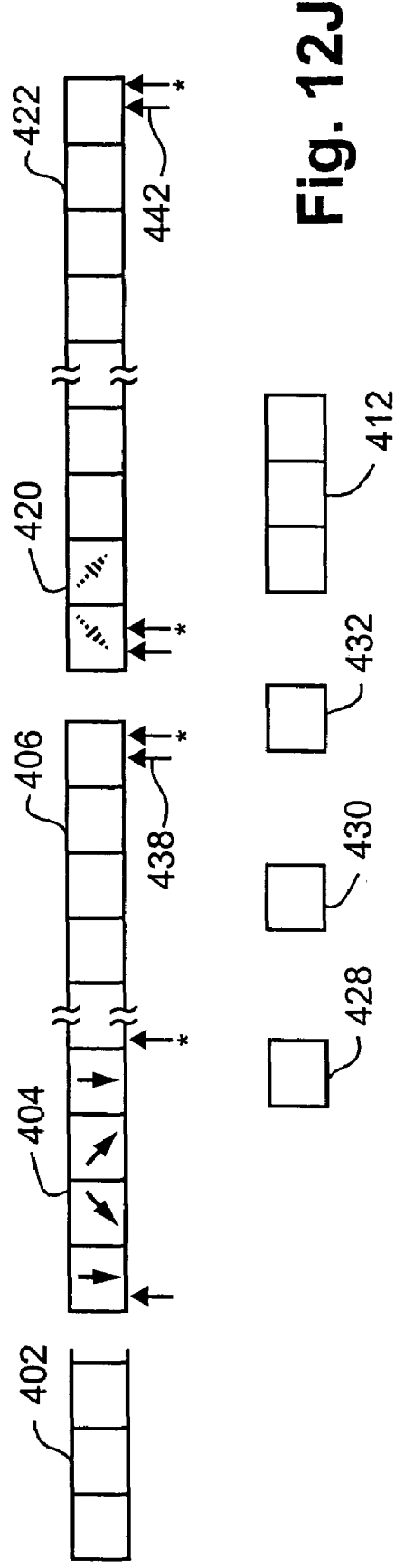

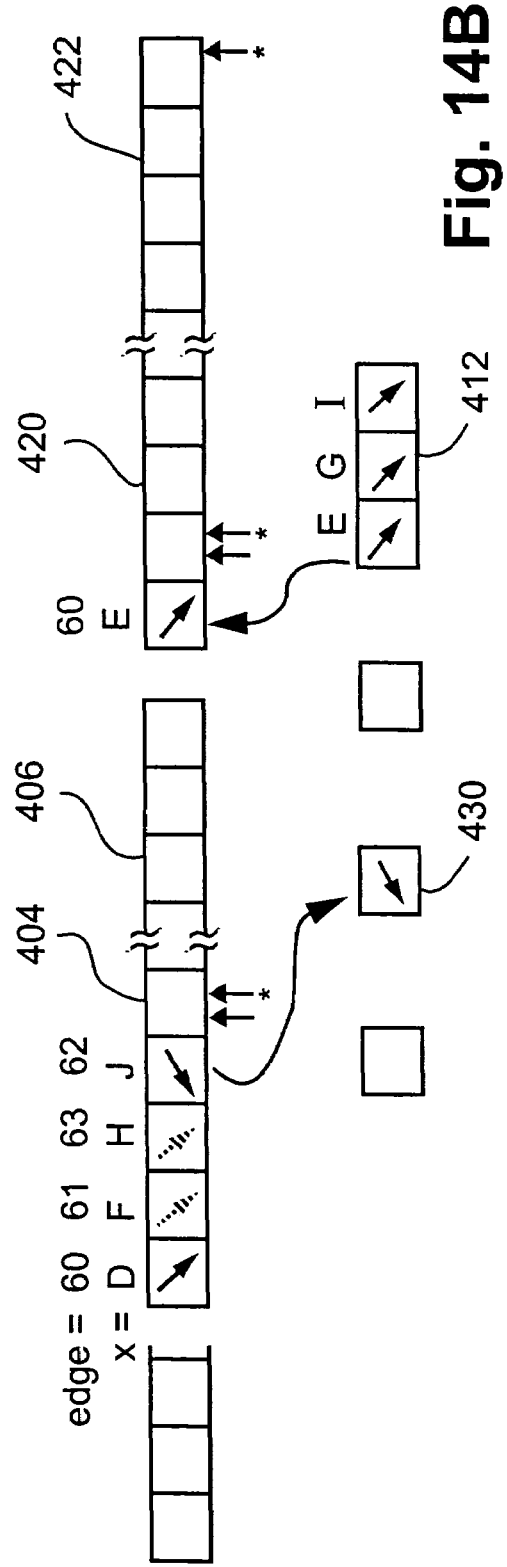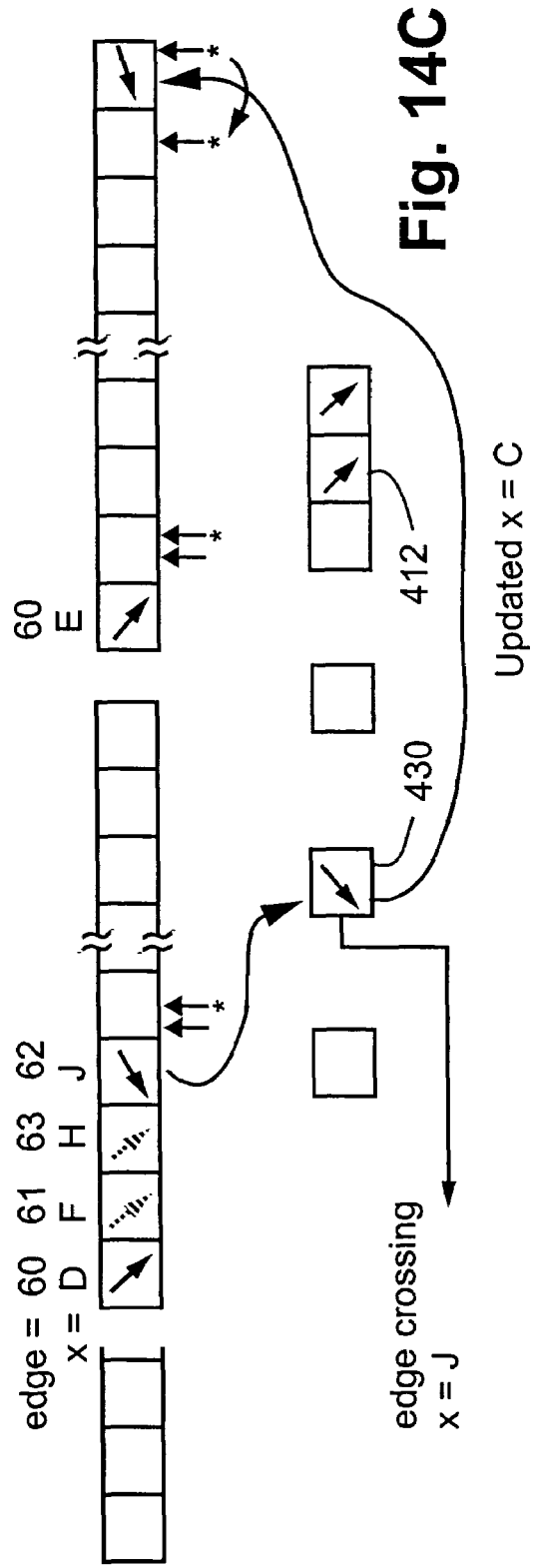

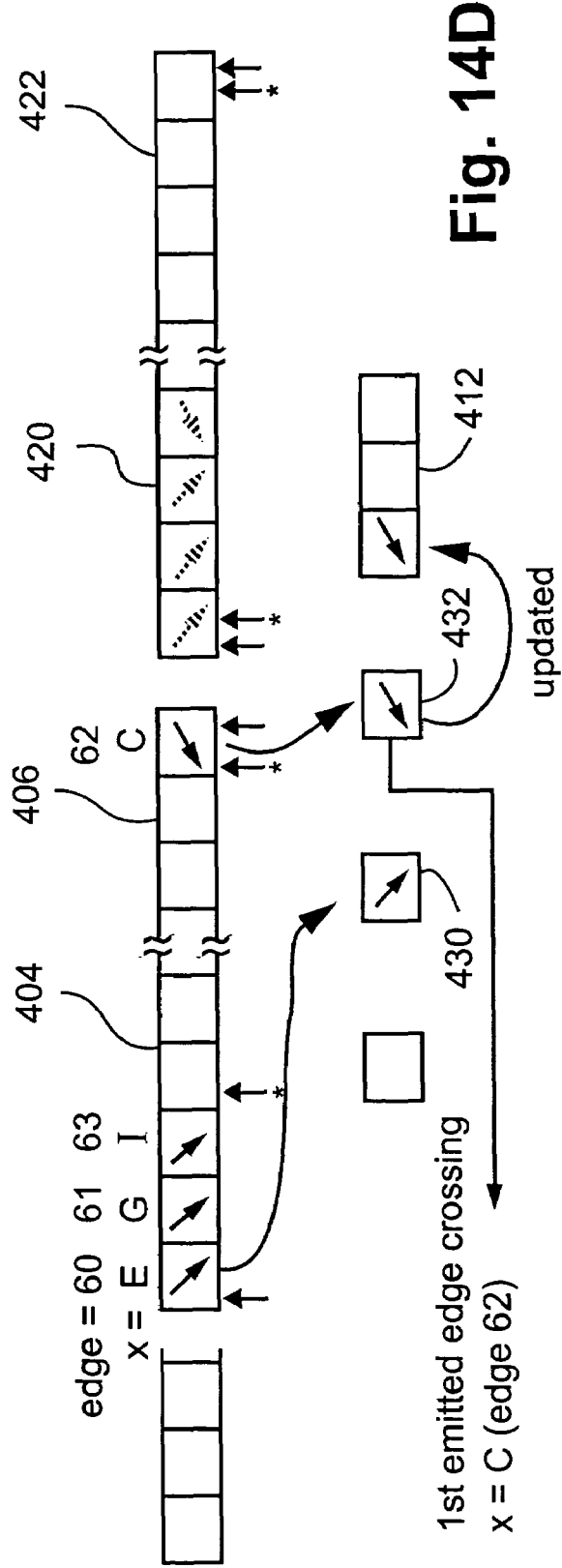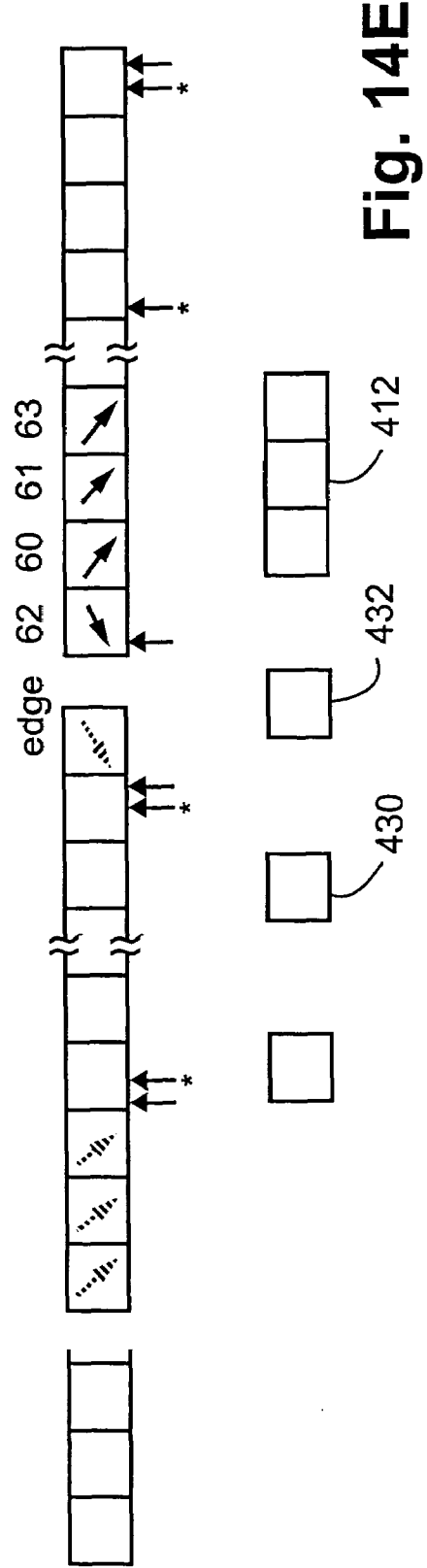

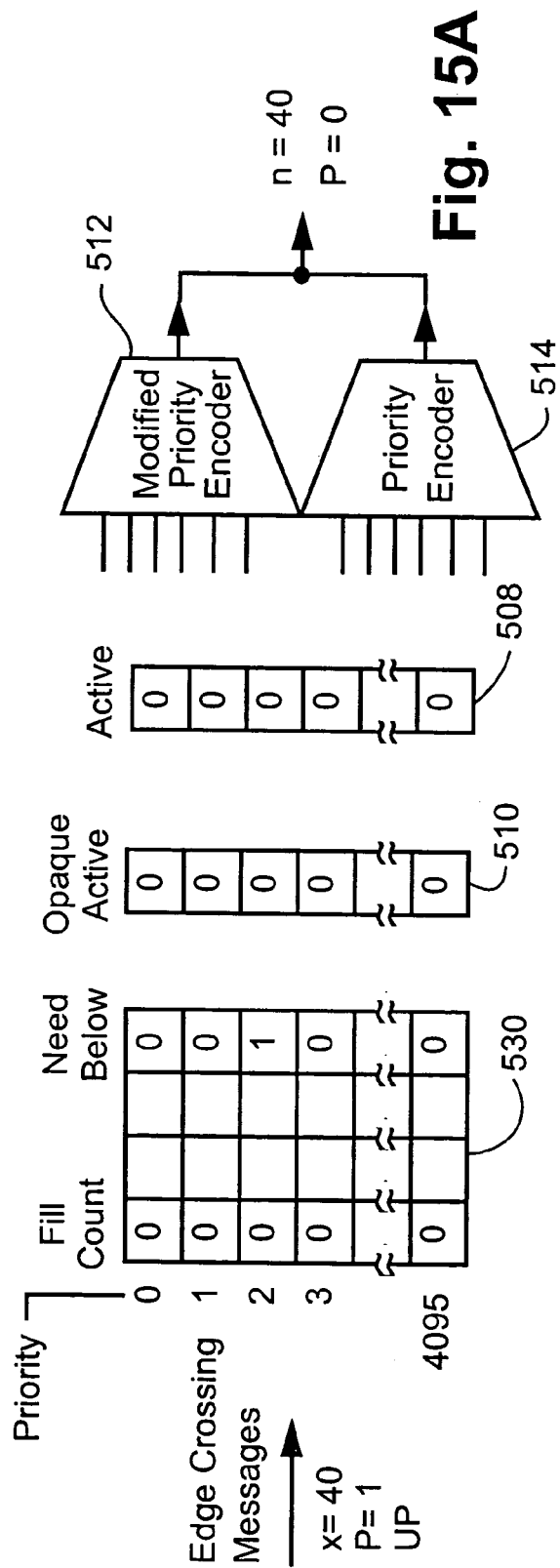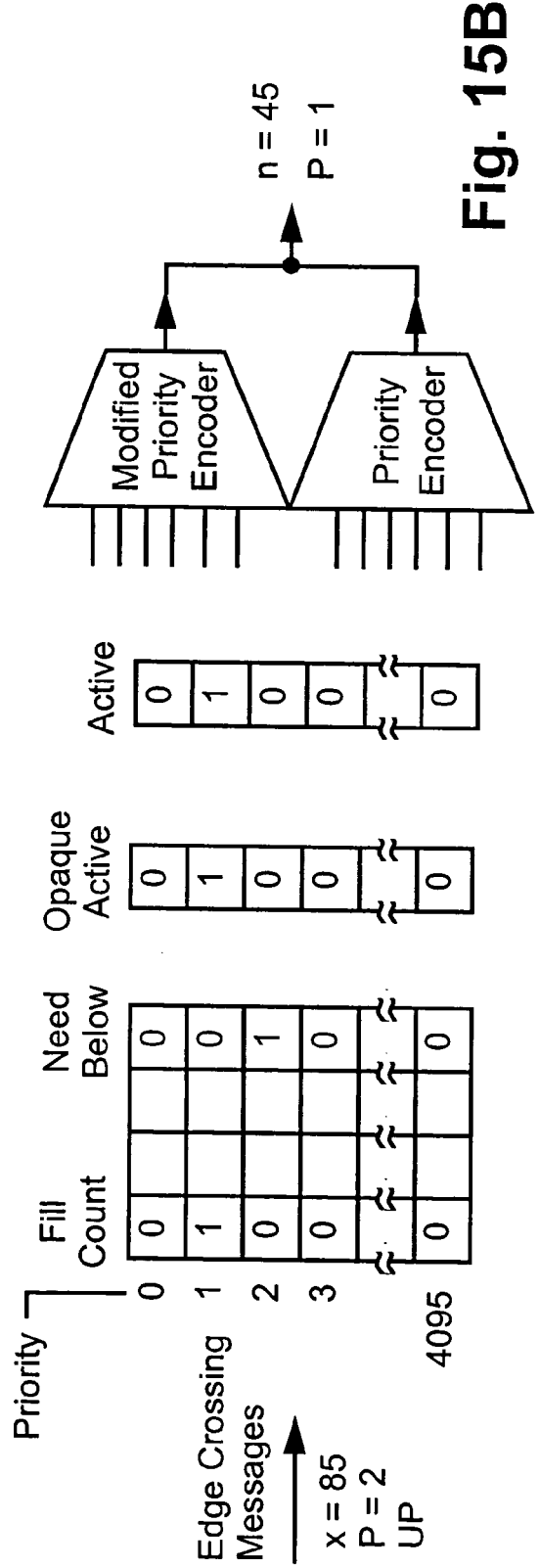
Fig. 15A
Fig. 15B

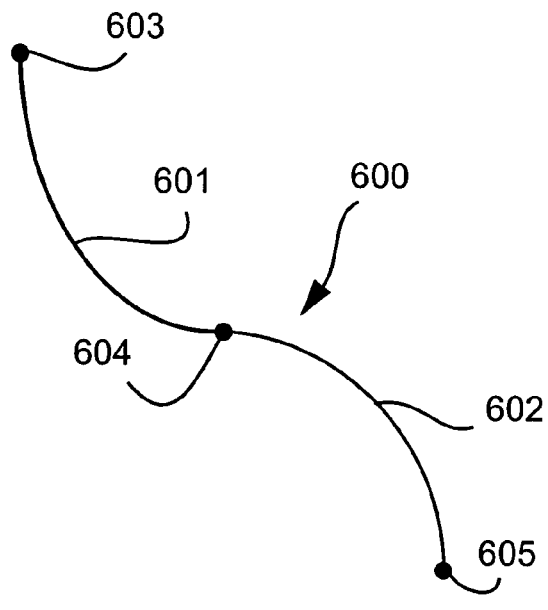
Fig. 16A (Prior Art)
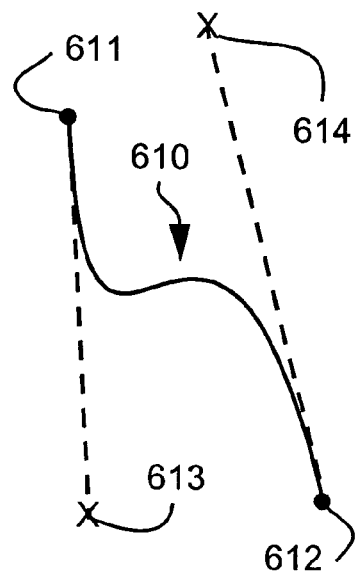
Fig. 16B (Prior Art)
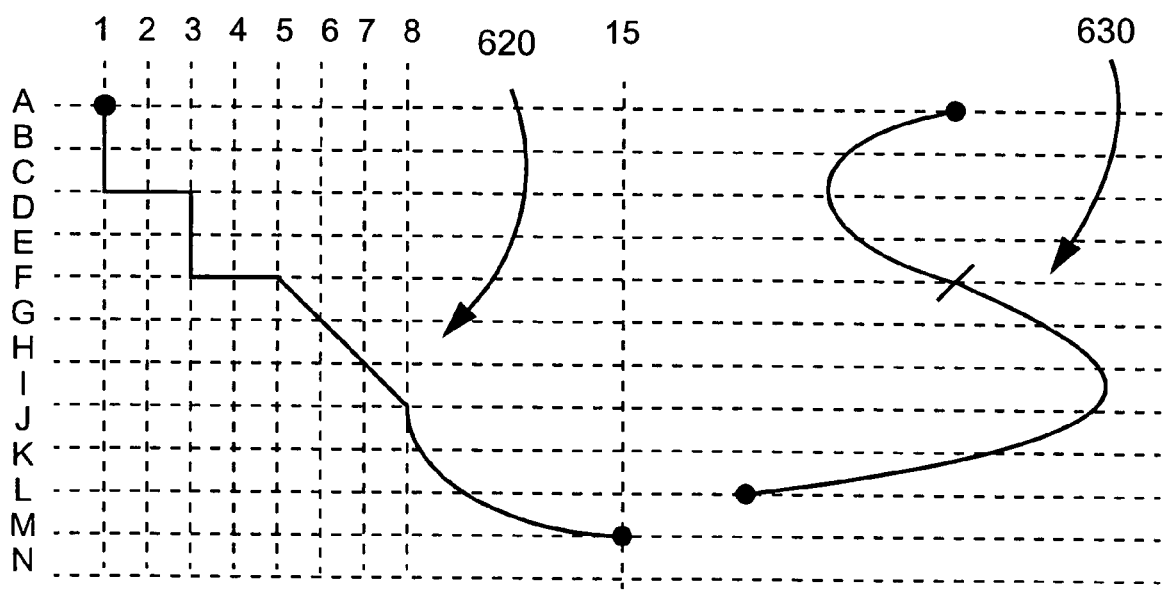
Fig. 16C     Fig. 16D

Fig. 18

| FILL COUNT | CLIP COUNT | FILL TYPE | CLIPPER | CLISP_OUT | NEED_BELOW | X_INDEPENDENT | STACK_OP | USE_D_OUT_S | USE_S_OUT_D | USE_S_ROP_D | COLOR_OP | FILL_RULE_IS_ODD_EVEN | ATTRIBUTES | FILL INDEX |
|---|---|---|---|---|---|---|---|---|---|---|---|---|---|---|
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |

| Raster operation code | Operation | Operation Name |
|---|---|---|
| 0x00 | r = 0 | LCO_BLACK |
| 0x01 | r = src & dest | LCO_MASKPEN |
| 0x02 | r = src & ~dest | LCO_MASKPENNOT |
| 0x03 | r = src | LCO_COPYPEN |
| 0x04 | r = ~src & dest | LCO_MASKNOTPEN |
| 0x05 | r = dest | LCO_NOP |
| 0x06 | r = src ^ dest | LCO_XORPEN |
| 0x07 | r = src \| dest | LCO_MERGEPEN |
| 0x08 | r = ~(src \| dest) | LCO_NOTMERGEPEN |
| 0x09 | r = ~(src ^ dest) | LCO_NOTXORPEN |
| 0x0a | r = ~dest | LCO_NOT |
| 0x0b | r = src \| ~dest | LCO_MERGEPENNOT |
| 0x0c | r = ~src | LCO_NOTCOPYPEN |
| 0x0d | r = ~src \| dest | LCO_MERGENOTPEN |
| 0x0e | r = ~(src & dest) | LCO_NOTMASKPEN |
| 0x0f | r = 0xff | LCO_WHITE |
| 0x10 | r = min(src, dest) | LCO_MIN |
| 0x11 | r = max(src, dest) | LCO_MAX |
| 0x12 | r = clamp(src + dest) | LCO_PLUS |
| 0x13 | r = src | LCO_COPYPEN_PREMULTIPLIED |
| 0x14 | r = clamp(src - dest) | LCO_SRC_MINUS_DEST |
| 0x15 | r = dest | LCO_NOP_PREMULTIPLIED |
| 0x16 | r = clamp(dest - src) | LCO_DEST_MINUS_SRC |
| 0x17 | r = clamp(src + dest) where dest is signed | LCO_PLUS_SIGNED_DEST |
| 0x18 | r = threshold(dest, src) | LCO_THRESH_DEST_SRC |
| 0x19 | r = threshold(src, dest) | LCO_THRESH_SRC_DEST |
| 0x1a | r = ~dest | LCO_NOT_DATTR |
| 0x1b | o = luminance(dest; src) | LCO_LUMINANCE |
| 0x1c | r = ~src | LCO_NOTCOPYPEN_SATTR |
| 0x1d | o = ckey(dest; src+/-o) | LCO_CKEY |

Fig. 20A

| Operator | COLOR_OP | ALPHA_OP Flags Set | Diagram |
|---|---|---|---|
| clear | not used | none |  |
| src | LCO_COPYPEN | LAO_USE_S_ROP_D<br>LAO_USE_S_OUT_D | 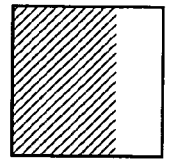 |
| dest | LCO_NOP | LAO_USE_S_ROP_D<br>LAO_USE_D_OUT_S |  |
| src over dest | LCO_COPYPEN | LAO_USE_S_ROP_D<br>LAO_USE_S_OUT_D<br>LAO_USE_D_OUT_S | 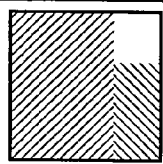 |
| src rover dest<br>(dest over src) | LCO_NOP | LAO_USE_S_ROP_D<br>LAO_USE_S_OUT_D<br>LAO_USE_D_OUT_S | 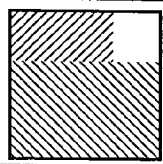 |
| src in dest | LCO_COPYPEN | LAO_USE_S_ROP_D | 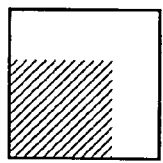 |
| src rin dest<br>(dest in src) | LCO_NOP | LAO_USE_S_ROP_D | 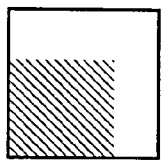 |
| src out dest | not used | LAO_USE_S_OUT_D |  |

Fig. 20B
| Operator | COLOR_OP | ALPHA_OP Flags Set | Diagram |
|---|---|---|---|
| src rout dest (dest out src) | not used | LAO_USE_D_OUT_S | 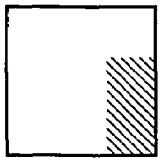 |
| src atop dest | LCO_COPYPEN | LAO_USE_S_ROP_D<br>LAO_USE_D_OUT_S |  |
| src ratop dest (dest atop src) | LCO_NOP | LAO_USE_S_ROP_D<br>LAO_USE_S_OUT_D | 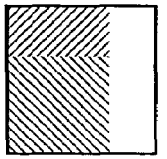 |
| src xor dest | not used | LAO_USE_S_OUT_D<br>LAO_USE_D_OUT_S | 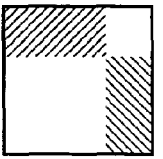 |

PIXEL ACCURATE EDGES FOR SCANLINE RENDERING SYSTEM

CROSS-REFERENCE TO RELATED PATENT APPLICATIONS

This application claims the right of priority under 35 U.S.C. § 119 based on Australian Patent Application No 2003906520, filed on 25 Nov. 2003, which is incorporated by reference herein in its entirety as if fully set forth herein.

FIELD OF THE INVENTION

The present invention relates generally to rendering graphic object based images and, in particular, to the representation of monotonic curves on an edge-based graphics rendering system. The present invention also relates to a method and apparatus for representing monotonic curves on an edge-based graphics rendering system, and to a computer program product including a computer readable medium having recorded thereon a computer program for representing monotonic curves on an edge-based graphics rendering system.

BACKGROUND

When a computer application provides data to a device for printing and/or display, an intermediate description of the page is often given to device driver software in a page description language, which provides descriptions of graphic objects to be rendered onto the page or display. This contrasts some arrangements where raster image data is generated directly and transmitted for printing or display. Examples of page description languages include PostScript and PCL. Equivalently, a set of descriptions of graphic objects may be provided in function calls to a graphics interface, such as the Microsoft Windows GDI, or Unix's X-11. The page image is typically rendered for printing and/or display by an object-based graphics system, or a raster image processor (RIP).

Most object-based graphics systems utilize a large volume of memory, known in the art as a frame store or a page buffer. Such a frame store or page buffer is used to hold a pixel-based image data representation of the page or screen for subsequent printing and/or display. Typically, the outlines of the graphic objects are calculated, filled with color values and written into the frame store. For two-dimensional graphics, objects that appear in front of other objects are simply written into the frame store after the background objects, thereby replacing the background on a pixel by pixel basis. This is commonly known in the art as "Painter's algorithm". In the Painter's algorithm objects are considered in priority order, from the rearmost object to the foremost object, and typically, each object is rasterized in scanline order and pixels are written to the frame store in sequential runs along each scanline. Some graphics interfaces allow a logical or arithmetic operation to be specified and performed between one or more graphics objects and the already rendered pixels in the frame buffer. In these cases the rendering principle remains the same: objects (or groups of objects) are rasterized in scanline order, and the result of the specified operation is calculated and written to the frame store in sequential runs along each scanline. There are essentially two problems with this technique.

The first problem with the above technique is that the technique requires fast random access to all of the pixels in the frame store. This is because each new object may affect any pixel in the frame store. For this reason, the frame store is normally kept in semiconductor random access memory (RAM). For high-resolution color printers the amount of RAM required is very large, typically in excess of 100 Mbytes, which is costly and difficult to run at high speed. The second problem with the above technique is that many pixels which have been previously painted (i.e., rendered) are subsequently over-painted (i.e., re-rendered) by later objects. Such over-painting of pixels with earlier objects is inefficient.

One method for overcoming the large frame-store problem discussed above is the use of "banding". When banding is used, only part of a frame store exists in memory at any one time. All objects to be drawn are retained in a "display list", which is an internal representation of the information required to draw the objects on a page. The display list is considered in object order as above, and only those pixel operations which fall within the fraction of the page which is held in the band are actually performed. After all objects in the display list have been drawn, the band is sent to the printer (or to intermediate storage) and the process is repeated for the next band of the page. There are some penalties with the banding technique, however. For example, the objects being drawn must be reconsidered many times, once for each band. As the number of bands increases, so does the repetitious examination of the objects requiring rendering. Also, the technique of banding does not solve the problem of over-painting.

Some other graphic systems consider an image in scan line order. Again, all objects on a page are retained in a display list. On each scanline, objects which intersect that scanline are then considered in priority order. For each object in priority order, spans of pixels between intersection points of the object edges with the scanline are filled in a line store. This scan line order technique overcomes the large frame store problem. However, the scan line order technique still suffers from the over-painting problem.

Other graphic systems utilise pixel-sequential rendering to overcome both the large frame store problem and the over-painting problem. In these systems, each pixel is generated in raster order. Again, all objects to be drawn are retained in a display list. On each scan line, the edges of objects, which intersect that scanline, are held in increasing order of their intersection with the scan line. These points of intersection, or edge crossings, are considered in turn, and used to toggle an array of fields. The array of fields indicate the activity of the objects in the display list. There is one activity field for each object painting operation that is of interest on a scan line. There is also a field to indicate operations that do not require previously generated data. Between each pair of edges considered, the color data for each pixel, which lies between a first of the edges and a second of the edges, is generated using a priority encoder. The priority encoder is used on the activity flags to determine which operations are required to generate the color, and performing only those operations for the span of pixels between the two edges. In preparation for the next scanline, the coordinate of intersection of each edge is updated in accordance with the nature of each edge, and the edges are sorted into increasing order of intersection with that scanline. Any new edges are also merged into the list of edges.

Graphic systems which use pixel-sequential rendering have significant advantages over other graphics systems in that there is no frame store or line store and no unnecessary over-painting. Further, object priorities are dealt with in constant order time by a priority encoder, rather than in order N time, where N is the number of priorities. In most such pixel-sequential rendering graphic systems every point on a page to be rendered is represented by an X coordinate (hereinafter referred to as an 'X-value') and a corresponding Y coordinate (hereinafter referred to as a 'Y-value') in integer fixed-point format (e.g. 28.4 integer fixed-point format). A monotonic curve representing the outline of a graphic object, for example, is described on such systems as a series of coordinate points in integer fixed-point format. The current Y-value for a particular point is greater than or equal to a next Y-value assuming an increasing scanline position (Y) in the Y direction.

The disadvantages with using integer fixed point format arithmetic in pixel-sequential rendering graphic systems will now be described in detail. However, before proceeding, a brief review of terminology used throughout the following specification will be discussed:

A.B: represents a fixed point number (e.g. 28.4) which itself is used to represent a rational number. The fixed point number ranges from $-(2^{A+B-1}-1)$ to $+(2^{A+B-1})$, where A and B are positive integers, and A equals the number of bits required to represent an integer part of the rational number and B equals the number of bits required to represent a fractional part of the rational number. For example, if P is an A.B fixed point number is used to represent the rational number Q, then $$Q = P/2^B \quad (1)$$

Letting P=8, A=28 and B=4 (i.e., a 28.4 fixed point number), then the rational number Q is determined as follows:

$$Q = 8/2^4 = 8/16 = 1/2.$$

A%B: represents the remainder of an integer division A/B;

INT (a): represents the integer part of a real number 'a';

INT(a/b): represents the integer division result of integer 'a' divided by integer 'b'; and a/b: represents the real number division of a number 'a' divided by a number 'b'.

As will be described in more detail below, an edge of an object starts at an integer scanline position (Y). The X-value and Y-value of the starting point of the edge are then typically examined as to the priority (i.e., z-order value) of the objects corresponding to the edge to determine whether particular objects contribute pixels to a particular scan line.

For pixel generation, the calculation of an integer pixel position X-value for an edge is typically performed for each integer scanline position (Y) incrementally in a Y direction of the edge (i.e. from the start point of the edge to the end point of the edge). If the current scanline position (Y) is greater than the Y-value for the end-point of the edge, then the edge is no longer valid and is considered as not being active for that scanline. The integer pixel position (X) for an edge is determined from a corresponding 'real' X-value corresponding to the point that the current scanline crosses the edge (i.e., the edge crossing X-value). The real X-value of an edge crossing point is rounded based on a specific 'rounding rule' associated with the crossed edge to determine an integer edge crossing X-value for the real X-value.

There are three main types of edge crossing X-value rounding rules as follows, where the real X-value is represented as a rational number a/b, 'a' represents the integer nominator and 'b' represents the nonzero integer denominator:

(i) Flooring Rule: the integer edge crossing X-value of an edge at a current scanline position (Y) (i.e., corresponding to a pixel position (X) on that scanline) is the flooring value of the real (i.e., rational) edge crossing X-value at the current scanline position value (Y). The Flooring Rule for the rational number a/b is: FLOOR(a/b)=INT (a/b), b>0;

(ii) Ceiling Rule: the integer edge crossing X-value of an edge at a current scanline position (Y) (i.e., corresponding to a pixel position (X) on that scanline) is the ceiling value of the real (i.e., rational) edge crossing X-value at the current scanline position value (Y). The Ceiling Rule for the rational number a/b is: CEIL(a/b)=INT ((a+b−1)/b), b>0; and (iii) Rounding Rule: the integer edge crossing X-value of the edge at a current scanline position (Y) (i.e., corresponding to a pixel position (X) on that scanline) is the rounding value of the real (i.e, rational) edge crossing X-value at the current scanline position (Y). The Rounding Rule for a rational number a/b is: ROUND(a/b)=INT ((2a+b)/2b), b>0.

The Flooring, Ceiling and Rounding Rules for an A.B fixed point number x are defined, respectively, as:

$$\text{FLOOR}(x) = \text{INT}(x/2^B) \quad (2)$$

$$\text{CEIL}(x) = \text{INT}((x+2^B-1)/2^B) \quad (3)$$

$$\text{ROUND}(x) = \text{INT}((x+2^{B-1})/2^B) \quad (4)$$

For edges associated with each of the above rounding rules, the first edge crossing X-value is determined at the intersection of an edge segment with a corresponding horizontal line at the Y-value corresponding to the current scanline position (Y). The corresponding Y-value is equal to the floor value of the Y-value representing the start point of the edge segment. The last edge crossing Y-value is equal to the floor value of the corresponding end point Y-value of the edge segment less one. One disadvantage with using the integer fixed point format is that if the result of any fixed-point format arithmetic operation is outside a particular range (i.e., dependent on the number of bits used to represent the result value), then the result value is overflowed. The fractional part of such a result value also has a maximum range depending on the number of bits used to represent the fractional part of the result value. Therefore, the fractional part of the result value must be approximated to a real number with a corresponding error value.

The error value resulting from such integer fixed-point arithmetic can accumulate in any graphic system that processes a high number of fractional parts (e.g. a system using 18.14 integer fixed-point format arithmetic) to determine edge crossing values. Clipping is required in such a system for all points, since the graphic system has only eighteen bits to represent the integer part of a result when input points are normally in 28.4 integer fixed-point format which has twenty-eight bits to represent an integer value.

A further problem with a graphic system using 18.14 integer fixed-point format arithmetic, for example, to determine edge crossing values, is that such a system cannot accurately represent near vertical, near horizontal or long line segments. Such line segments must be broken down into smaller segments and subsequently connected together. Again, the error value resulting from the corresponding increase in integer fixed-point arithmetic accumulates, sometimes resulting in gaps between adjoining boundary objects.

One known method for tracking scan line edge crossing points is based on the basic linear line equation (i.e., x=my+c where m & c are constants). In this known method, edge crossing calculations for a line segment (i.e., from a first point to a second point on an edge) are performed in an accumulated fashion. However, again, the error is linearly increasing as the scan line position (Y) increases. Due to the sensitive nature of the Rounding, Ceiling or Flooring Rules discussed above, a smallest fractional error in a real (i.e., rational) edge crossing X-value might erroneously increase or decrease the integer crossing X-value by one pixel.

Thus, a need clearly exists for an improved method of accurately representing monotonic curves on pixel-sequential rendering graphic systems.

SUMMARY

It is an object of the present invention to substantially overcome, or at least ameliorate, one or more disadvantages of existing arrangements.

According to one aspect of the present invention there is provided a method of displaying a graphic object using a coordinate representing a point of intersection by a scan line of at least one edge of the graphic object, said method comprising the steps of:

providing a first point and a second point on said edge of said graphic object;

determining an integer part and a fractional part of a ratio of a horizontal difference between said first point and said second point of said edge to a vertical difference between the first point and the second point of the edge;

utilizing said fractional part of said ratio to determine a fractional part of said coordinate at an intermediate scan line between said first point and said second point;

utilizing at least said integer part of said ratio to determine an integer part of said coordinate at said intermediate scan line; and displaying the graphic object using the integer part and the fractional part of the coordinate.

According to another aspect of the present invention there is provided an apparatus for displaying a graphic object, using a coordinate representing a point of intersection by a scan line of at least one edge of the graphic object, said apparatus comprising:

first point determining means for providing a first point and a second point on said edge of said graphic object;

slope determining means for determining an integer part and a fractional part of a ratio of a horizontal difference between said first point and said second point of said edge to a vertical difference between the first point and the second point of the edge;

fractional part determining means for utilizing said fractional part of said ratio to determine a fractional part of said coordinate at an intermediate scan line between said first point and said second point;

integer part determining means for utilizing at least said integer part of said ratio to determine an integer part of said coordinate at said intermediate scan line; and display means for displaying the graphic object using the integer part and the fractional part of the coordinate.

According to still another aspect of the present invention there is provided a computer-readable medium, having a computer program recorded thereon, where the program is configured to make a computer execute a procedure to display a graphic object, using a coordinate representing a point of intersection by a scan line of at least one edge of the graphic object, said program comprising:

code for providing a first point and a second point on said edge of said graphic object;

code for determining an integer part and a fractional part of a ratio of a horizontal difference between said first point and said second point of said edge to a vertical difference between the first point and the second point of the edge;

code for utilizing said fractional part of said ratio to determine a fractional part of said coordinate at an intermediate scan line between said first point and said second point;

code for utilizing at least said integer part of said ratio to determine an integer part of said coordinate at said intermediate scan line; and code for displaying the graphic object using the integer part and the fractional part of the coordinate.

Other aspects of the invention are also disclosed.

BRIEF DESCRIPTION OF THE DRAWINGS

One or more embodiments of the present invention will now be described with reference to the drawings, in which:

FIGS. 12B to 12J show the edge update routine implemented by the arrangement of FIG. 4 for the example of FIG. 8A;

FIGS. 14A to 14E show how large changes in X-values contribute to spill conditions and how they are handled;

FIGS. 15A to 15E show the priority filling routine implemented by the arrangement of FIG. 5;

FIGS. 16A to 16D provide a comparison between two prior art edge description formats and that used in the described apparatus;

FIG. 18 shows the priority properties and status table of the priority determination module of FIG. 3;

FIG. 19 shows a table of a number of raster operations;

FIGS. 20A and 20B shows a table of the principal compositing operations and their corresponding raster operations and opacity flags;

DETAILED DESCRIPTION INCLUDING BEST MODE

Figure 1:
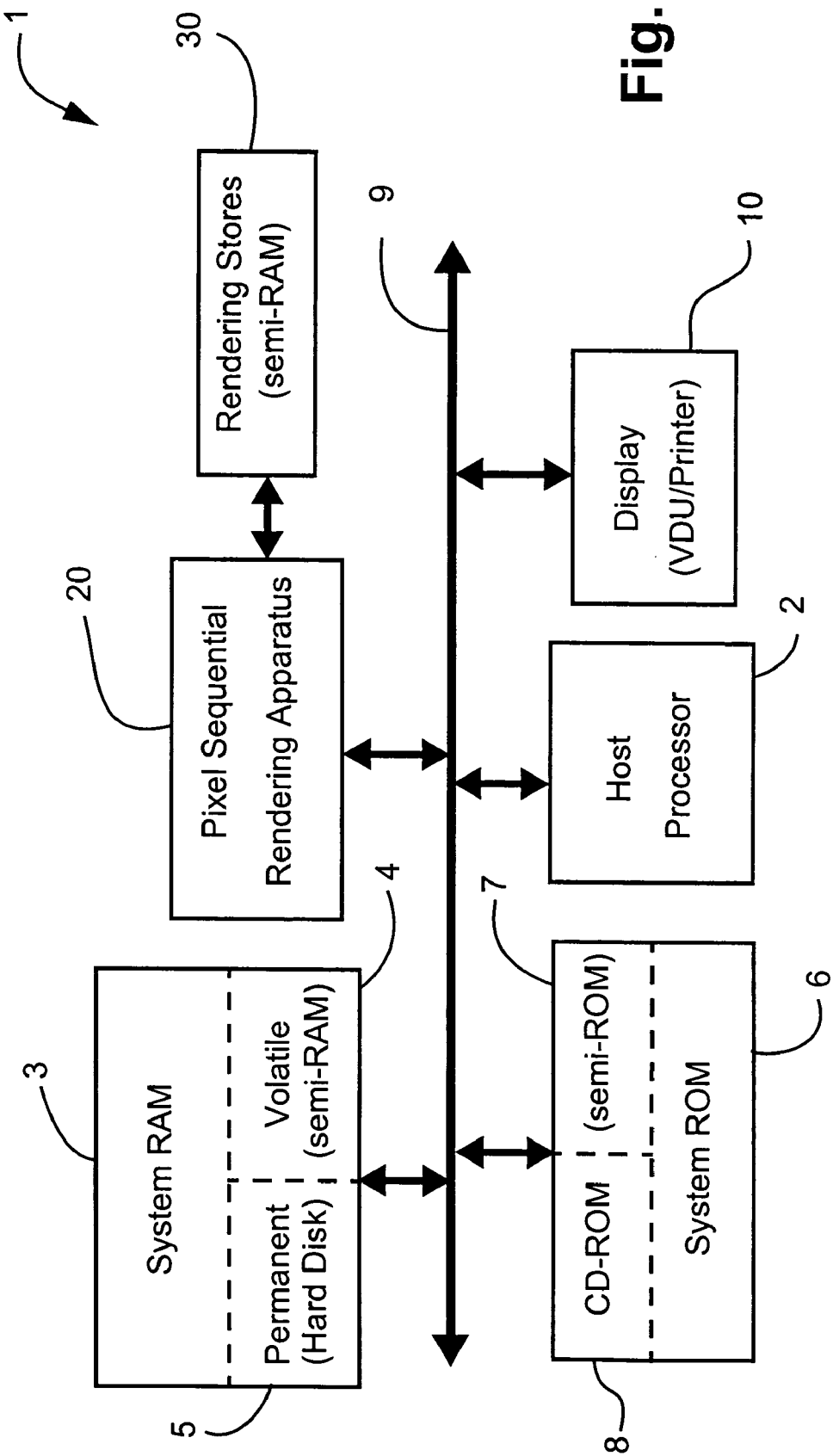
FIG. 1 is a schematic block diagram representation of a computer system incorporating a rendering arrangement.

Where reference is made in any one or more of the accompanying drawings to steps and/or features, which have the same reference numerals, those steps and/or features have for the purposes of this description the same function(s) or operation(s), unless the contrary intention appears.

For a better understanding of the pixel sequential rendering system 1, a brief overview of the system is first undertaken in Section 1.0. Then follows a brief discussion in Section 2.0 of the driver software for interfacing between a third party software application and the pixel sequential rendering apparatus 20 of the system. A brief overview of the pixel sequential rendering apparatus 20 is then discussed in Section 3.0. As will become apparent, the pixel sequential rendering apparatus 20 includes an instruction execution module 300; an edge processing module 400; a priority determination module 500; a fill color determination module 600; a pixel compositing module 700; and a pixel output module 800. A brief overview of these modules is described in Sections 3.1 to 3.6.

A method 2500 (see FIG. 25) of converting a monotonic curve into edge information is described below with reference to FIGS. 1 to 28. A method 2800A (see FIG. 28A) of determining an integer edge crossing value, Xi, for a new edge crossed by a scanline (i.e., an inactive edge being crossed by the scanline for the first time) is also described. Further, a method 2800B (see FIG. 28B) of determining an integer edge crossing value, Xi, for an active edge crossed by a scanline, will also be described below.

The principles of the methods described herein have general application in the representation of monotonic curves. The described methods allow monotonic curves to be accurately represented in terms of edges where the original curve can be reconstructed from the edges. Furthermore, the methods allow edge tracking to be performed such that any resulting error is restricted to a fixed-point division error. At transition points between adjoining segments, an original edge crossing point is determined to avoid accumulated error. As will be described in detail below, the method 2500 is preferably implemented as one or more software modules forming part of a software driver, which will be described below. Further, the methods 2800A and 2800B are preferably implemented as one or more software modules forming part of the edge processing module 400.

1.0 Pixel Sequential Rendering System

FIG. 1 illustrates schematically a computer system 1 configured for rendering and presenting computer graphic object images. The system 1 includes a host processor 2 associated with system random access memory (RAM) 3, which may include a non-volatile hard disk drive or similar device 5 and volatile, semiconductor RAM 4. The system 1 also includes a system read-only memory (ROM) 6 typically founded upon semiconductor ROM 7 and which in many cases may be supplemented by compact disk devices (CD ROM) 8. The system 1 may also incorporate some means 10 for displaying images, such as a video display unit (VDU) or a printer, both, which operate in raster fashion.

The above-described components of the system 1 are interconnected via a bus system 9 and are operable in a normal operating mode of computer systems well known in the art, such as IBM PC/AT type personal computers and arrangements evolved therefrom, including Sun Sparc stations and the like.

Also seen in FIG. 1, a pixel sequential rendering apparatus 20 (or renderer) connects to the bus 9, and is configured for the sequential rendering of pixel-based images derived from graphic object-based descriptions supplied with instructions and data from the system 1 via the bus 9. The apparatus 20 may utilise the system RAM 3 for the rendering of object descriptions although preferably the rendering apparatus 20 may have associated therewith a dedicated rendering store arrangement 30, typically formed of semiconductor RAM.

Image rendering operates generally speaking in the following manner. A render job to be rendered is given to the driver software module by third party software for supply to the pixel sequential renderer 20. The render job is typically in a page description language or in a sequence of function calls to a standard graphics application program interface (API). The API defines an image comprising objects placed on a page from a rearmost object to a foremost object to be composited in a manner defined by the render job. The driver software converts the render job to an intermediate render job, which is then fed to the pixel sequential renderer 20. The pixel sequential renderer 20 generates the color and opacity for the pixels one at a time in raster scan order. At any pixel currently being scanned and processed, the pixel sequential renderer 20 composites only those exposed objects that are active at the currently scanned pixel. The pixel sequential renderer determines that an object is active at a currently scanned pixel if that pixel lies within the boundary of the object. The pixel sequential renderer 20 achieves this by reference to a fill counter associated with that object.

The fill counter keeps a running fill count that indicates whether the pixel lies within the boundary of the object. When the pixel sequential renderer 20 encounters an edge associated with the object the pixel sequential renderer 20 increments or decrements the fill count depending upon the direction of the edge. The renderer 20 is then able to determine whether the current pixel is within the boundary of the object depending upon the fill count and a predetermined winding count rule. The renderer 20 determines whether an active object is exposed with reference to a flag associated with that object. This flag associated with an object indicates whether or not the object obscures lower order objects. That is, this flag indicates whether the object is partially transparent, and in which case the lower order active objects will thus make a contribution to the color and opacity of the current pixel. Otherwise, this flag indicates that the object is opaque in which case active lower order objects will not make any contribution to the color and opacity of the currently scanned pixel. The pixel sequential renderer 20 determines that an object is exposed if the object is the uppermost active object, or if all the active objects above the object have their corresponding flags set to transparent. The renderer 20 then composites these exposed active objects to determine and output the color and opacity for the currently scanned pixel.

The driver software, in response to the page, also extracts edge information defining the edges of the objects for feeding to the edge processing module. The driver software also generates a linearised table of priority properties and status information (herein called the level activation table) of the expression tree of the objects and their compositing operations which is fed to the priority determination module. The level activation table contains one record for each object on the page. In addition, each record contains a field for storing a pointer to an address for the fill of the corresponding object in a fill table. This fill table is also generated by the driver software and contains the fill for the corresponding objects, and is fed to the fill determination module. The level activation table together with the fill table are devoid of any edge information and effectively represent the objects, where the objects are infinitely extending. The edge information is fed to the edge processing module, which determines, for each pixel in raster scan order, the edges of any objects that intersect a currently scanned pixel. The edge processing module passes this information onto the priority determination module. Each record of the level activation table contains a counter, which maintains a fill count associated with the corresponding object of the record. The priority determination module processes each pixel in a raster scan order. Initially, the fill counts associated with all the objects are zero, and so all objects are inactive. The priority determination module continues processing each pixel until the priority determination module encounters an edge intersecting that pixel. The priority determination module updates the fill count associated with the object of that edge, and so that object becomes active. The priority determination continues in this fashion updating the fill count of the objects and so activating and de-activating the objects. The priority determination module also determines whether these active objects are exposed or not, and consequently whether they make a contribution to the currently scanned pixel. In the event that they do, the pixel determination module generates a series of messages which ultimately instructs the pixel compositing module to composite the color and opacity for these exposed active objects in accordance with the compositing operations specified for these objects in the level activation so as to generate the resultant color and opacity for the currently scanned pixel. These series of messages do not at that time actually contain the color and opacity for that object but rather an address to the fill table, which the fill determination module uses to determine the color and opacity of the object.

For ease of explanation, the location (ie: priority level or z-order) of the object in the order of the objects from the rearmost object to the foremost is herein referred to as the object's priority. Preferably, a number of non-overlapping objects that have the same fill and compositing operation, and that form a contiguous sequence in the order of the objects, may be designated as having the same priority. Most often, only one priority level is required per object. However, some objects may require several instructions, and thus the object may require several priority levels. For example, a character with a color fill may be represented by, a bounding box (B) on a first level having the color fill, a one-bit bitmap (S) which provides the shape of the character on a second level, and the same bounding box (B) on a third level having the color fill, where the levels are composited together ((B xor Page) and S) xor B to produce the color character. For fundamental objects, there is a one-to-one relationship with priority levels.

The pixel sequential renderer 20 also utilises clip objects to modify the shape of other objects. The renderer 20 maintains an associated clip count for the clip in a somewhat similar fashion to the fill count to determine whether the current pixel is within the clip region.

2.0 Software Driver

A software program, hereafter referred to as the software driver, is loaded and executed on the host processor 2 for generating instructions and data for the pixel-sequential graphics rendering apparatus 20, from data provided to the software driver by a third-party application. The third-party application may provide data in the form of a standard language description of the objects to be drawn on the page, such as PostScript and PCL, or in the form of function calls to the driver through a standard software interface, such as the Windows GDI or X-11.

The driver software separates the data associated with an object, supplied by the third-party application, into data about the edges of the object, any operation or operations associated with painting the object onto the page, and the color and opacity with which to fill pixels which fall inside the edges of the object.

The driver software partitions the edges of each object into edges which are monotonic increasing in the Y-direction, and then divides each partitioned edge of the object into segments of a form suitable for the edge module described below. Partitioned edges are sorted by the X-value of their starting positions and then by the corresponding Y-value. Groups of edges starting at the same Y-value remain sorted by X-value, and may be concatenated together to form a new edge list, suitable for reading in by the edge module when rendering reaches that Y-value.

The driver software sorts the operations, associated with painting objects, into priority order, and generates instructions to load the data structure associated with the priority determination module (described below). This structure includes a field for the fill rule, which describes the topology of how each object is activated by edges, a field for the type of fill which is associated with the object, being painted, and a field, to identify whether data on levels below the current object is required by the operation. There is also a field, herein called clip count, that identifies an object as a clipping object, that is, as an object which is not, itself, filled, but which enables or disables filling of other objects on the page.

The driver software also prepares a data structure (the fill table) describing how to fill an object. The fill table is indexed by the data structure in the priority determination module. This allows several levels in the priority determination module to refer to the same fill data structure.

The driver software assembles the aforementioned data into a job containing instructions for loading the data and rendering pixels, in a form that can be read by the rendering system, and transfers the assembled job to the rendering system. This may be performed using one of several methods known to the art, depending on the configuration of the rendering system and the memory of the rendering system.

3.0 Pixel Sequential Rendering Apparatus

Figure 2:
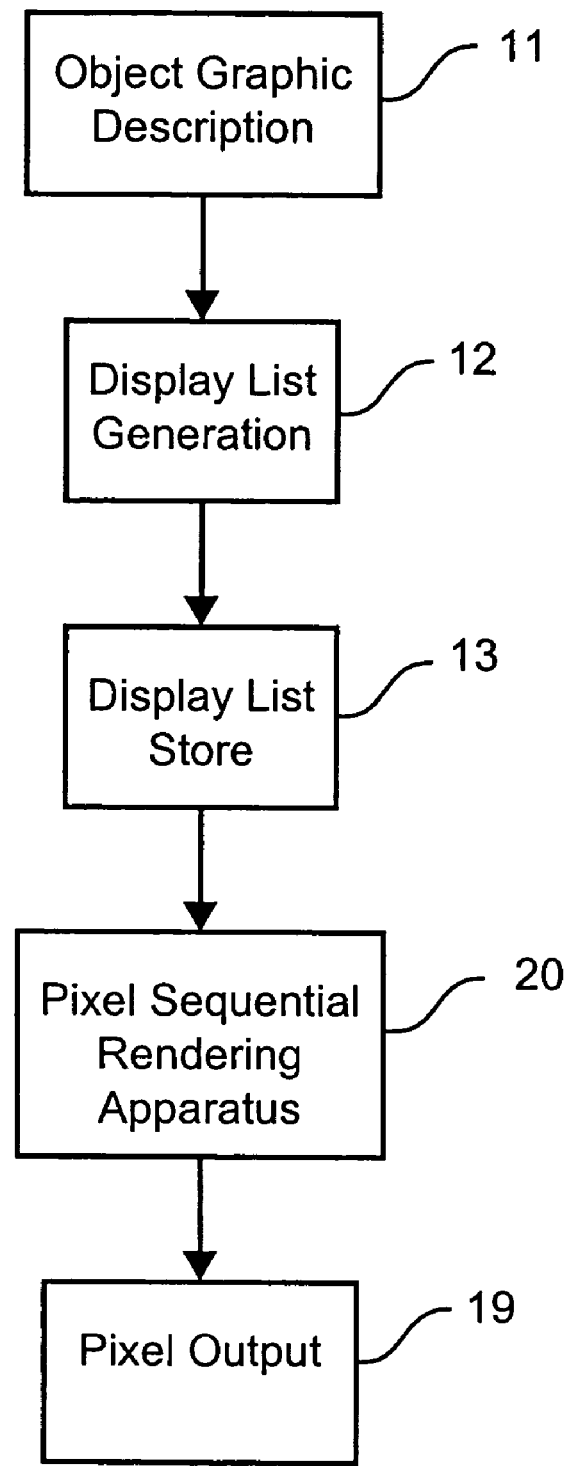
FIG. 2 is a block diagram showing the functional data flow of the rendering arrangement.

Referring now to FIG. 2, a functional data flow diagram of the rendering process is shown. The functional flow diagram of FIG. 2 commences with an object graphic description 11 which is used to describe those parameters of graphic objects in a fashion appropriate to be generated by the host processor 2 and/or, where appropriate, stored within the system RAM 3 or derived from the system ROM 6, and which may be interpreted by the pixel sequential rendering apparatus 20 to render therefrom pixel-based images. For example, the object graphic description 11 may incorporate objects with edges in a number of formats including straight edges (simple vectors)

that traverse from one point on the display to another, or an orthogonal edge format where a two-dimensional object is defined by a plurality of edges including orthogonal lines. Further formats, where objects are defined by continuous curves are also appropriate and these can include quadratic polynomial fragments where a single curve may be described by a number of parameters which enable a quadratic based curve to be rendered in a single output space without the need to perform multiplications. Further data formats such as cubic splines and the like may also be used. An object may contain a mixture of many different edge types. Typically, common to all formats are identifiers for the start and end of each line (whether straight or curved) and typically, these are identified by a scan line number thus defining a specific output space in which the curve may be rendered.

For example, FIG. 16A shows a prior art edge description of an edge 600 that is required to be divided into two segments 601 and 602 in order for the segments to be adequately described and rendered. This arises because the prior art edge description, whilst being simply determined through a quadratic expression, could not accommodate an inflexion point 604. Thus the edge 600 was dealt with as two separate edges having end points 603 and 604, and 604 and 605 respectively. FIG. 16B shows a cubic spline 610 that is described by end-points 611 and 612, and control points 613 and 614. This format requires determination of a cubic polynomial for render purposes and thus is expensive of computational time.

FIGS. 16C and 16D show examples of edges applicable to the described arrangement. An edge is considered as a single entity and if necessary, is partitioned to delineate sections of the edge that may be described in different formats, a specific goal of which is to ensure a minimum level of complexity for the description of each section.

In FIG. 16C, a single edge 620 is illustrated spanning between scanlines A and M. An edge is described by a number of parameters including start_x, start_y, one or more segment descriptions that include an address that points to the next segment in the edge, and a finish segment used to terminate the edge. Preferably, the edge 620 may be described as having three step segments, a vector segment, and a quadratic segment. A step segment is simply defined as having an x-step value and a y-step value. For the three step segments illustrated, the segment descriptions are [0,2], [+2,2], and [+2,0]. Note that the x-step value is signed thereby indicating the direction of the step, whilst the y-step value is unsigned as such is always in a raster scan direction of increasing scanline value. The next segment is a vector segment which typically requires parameters start_x (X), start_y (Y), num_of_scanlines (NY) and slope (DX). In this example, because the vector segment is an intermediate segment of the edge 620, the start_x and start_y may be omitted because such arise from the preceding segment(s). The parameter num_of_scanlines (NY) indicates the number of scanlines the vector segment lasts. The slope value (DX) is signed and is added to the X-value of a preceding scanline to give the X-value of the current scanline, and in the illustrated case, DX=+1. The next segment is a quadratic segment which has a structure corresponding to that of the vector segment, but also a second order value (DDX) which is also signed and is added to DX to alter the slope of the segment.

FIG. 16D shows an example of a cubic curve which includes a description corresponding to the quadratic segment save for the addition of a signed third-order value (DDDX), which is added to DDX to vary the rate of change of slope of the segment. Many other orders may also be implemented. It will be apparent from the above that the ability to handle plural data formats describing edge segments allows for simplification of edge descriptions and evaluation, without reliance on complex and computationally expensive mathematical operations. In contrast, in the prior art system of FIG. 16A, all edges, whether orthogonal, vector or quadratic were required to be described by the quadratic form.

The operation of the rendering arrangement will be described with reference to the example of rendering an image 78 shown in FIG. 8A which is seen to include two graphical objects, in particular, a partly transparent blue-colored triangle 80 rendered on top of and thereby partly obscuring an opaque red colored rectangle 90. As seen, the rectangle 90 includes side edges 92, 94, 96 and 98 defined between various pixel positions (X) and scan line positions (Y). Because the edges 96 and 98 are formed upon the scan lines (and thus parallel therewith), the actual object description of the rectangle 90 can be based solely upon the side edges 92 and 94, such as seen in FIG. 9A. In this connection, edge 92 commences at pixel location (40,35) and extends in a raster direction down the screen to terminate at pixel position (40,105). Similarly, the edge 94 extends from pixel position (160,35) to position (160,105). The horizontal portions of the rectangular graphic object 90 may be obtained merely by scanning from the edge 92 to the edge 94 in a rasterised fashion.

The blue triangular object 80 however is defined by three object edges 82, 84 and 86, each seen as vectors that define the vertices of the triangle. Edges 82 and 84 are seen to commence at pixel location (100,20) and extend respectively to pixel locations (170,90) and (30,90). Edge 86 extends between those two pixel locations in a traditional rasterised direction of left to right. In this specific example because the edge 86 is horizontal like the edges 96 and 98 mentioned above, it is not essential that the edge 86 be defined. In addition to the starting and ending pixel locations used to describe the edges 82 and 84, each of these edges will have associated therewith the slope value in this case +1 and −1 respectively.

Returning to FIG. 2, having identified the data necessary to describe the graphic objects to be rendered, the graphic system 1 then performs an edge conversion step 12 to generate a display list.

Figure 3:
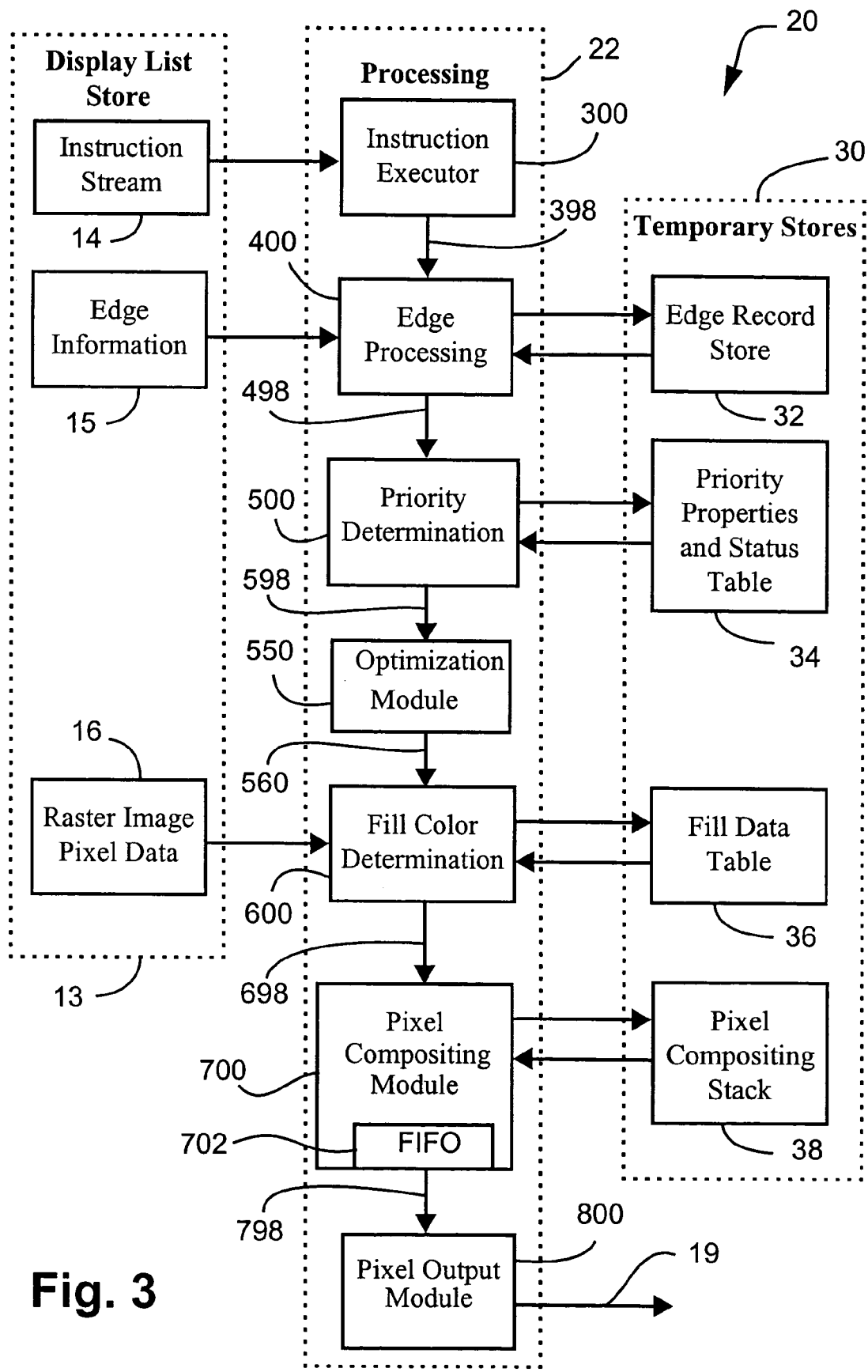
FIG. 3 is a schematic block diagram representation of the pixel sequential rendering apparatus of FIG. 2 and associated display list and temporary stores.

The edge conversion step 12 is preferably implemented as part of the software driver executing on the host processor 2 with attached ROM 6 and RAM 3. The edge conversion step 12 converts an object graphics description, expressed in any one or more of the well known graphic description languages, graphic library calls, or any other application specific format, into a display list. The display list is typically written into a display list store 13, generally formed within the RAM 4 but which may alternatively be formed within the temporary rendering stores 30. As seen in FIG. 3, the display list store 13 can include a number of components, one being an instruction stream 14, another being edge information 15 and where appropriate, raster image pixel data 16.

The instruction stream 14 includes code interpretable as instructions to be read by the pixel sequential rendering apparatus 20 to render the specific graphic objects desired in any specific image. For the example of the image shown in FIG. 8, the instruction stream 14 may be of the form of:

(1) render (nothing) to scan line 20;

(2) at scan line 20 add two blue edges 82 and 84;

(3) render to scan line 35;

(4) at scan line 35 add two red edges 92 and 94; and (5) render to completion.

Similarly, the edge information 15 for the example of FIG. 8 may include the following:
  (i) edge 84 commences at pixel position 100, edge 82 commences at pixel position 100;
  (ii) edge 92 commences at pixel position 40, edge 94 commences at pixel position 160;
  (iii) edge 84 runs for 70 scan lines, edge 82 runs for 70 scanlines;
  (iv) edge 84 has slope=−1, edge 84 has slope=+1;
  (v) edge 92 has slope=0 edge 94 has slope=0.
  (vi) edges 92 and 94 each run for 70 scanlines.

The edge information 15 is preferably stored in an integer Y-value skip list configured with RAM 4. Alternatively, any other suitable data structure may be used such as a balance binary tree. Edges starting at the same scan line position (Y), are grouped together within such a skip list and sorted in an ascending X-value order. Preferably, one integer Y-value is stored for edges starting at the same scan-line position It will be appreciated from the above example of the instruction stream 14 and edge information 15 and the manner in which each are expressed, that in the image 78 of FIG. 8, the pixel position (X) and the scanline position (Y) define a single 2-dimensional output space in which the image 78 is rendered. Other output space configurations however can be realised using the principles of the present disclosure.

Figures 8A, 8B:
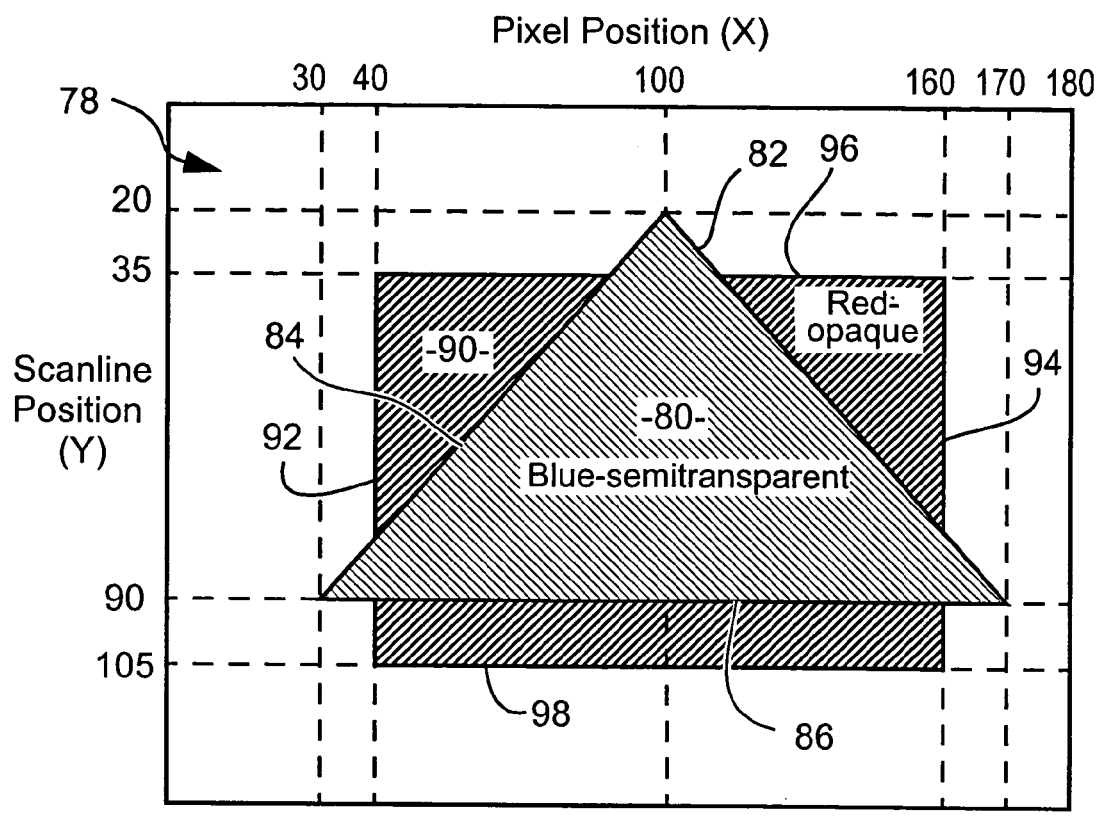
FIG. 8A shows a two-object image used as an example for explaining the operation of the rendering arrangement.
FIG. 8B shows a table of a number of edge records of the two-object image shown in FIG. 8A.
Figure 9A:
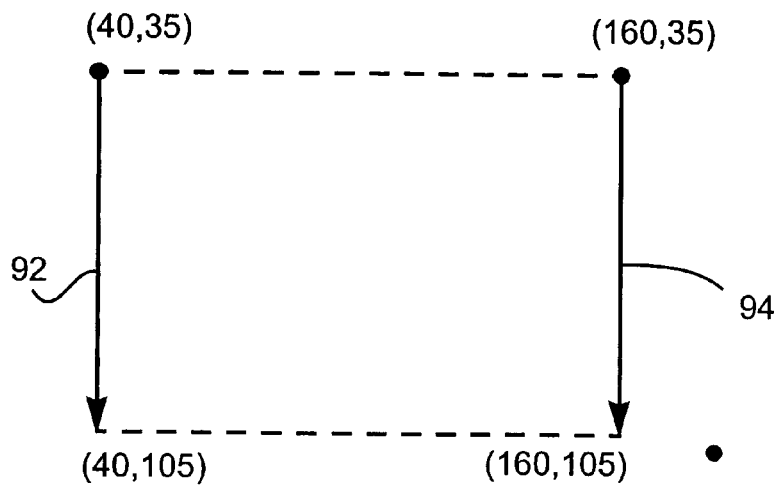
FIGS. 9A and 9B show the vector edges of the objects of FIG. 8A.

FIG. 8A includes no raster image pixel data and hence none need be stored in the store portion 16 of the display list 13, although this feature will be described later.

Figure 25:
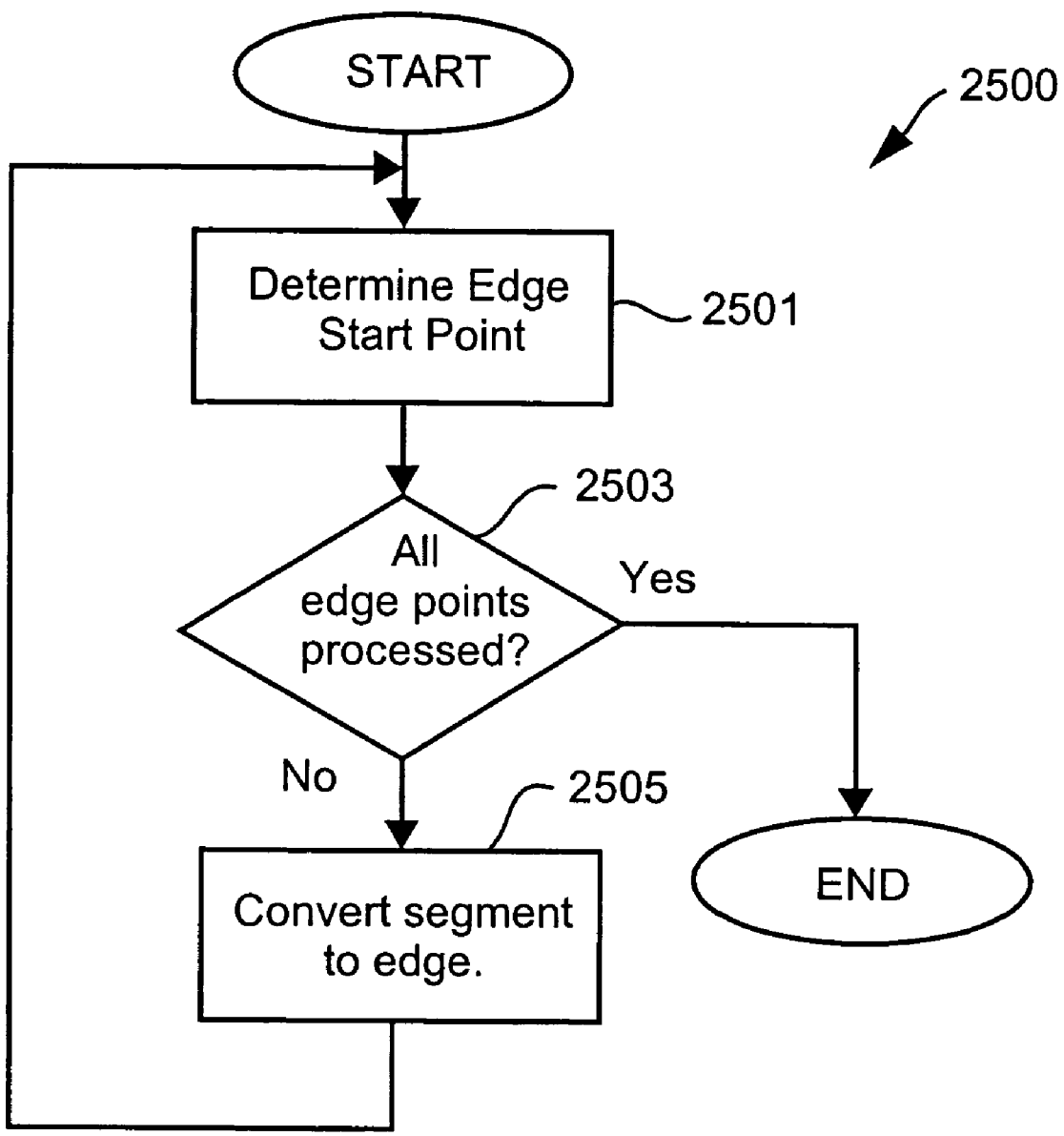
FIG. 25 is a flow diagram showing a method of converting a monotonic curve into an edge.

FIG. 25 is a flow diagram showing a method 2500 of converting a monotonic curve into an edge, as executed during the edge conversion step 12. As described herein, the resulting edge is in 28.4 fixed point format. The method 2500 is preferably implemented as one or more software modules forming the software driver described above, executing on the host processor 2 with attached ROM 6 and RAM 3.

Letting:
  Y0: an integer Y-value representing the floor of a real Y-value corresponding to a starting point of the monotonic curve;
  X0: a 28.4 fixed-point X-value representing a starting point of the monotonic curve;
  Offset: a fractional offset representing the difference between the integer edge Y-value, Y0, and the real (i.e, actual) Y-value in 28.4 fixed-point format;
  SegCount: a number of line segments in a 'Segments' array. For example if the monotonic curve has N points, then there are N−1 line segments, hence SegCount will be equal to N−1; and
  Segments: an array of SegCount line segments;

Each line segment of the monotonic curve has an associated Dx and Dy value as described below:
  Dx: a 28.4 fixed-point value representing the difference between an end X-value and a start X-value for the line segment. This Dx value is a fixed-point representation of the DX value described above, which represents the slope of a vector segment of a curve.; and
  Dy: a 28.4 fixed-point value representing the difference between an end Y-value and a current Y-value of the line segment.

For a given monotonic curve (C) increasing in the Y direction and having a number of points (N), the method 2500 begins at step 2501 where the processor 2 determines a 28.4 fixed point format number, X0, for the real X-value of the starting point of a first edge of the curve C. The processor 2 also determines the integer Y-value, Y0, corresponding to the start point of the first edge of the curve C. The integer Y-value, Y0, represents the floor of the real Y-value corresponding to the starting point of the monotonic curve and is determined by the processor 2 using the Flooring Rule described above.

Also at step 2501, the processor 2 determines an Offset value representing the difference between the integer Y-value, Y0, and the real (i.e, actual) Y-value in 28.4 fixed-point format In fixed point format, using the notation described immediately above, the start point of the first edge is represented as follows:
  Edge.SegCount=N−1
  Edge.X0=C[0].X
  Edge.Y0=FLOOR(C[0].Y)
  Edge.Offset=C[0].Y−Edge.Y0

Then at the next step 2503, if the processor 2 determines that each of the N points of the edge have not been processed, then the method 2500 proceeds to step 2505. Otherwise, the method 2500 concludes. At step 2505, the processor 2 determines the Dx and Dy fixed point values for the start point of the first edge. Following step 2505, the method 2500 then returns to step 2501 in order to process the remaining points of the edge.

Pseudo-code representing one implementation of steps 2503 and 2505 is shown below:
  FOR I=1 TO N
    Edge.Segments[I−1].Dx=C[I].X−C[I−1].X
    Edge.Segments[I−1].Dy=C[I].Y−C[I−1].Y
  ENDIF Alternatively, the edge resulting from the method 2500 can be in a different fixed point format such as 24.8 fixed point format. However, in this instance, the variables X0, Offset, Dx and Dy defined above, are also required to be in 28.4 fixed point format.

Figure 26:
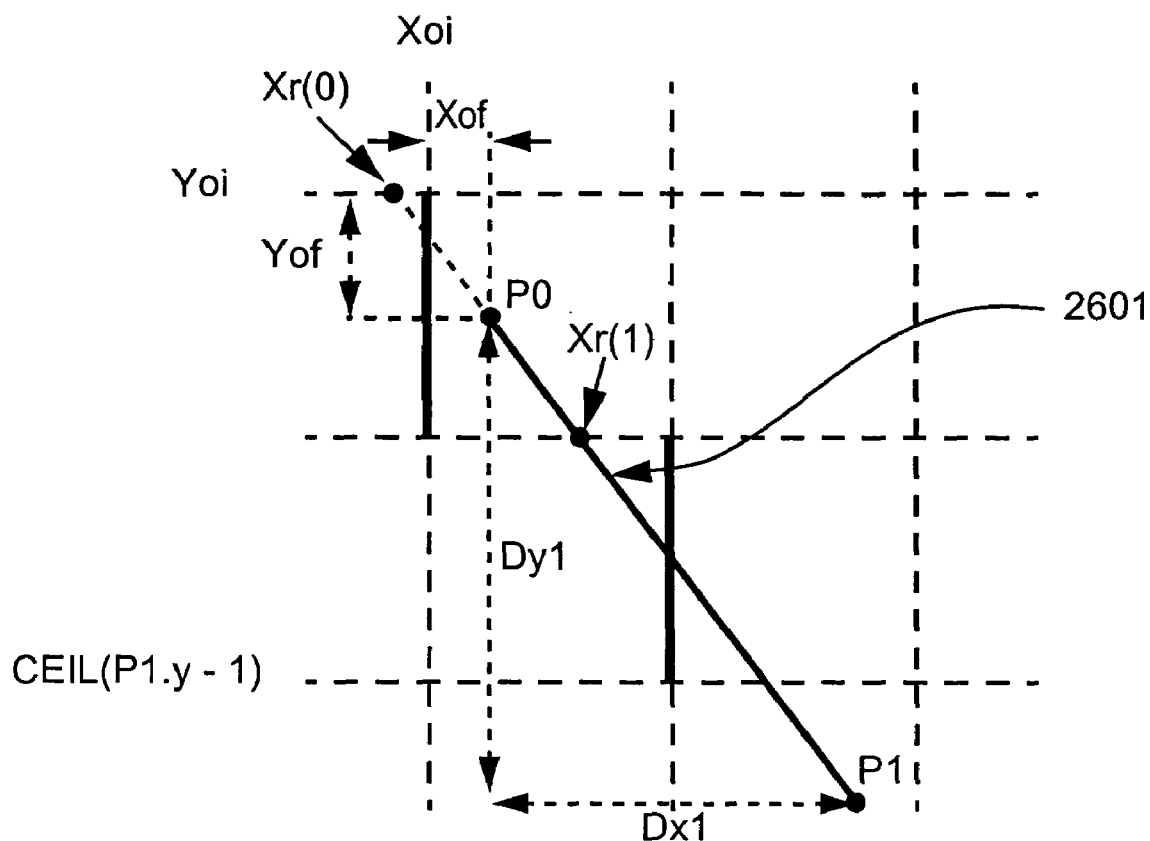
FIG. 26 shows a monotonic edge with one line segment.
Figure 27:
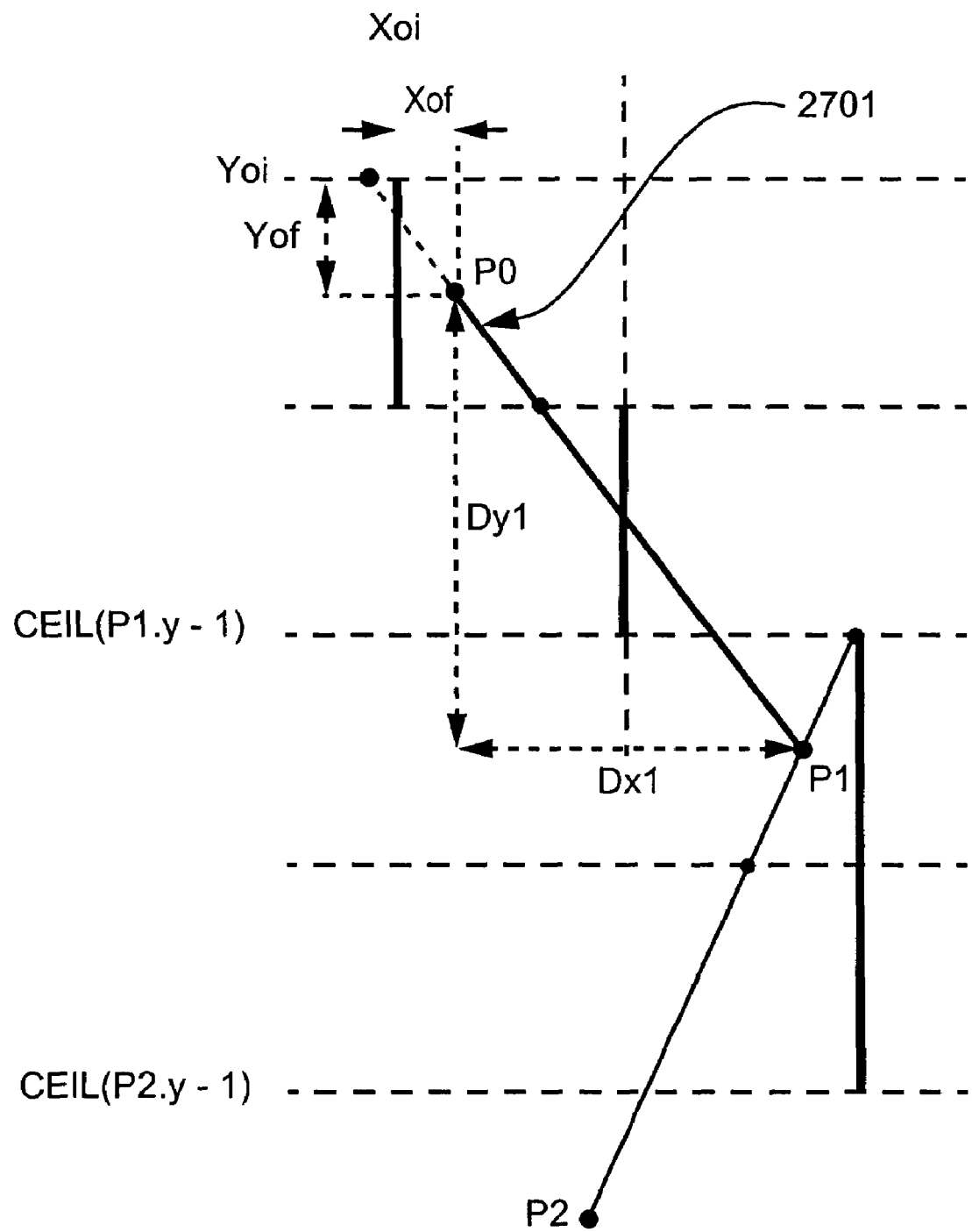
FIG. 27 shows a monotonic edge with two line segments.

As an example, FIG. 26 shows an edge 2601 with one line segment P0-P1. The corresponding values of X0, Y0, Offset, Dx and Dy for the edge determined in accordance with the method 2500 are represented as follows:
  Edge.SegCount=1
  Edge.X0=P0.x
  Edge.Y0=FLOOR(P0.y)
  Edge.Offset=P0.y−Edge.Y0
  Edge.Segments[0].Dx=P1.x−P0.x
  Edge.Segments[0].Dy=P1.y−P0.y As another example, FIG. 27 shows an edge 2701 with two line segments P0-P1, P1-P2. The corresponding edge determined in accordance with the method 2500 is represented as follows:
  Edge.SegCount=2
  Edge.X0=P0.x
  Edge.Y0=FLOOR(P0.y)
  Edge.Offset=P0.y−Edge.Y0
  Edge.Segments[0].Dx=P1.x−P0.x
  Edge.Segments[0].Dy=P1.y−P0.y
  Edge.Segments[1].Dx=P2.x−P1.x
  Edge.Segments[1].Dy=P2.y−P1.y Accordingly, for the edge 2701, the X-value, X0, the Y-value, Y0, and the Offset value representing the starting point of the edge are determined in the same manner as the starting point for the edge 2601. However, each of the segments P0-P1 and P1-P2 has different values for Dx and Dy depending on the relative slopes of the segments. Using the representation of the edge 2701 shown directly above, the original points P0, P1, and P2 can be re-constructed. For example, the real X-value, X, for the starting point P0 can be determined as P0.X=Edge.X0; and the real Y-value, Y, for the point P0 can be determined as P0.Y=Edge.Y0+Edge.Offset. Further, the real X-value, X, for the point P1 can be determined as P1.X=P0.X+Edge.Segments[0].Dx and the real Y-value, Y, for the point P1 can be determined as P1.Y=P0.Y+

Edge.Segments[0].Dy. Similarly, the real X-value, X, for the point P2 can be determined as P2.X=P1.X+Edge.Segments[1].Dx and the real Y-value, Y, for the point P2 can be determined as P2.Y=P1.Y+Edge.Segments[1].Dy Similarly, for a curve comprising N points, a point $P_n$ can be reconstructed based on the previous point $P_{n-1}$ where 1<=n<N, as follows:

(i) $P_0$.X=Edge.X0
$P_0$.Y=Edge.Y0+Edge.Offset
(ii)$P_n$.X=$P_{n-1}$.X+Edge.Segments[n-1].Dx
$P_n$.Y=$P_{n-1}$.Y+Edge.Segments[n-1].Dy The storage space required to store fixed format edge segments can be reduced by classifying the edge segments into one of three types as follows:

(i) a standard segment: describing a segment where neither Dx nor Dy are equal to zero;

(ii) a horizontal segment: describing a segment where Dy is equal to 0, and Dx is not zero; and (iii) a vertical segment: describing a segment where Dx is equal to 0, and Dy is not zero.

Therefore, for a horizontal segment, there is no requirement to store a value for Dy. Similarly, for a vertical segment, there is no requirement to store a value for Dx. Further storage space savings can be made by further classifying each of the above segment types into various fixed-point integer sizes such as: 4-bytes fixed-point, 3-bytes fixed-point, 2-bytes fixed-point, and 1-byte fixed-point depending upon the size of the Dx and Dy values.

The display list store 13 is read by a pixel sequential rendering apparatus 20. The pixel sequential rendering apparatus 20 is typically implemented as an integrated circuit and converts the display list into a stream of raster pixels which can be forwarded to another device, for example, a printer, a display, or a memory store.

Although the pixel sequential rendering apparatus 20 is described as an integrated circuit, the pixel sequential rendering apparatus 20 may be implemented as an equivalent software module executing, on a general purpose processing unit, such as the host processor 2.

FIG. 3 shows the configuration of the pixel sequential rendering apparatus 20. The pixel sequential rendering apparatus 20 comprises processing stages 22, the display list store 13 and the temporary rendering stores 30. The processing stages 22 of the pixel-sequential rendering apparatus 20 include an instruction executor 300, an edge processing module 400, a priority determination module 500, a fill color determination module 600, a pixel compositing module 700, and a pixel output module 800. The processing operations use the temporary stores 30 which, as noted above, may share the same device (eg. magnetic disk or semiconductor RAM) as the display list store 13, or may be implemented as individual stores for reasons of speed optimisation. The edge processing module 400 uses an edge record store 32 to hold edge information which is carried forward from scan-line to scan-line. The priority determination module 500 uses a priority properties and status table 34 to hold information about each priority, and the current state of each priority with respect to edge crossings while a scan-line is being rendered. The fill color determination module 600 uses a fill data table 36 to hold information required to determine the fill color of a particular priority at a particular position. The pixel compositing module 700 uses a pixel compositing stack 38 to hold intermediate results during the determination of an output pixel that requires the colors from multiple priorities to determine the value of the output pixel.

The display list store 13 and the other stores 32-38 detailed above may be implemented in RAM or any other data storage technology.

The processing steps shown in the arrangement of FIG. 3 take the form of a processing pipeline 22. In this case, the modules of the pipeline may execute simultaneously on different portions of image data in parallel, with messages passed between the modules as described below. In another arrangement, each message described below may take the form of a synchronous transfer of control to a downstream module, with upstream processing suspended until the downstream module completes the processing of the message.

3.1 Instruction Executor

The instruction executor 300 reads and processes instructions from the instruction stream 14 and formats the instructions into messages that are transferred via an output 398 to the other modules 400, 500, 550, 600 and 700 within the pipeline 22. Preferably, the instruction stream 13 may include the following instructions:

LOAD_PRIORITY_PROPERTIES: This instruction is associated with data to be loaded into the priority properties and status table 34, and an address in that table to which the data is to be loaded. When this instruction is encountered by the instruction executor 300, the instruction executor 300 issues a message for the storage of the data in the specified location of the priority properties and status table 34. This may be accomplished by formatting a message containing this data and passing the message down the processing pipeline 22 to the priority determination module 500 which performs the store operation.

LOAD_FILL_DATA: This instruction is associated with fill data associated with an object to be loaded into the fill data table 36, and an address in that table to which the data is to be loaded. When this instruction is encountered by the instruction executor 300, the instruction executor 300 issues a message for the storage of the data at the specified address of the fill data table 36. This may be accomplished by formatting a message containing this data and passing the message down the processing pipeline 22 to the fill color determination module which performs the store operation.

LOAD_NEW_EDGES_AND_RENDER: This instruction is associated with an address in the display list store 13 of new edges 15 which are to be introduced into the rendering process when a next scanline is rendered. When this instruction is encountered by the instruction executor 300, the instruction executor 300 formats a message containing this data and passes the message to the edge processing module 400. The edge processing module 400 stores the address of the new edges in the edge record store 32. The edges at the specified address are sorted based on their initial scanline intersection coordinate before the next scanline is rendered. In one arrangement, the edges are sorted by the edge conversion process 12. In another arrangement, the edges are sorted by the pixel-sequential rendering apparatus 20.

SET_SCANLINE_LENGTH: This instruction is associated with a number of pixels which are to be produced in each rendered scanline. When this instruction is encountered by the instruction executor 300, the instruction executor 300 passes the value to the edge processing module 400 and the pixel compositing module 700.

SET_OPACITY_MODE: This instruction is associated with a flag, which indicates whether pixel compositing operations will use an opacity channel, also known in the art as an alpha or transparency channel. When this instruction is encountered by the instruction executor 300, the instruction executor 300 passes the flag value in the pixel compositing module 700.

SET_BUF: This instruction sets the address of external memory buffers used by the pixel sequential rendering apparatus 20. Preferably, at least the input, output and spill buffers of the edge processing module 400 are stored in external memory.

The instruction executor 300 is typically formed by a microcode state machine that maps instructions and decodes the mapped instructions into pipeline operations for passing to the various modules. A corresponding software process may alternatively be used.

3.2 Edge Processing Module

Figure 4:
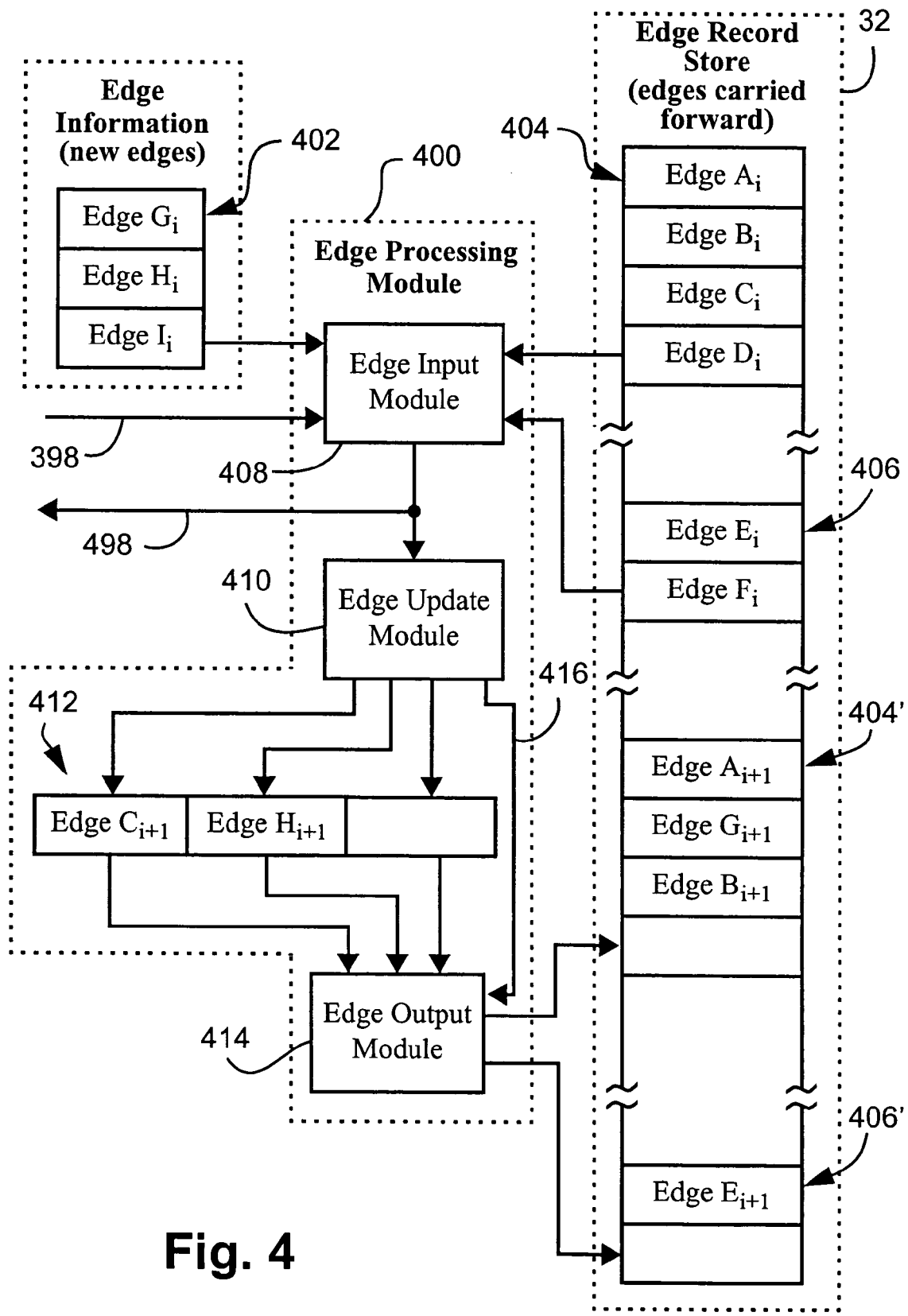
FIG. 4 is a schematic functional representation of the edge processing module of FIG. 3.

The operation of the edge processing module 400 during a scanline render operation will now be described with reference to FIG. 4. The initial conditions for the rendering of a scanline is the availability of three lists of edge records. Any or all of these lists may be empty. These lists are a new edge list 402, obtained from the edge information 15 and which contains new edges as set by the LOAD_NEW_EDGES_AND_RENDER instruction, a main edge list 404 which contains edge records carried forward from the previous scanline, and a spill edge list 406 which also contains edge records carried forward from the previous scanline. As described above, the new edge list information 15 is preferably stored in an integer Y-value skip list configured with RAM 4. Alternatively, another data structure can be used such as balance binary tree. The edges stored in the new edge list 402 are stored such that edges starting at the same scan line position (Y), are grouped together within the list 402 and sorted in an ascending X-value order. Preferably, only one Y-value is stored for all edges starting at the same scan-line position (Y).

Figure 12A:
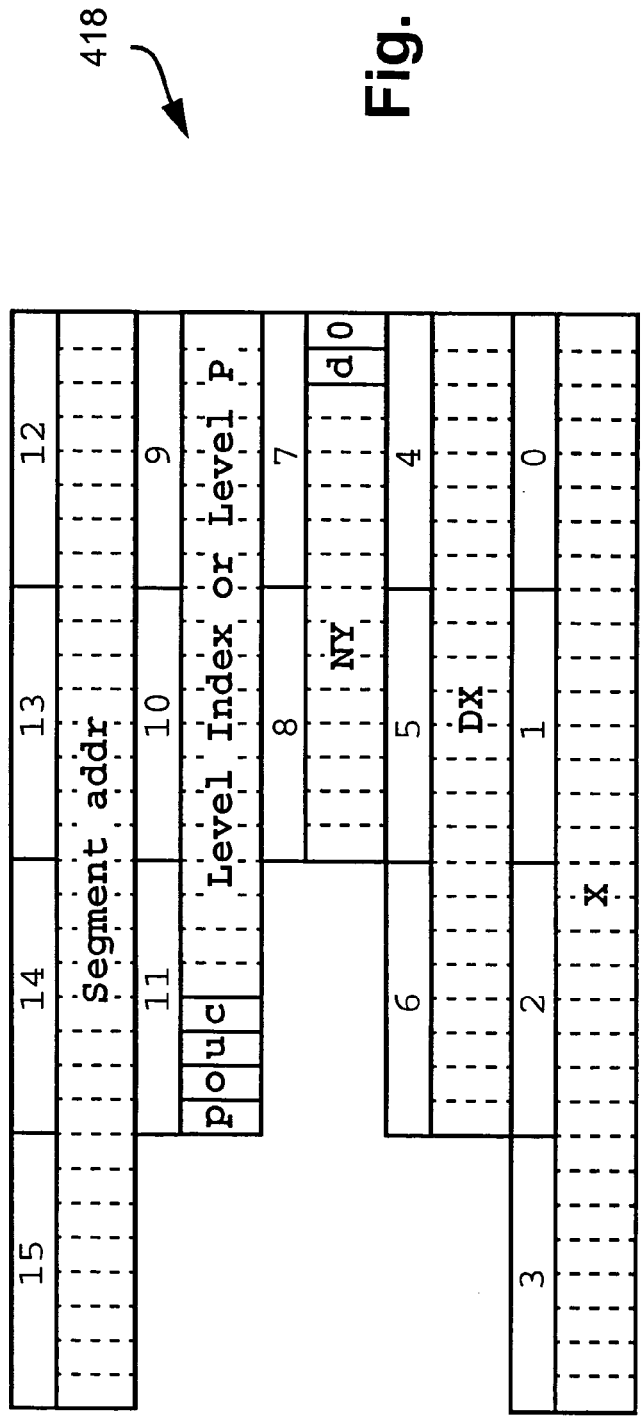
FIG. 12A shows the format of an active edge record created by the edge processing module of FIG. 4.

Turning now to FIG. 12A, there is shown the data format of such an edge record, which may include:

(i) a current scanline intersection coordinate (referred to here as the X-value), (ii) a count (referred to herein as NY) of how many scanlines a current segment of this edge will last for (in some arrangements this may be represented as a Y limit), (iii) a value to be added to the X coordinate of this edge record after each scanline (referred to here as the DX), (iv) a priority level number (P) or an index (P) to a list of priority numbers, (v) an address (addr) of a next edge segment in the list; and (vi) a number of flags, marked p, o, u, c and d. The flag d determines whether the edge effects the clipping counter or the fill counter. The flag u determines whether the fill counter is incremented or decremented by the edge. The remaining flags are not significant in the rendering process and need not be described.

Such a data format may accommodate vectors, and orthogonally arranged edges. The format may also include a further parameter herein called DDX, which is a value to be added to the DX value of this edge record after each scanline. The latter enables the rendering of edges describing quadratic curves. The addition of further parameters, DDDX for example, may allow such an arrangement to accommodate cubic curves. In some applications, such as cubic Bezier spline, a 6-order polynomial (ie: up to DDDDDDX) may be required. The flag (u) indicates whether a winding count is to be incremented or decremented by an edge. The winding count is stored in a fill counter and is used to determine whether a currently scanned pixel is inside or outside the object in question.

In the example of the edges 84 and 94 of FIG. 8A, the corresponding edge records at scanline 20 may read as shown in the table of FIG. 8B.

Preferably, each edge list contains zero or more records placed contiguously in memory. Other storage arrangements, including the use of pointer chains, are also possible. The records in each of the three lists 402, 404 and 406 are arranged in order of scanline intersection, this being the X-value. This is typically obtained by a sorting process, initially managed by an edge input module 408 which receives messages, including edge information, from the instruction executor 300. It is possible to relax the sort to only regard the integral portion of each scanline intersection X-value as significant. It is also possible to relax the sort further by only regarding each scanline intersection X-value, clamped to the minimum and maximum X-values which are being produced by the current rendering process. Where appropriate, the edge input module 408 relays messages to modules 500, 600 and 700 downstream in the pipeline 22 via an output 498.

The edge input module 408 maintains references into, and receives edge data from, each of the three lists 402, 404, and 406. Each of these references is initialised to refer to the first edge in each list at the start of processing of a scanline. Thereafter, the edge input module 408 selects an edge record from one of the three referenced edge records such that the record selected is the one with the least X-value out of the three referenced records. If two or more of the X-value records are equal, each is processed in any order and the corresponding edge crossings output in the following fashion. The reference, which was used to select that record, is then advanced to the next record in that list. The edge just selected is formatted into a message and sent to an edge update module 410. Also, certain fields of the edge, in particular the current X, the priority numbers, and the direction flag, are formatted into a message which is forwarded to the priority determination module 500 via an output 498 of the edge processing module 400. Arrangements that use more or fewer lists than those described here are also possible.

Upon receipt of an edge, the edge update module 410 decrements the count of how many scanlines for which a current segment will last. If that count has reached zero, a new segment is read from the address indicated by the next segment address. A segment preferably specifies:

(i) a value to add to the current X-value immediately the segment is read, (ii) a new DX value for the edge, (iii) a new DDX value for the edge, and (iv) a new count of how many scanlines for which the new segment will last.

If there is no next segment available at the indicated address, no further processing is performed on that edge. Otherwise, the edge update module 410 calculates the X-value for the next scanline for the edge. This typically involves taking the current X-value and adding the DX value to the current X-value. The DX may have the DDX value added to it, as appropriate for the type of edge being handled. The edge is then written into any available free slot in an edge pool 412, which is an array of two or more edge records. If there is no free slot, the edge update module 410 waits for a slot to become available. Once the edge record is written into the edge pool 412, the edge update module 410 signals via a line 416 to an edge output module 414 that a new edge has been added to the edge pool 412.

As an initial condition for the rendering of a scanline, the edge output module 414 has references to each of a next main edge list 404' and a next spill edge list 406'. Each of these references is initialised to the location where the, initially empty, lists 404' and 406' may be built up. Upon receipt of the signal 416 indicating that an edge has been added to the edge pool 412, the edge output module 414 determines whether or not the edge just added has a lesser X-value than the edge last written to the next main edge list 404' (if any). If this is true, a "spill" is said to have occurred because the edge cannot be appended to the main edge list 404 without violating the ordering criteria of the main edge list 404. When a spill occurs, the edge is inserted into the next spill edge list 406', preferably in a manner that maintains a sorted next spill edge list 406'. For example this may be achieved using an insertion sorting routine. In some arrangements the spills may be triggered by other conditions, such as excessively large X-values.

If the edge added to the edge pool 412 has an X-value greater than or equal to the edge last written to the next main edge list 404' (if any), and there are no free slots available in the edge pool 412, the edge output module 414 selects the edge from the edge pool 412 which has the least X-value, and appends that edge to the next main edge list 404', extending the next main edge list 404' in the process. The slot in the edge pool 412 that was occupied by that edge is then marked as free.

Once the edge input module 408 has read and forwarded all edges from all three of input lists 402, 404 and 406, the edge input module 408 formats a message which indicates that the end of a scanline has been reached and sends the message to both the priority determination module 500 and the edge update module 410. Upon receipt of that message, the edge update module 410 waits for any processing currently being performed to complete, then forwards the message to the edge output module 414. Upon receipt of the message, the edge output module 414 writes all remaining edge records from the edge pool 412 to the next main edge list 404' in X-value order. Then, the reference to the next main edge list 404' and the main edge list 404 are exchanged between the edge input module 408 and the edge output module 414, and a similar exchange is performed for the next spill edge list 406' and the spill edge list 406. In this way the initial conditions for the following scanline are established.

Rather than sorting the next spill edge list 406' upon insertion of edge records thereto, such edge records may be merely appended to the list 406', and the list 406' sorted at the end of the scanline and before the exchange to the current spill list 406 becomes active in edge rasterisation of the next scanline.

It can be deduced from the above that edge crossing messages are sent to the priority determination module 500 in scanline and pixel order (i.e., the edge crossing messages are ordered firstly on Y-value and then on X-value) and that each edge crossing message is labeled with the priority level to which the particular edge crossing message applies.

FIG. 12A depicts a specific structure of an active edge record 418 that may be created by the edge processing module 400 when a segment of an edge is received. If the first segment of the edge is a step (orthogonal) segment, the X-value of the edge is added to a variable called "X-step" for the first segment to obtain the X position of the activated edge. Otherwise, the X-value of the edge is used.

The X-step value is obtained from the segment data of the edge and is added once to the X edge value of the next segment to obtain the X position of the edge record for that next segment. This means that the edges in the new edge record will be sorted by Xedge+Xstep. The X-step of the first segment may, therefore, be zero, in order to simplify sorting the edges. The Y-value of the first segment is loaded into the NY field of the active edge record 418. The DX field of the active edges copied from the DX field identifier of vector or quadratic segments, and is set to zero for a step segment. A u-flag as seen in FIG. 12A is set if the segment is upwards heading (see the description relating to FIG. 13A). A d-flag is set when the edge is used as a direct clipping object, without an associated clipping level, and is applicable to closed curves. The actual priority level of the segment, or a level address is copied from the corresponding field of the new edge record into a level field in the active edge record 418. The address of the next segment in the segment list is copied from the corresponding field of the new edge record into a segment address field (segment addr) of the active edge record 418. The segment address may also be used to indicate the termination of an edge record.

It will be appreciated from FIG. 12A that other data structures are also possible, and necessary for example where polynomial implementations are used. In one alternative data structure, the 'segment addr' field is either the address of the next segment in the segment list or copied from the segments DDX value, if the segment is quadratic. In the latter case, the data structure has a q-flag which is set if the segment is a quadratic segment, and cleared otherwise. In a further variation, the segment address and the DDX field may be separated into different fields, and additional flags provided to meet alternate implementations.

Figure 12B:
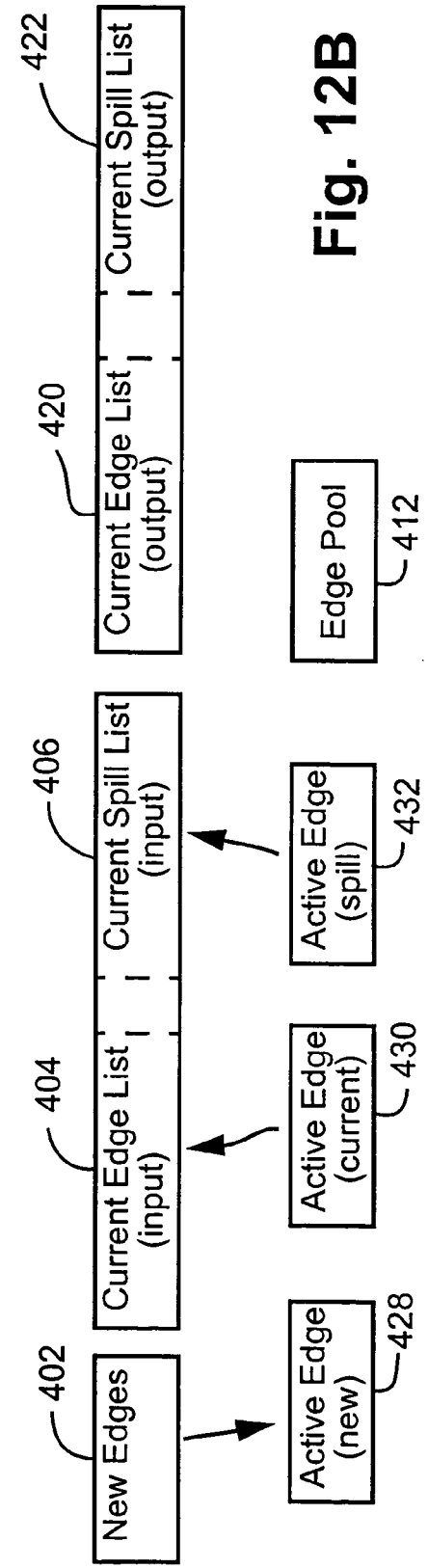
FIG. 12B shows the arrangement of the edge records used in the edge processing module of FIG. 4.

FIG. 12B depicts the arrangement of the edge records described above and used in the edge processing module 400. A new active edge record 428, a current active edge record 430 and a spill active edge record 432, supplements the edge pool 412. As seen in FIG. 12B, the records 402, 404, 406, 404' and 406' are dynamically variable in size depending upon the number of edges being rendered at any one time. Each record includes a limit value which, for the case of the new edge list 402, is determined by a SIZE value incorporated with the LOAD_EDGES_AND_RENDER instruction. When such an instruction is encountered, SIZE is checked and if non-zero, the address of the new edge record is loaded and a limit value is calculated which determines a limiting size for each of the lists 402, 404, 406, 404' and 406'.

Although the described arrangement utilizes arrays and associated pointers for the handling of edge records, other implementations, such as linked lists for example may be used. These other implementations may be hardware or software-based, or combinations thereof.

Figure 10:
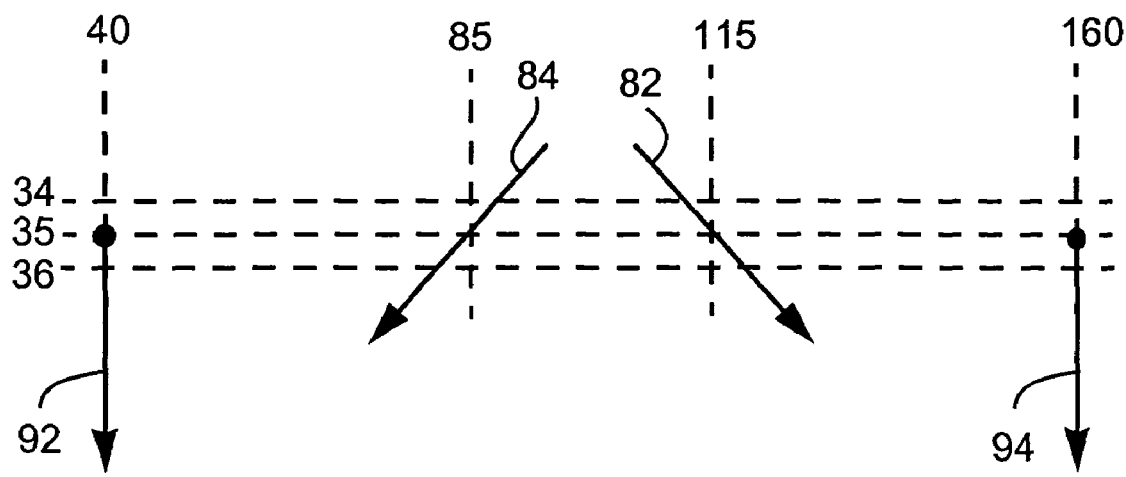
FIG. 10 shows the rendering of a number of scan lines of the image of FIG. 8A.
Figure 11:
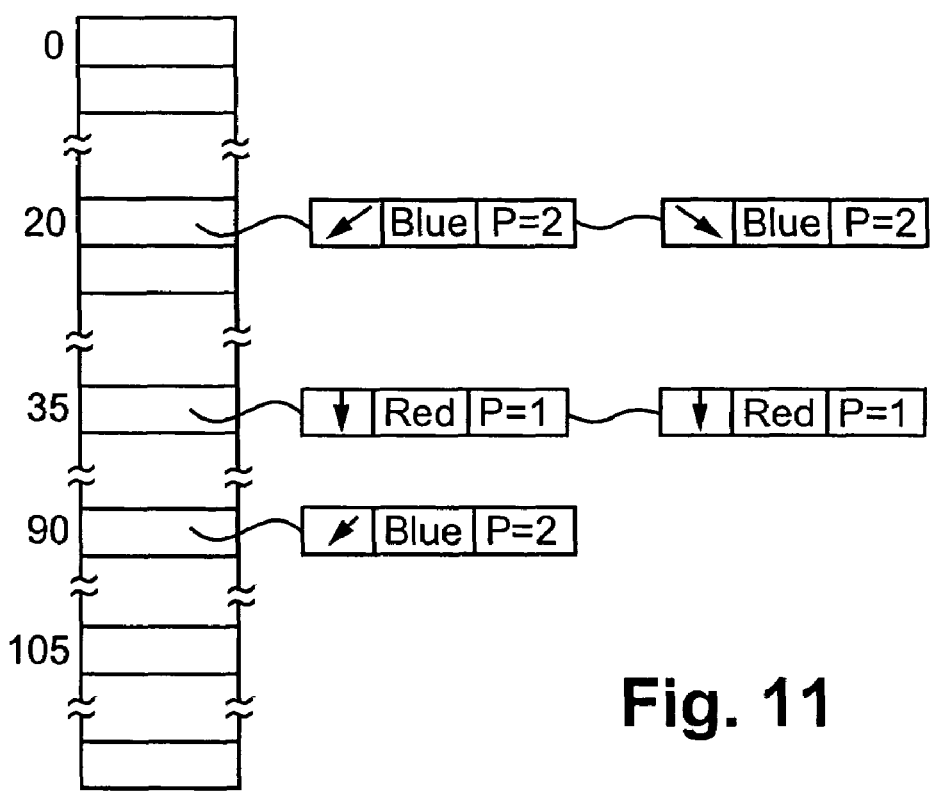
FIG. 11 shows the arrangement of an edge record for the image of FIG. 8A.

The specific rendering of the image 78 shown in FIG. 8A will now be described with reference to scanlines 34, 35 and 36 shown in FIG. 10. In this example, the calculation of the new X-value for the next scanline is omitted for the purposes of clarity, with FIGS. 12C to 12I illustrating the output edge crossing being derived from one of the registers 428, 430 and 432 of the edge poll 412.

FIG. 12C illustrates the state of the lists noted above at the end of rendering scanline 34 (the top portion of the semi-transparent blue triangle 80). Note that in scanline 34 there are no new edges and hence the list 402 is empty. Each of the main edge lists 404 and next main edge list 404' include only the edges 82 and 84. Each of the lists includes a corresponding pointer 434, 436, and 440 which, on completion of scanline 34, points to the next vacant record in the corresponding list. Each list also includes a limit pointer 450, denoted by an asterisk (*) which is required to point to the end of the corresponding list. If linked lists were used, such would not be required as linked lists include null pointer terminators that perform a corresponding function.

As noted above, at the commencement of each scanline, the next main edge list 404' and the main edge list 404 are swapped and new edges are received into the new edge list 402. The remaining lists are cleared and each of the pointers set to the first member of each list. For the commencement of scanline 35, the arrangement then appears as seen in FIG. 12D. As is apparent from FIG. 12D, the records include four active edges which, from FIG. 10, are seen to correspond to the edges 92, 94, 84 and 82.

Referring now to FIG. 12E, when rendering starts, the first segment of the new edge record 402 is loaded into an active edge record 428 and the first active edge records of the main edge list 404 and spill edge list 406 are copied to records 430 and 432 respectively. In this example, the spill edge list 406 is empty and hence no loading takes place. The X-positions of the edges within the records 428, 430 and 432 are then compared and an edge crossing is emitted for the edge with the smallest X-position. In this case, the emitted edge is that corresponding to the edge 92 which is output together with an associated priority value. The pointers 434, 436 and 438 are then updated to point to the next record in the list.

The edge for which the edge crossing was emitted is then updated (in this case by adding DX=0 to the position of the edge), and buffered to the edge pool 412 which, in this example, is sized to retain three edge records. The next entry in the list from which the emitted edge arose (in this case list 402) is loaded into the corresponding record (in this case record 428). This is seen in FIG. 12F.

Further, as is apparent from FIG. 12F, a comparison between the registers 428, 430 and 432 again selects the edge with the least X-value which is output as the appropriate next edge crossing (X=85, P=2). Again, the selected output edge is updated and added to the edge pool 412 and all the appropriate pointers incremented. In this case, the updated value is given by X←X+DX, which is evaluated as 84=85−1. Also, as seen, the new edge pointer 434 is moved, in this case, to the end of the new edge list 402.

Figure 12G:
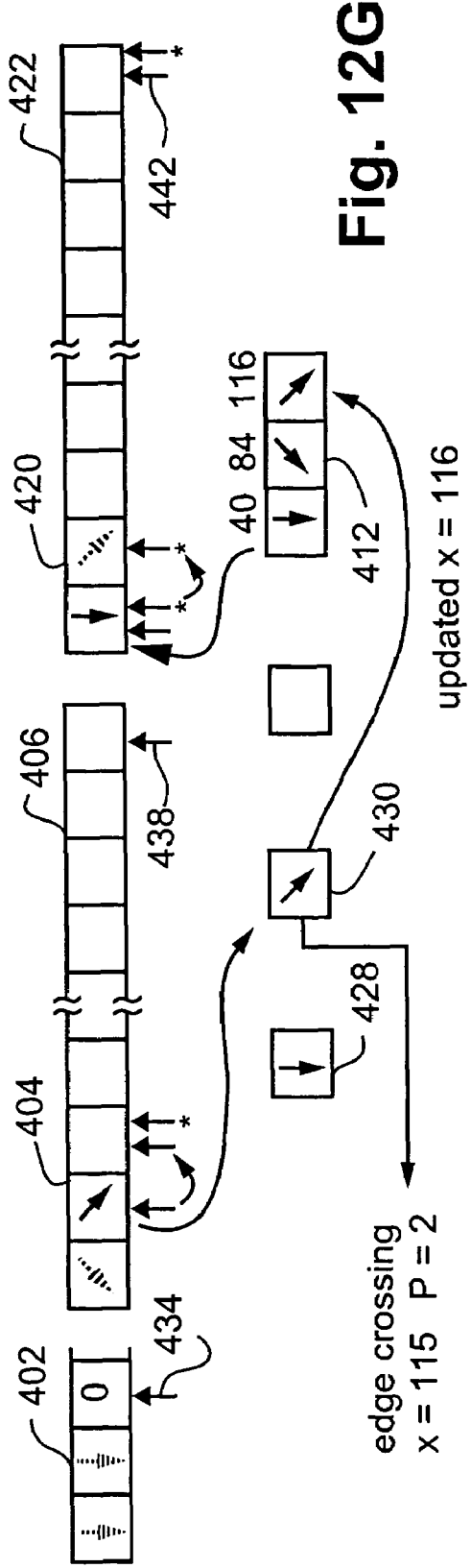

In FIG. 12G, the next edge identified with the lowest current X-value is again that obtained from the register 430 which is output as an edge crossing (X=115, P=2). Updating of the edge again occurs with the value be added to the edge pool 412 as shown. At this time, it is seen that the edge pool 412 is now full and from which the edge with the smallest X-value is selected and emitted to the output list 404', and the corresponding limited pointer moved accordingly.

Figure 12H:
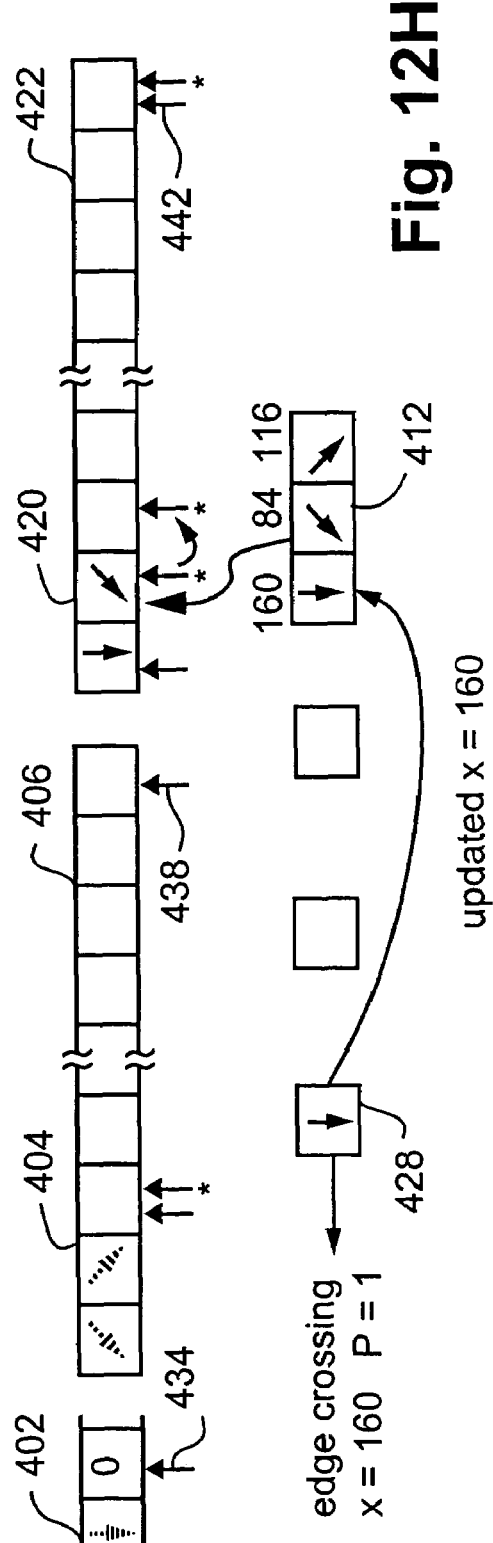

As seen in FIG. 12H, the next lowest edge crossing is that from the register 428 which is output (X=160 P=1). The edge pool 412 is again updated and the next small X-value emitted to the output list 404'.

At the end of scanline 35, and as seen in FIG. 12I, the contents of the edge pool 412 are flushed to the output list 404' in order of smallest X-value. As seen in FIG. 12J, the next main edge list 404' and the main edge list 404 are swapped by exchanging their pointers in anticipation of rendering the next scanline 36. After the swapping, it is seen from FIG. 12J that the contents of the main edge list 404 include all edges current on scanline 36 arranged in order of X-value thereby permitting convenient access of the edges which facilitates fast rendering.

Ordinarily, new edges are received by the edge processing module 400 in order of increasing X-value. When a new edge arrives, the position of the new edge is updated (calculated for the next scanline to be rendered) and this determines further action as follows:
 (a) if the updated position is less than the last X-position output on the line 498, the new edge is insertion sorted into the main spill list 406 and the corresponding limit register updated;
 (b) otherwise, if there is space, the new edge is retained in the edge pool 412.

As is apparent from the foregoing, the edge pool 412 aids in the updating of the lists in an ordered manner in anticipation of rendering the next scanline in the rasterised image. Further, the size of the edge pool 412 may be varied to accommodate larger numbers of non-ordered edges. However, it will be appreciated that in practice the edge pool 412 will have a practical limit, generally dependent upon processing speed and available memory with the graphic processing system. In a limiting sense, the edge pool 412 may be omitted which would ordinarily require the updated edges to be insertion sorted into the next output edge list 404'. However, this situation can be avoided as a normal occurrence through the use of the spill lists mentioned above. The provision of the spill lists allows the described arrangement to be implemented with an edge pool of practical size and yet handle relatively complex edge intersections without having to resort to software intensive sorting procedures. In those small number of cases where the edge pool and spill list are together insufficient to accommodate the edge intersection complexity, sorting methods may be used.

Figure 14A:
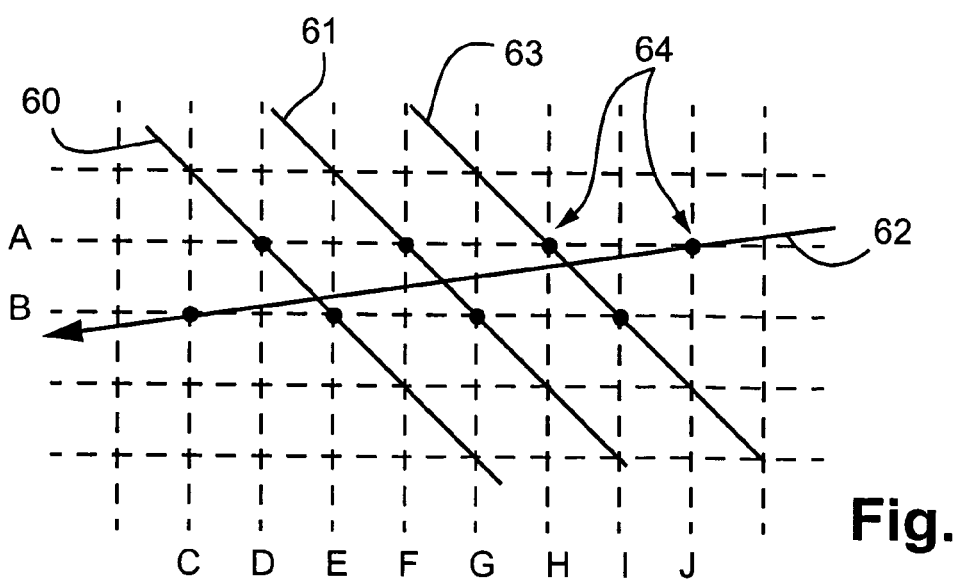

An example of where the spill list procedure is utilised is seen in FIG. 14A where three arbitrary edges 60, 61 and 63 intersect an arbitrary edge 62 at a relative position between scanlines A and B. Further, the actual displayed pixel locations 64 for each of scanlines A, B, are shown which span pixel locations C to J. In the above described example where the edge pool 412 is sized to retain three edge records, it will be apparent that such an arrangement alone will not be sufficient to accommodate three edge intersections occurring between adjacent scanlines as illustrated in FIG. 14A.

FIG. 14B shows the state of the edge records after rendering the edges 60, 61 and 63 on scanline. The edge crossing H is that most recently emitted and the edge pool 412 is full with the updated X-values E, G and I for the edges 60, 61 and 63 respectively for the next scanline, scanline B. The edge 62 is loaded into the current active edge record 430 and because the edge pool 412 is full, the lowest X-value, corresponding to the edge 60 is output to the output edge list 404'.

In FIG. 14C, the next edge crossing is emitted (X=J for edge 62) and the corresponding updated value determined, in this case X=C for scanline B. Because the new updated value X=C is less than the most recent value X=E copied to the output list 404', the current edge record and its corresponding new updated value is transferred directly to the output spill list 406'.

FIG. 14D shows the state of the edge records at the start of scanline B where it is seen that the main and output lists, and their corresponding spill components have been swapped. To determine the first emitted edge, the edge 60 is loaded into the current active edge register 430 and the edge 62 is loaded into the spill active edge register 432. The X-values are compared and the edge 62 with the least X-value (X=C) is emitted, updated and loaded to the edge pool 412.

Edge emission and updating continues for the remaining edges in the main edge list 404 and at the end of the scanline, the edge pool 412 is flushed to reveal the situation shown in FIG. 14E, where it is seen that each of the edges 60 to 63 are appropriately ordered for rendering on the next scanline, having been correctly emitted and rendered on scanline B.

As will be apparent from the foregoing, the spill lists provide for maintaining edge rasterisation order in the presence of complex edge crossing situations. Further, by virtue of the lists being dynamically variable in size, large changes in edge intersection numbers and complexity may be handled without the need to resort to sorting procedures in all but exceptionally complex edge intersections.

Preferably, the edge pool 412 is sized to retain eight edge records and the lists 404, 404' together with their associated spill lists 406, 406' have a base (minimum) size of 512 bytes which is dynamically variable thereby providing sufficient scope for handling large images with complex edge crossing requirements.

3.2.1 Edge Processing in Fractional Format

The edge crossing calculations performed by the edge processing module 400 in fixed point format, will now be described in detail. For a line segment from a point P0(X0, Y0) to a point P1(X1, Y1) where X0, Y0, X1, Y1 are 28.4 fixed-point numbers, let:

Dx=X1−X0 (28.4 fixed point number);

Dy=Y1−Y0 (28.4 fixed point number);

DX=INT($2^{14}$*Dx/Dy) (18.14 fixed point number);

The DX value defined directly above is a fixed point value representation of the DX value described in the description preceding this section (i.e., Section 3.2.1). Assuming the point P0 lies on an integer scan line, then an 18.14 fixed-point approximation of the linear line equation (i.e., x=my+c) for the line segment P0-P1, where y is a 28.4 fixed-point number between Y0 and Y1 inclusively, and where X(y) represents the X-value for the crossing of the line segment P0-P1, by the scanline y, can be determined as follows:

$$X(y)=X0*2^{10}+INT((y-Y0)/2^4*DX)$$

To avoid multiplication, the edge crossing value, X(y), may be determined incrementally for each scan line position Y, as follows:

Letting 'n' represent an integer and 0<=n<FLOOR(Y1)−FLOOR(Y0):

$$X(Y0)=X0*2^{10}; \text{ and}$$

$$X(Y0+n*2^4)=X(Y0+(n-1)*2^4)+DX \quad (5)$$

Depending on the rounding rule associated with an edge, the edge crossing value X(y) can be rounded to an integer value. From equation (5), a real value error factor, E(y), representing accumulated error in the calculation of the edge crossing value X(y) at a scan line 'y' can be determined as follows:

$$E(y)=(y-Y0)/2^4*(Dx/Dy-DX/2^{14}) \quad (6)$$

Equation (5) above may be used to determine the real edge crossing X-value for a given Dx, Dy segment. The corresponding integer edge crossing X-value may be determined by applying an associated edge-rounding rule to the result of Equation (5) with an accumulated error factor resulting from Equation (5) being shown in Equation (6). However, as will be described below, the edge crossing value X(y) can be determined such that there is no accumulated error. In this instance, all edge crossing calculations are performed in 32 bit integer arithmetic.

In accordance with the methods described herein, a first edge crossing X-value for an edge segment is calculated at a Y-value, start_y, equal to the floor of the starting point value (Y0) of the edge segment. If the edge segment does not start at an integer scan line boundary, then the edge segment is extended until the edge segment intersects with the integer scan line boundary. The last edge crossing Y-value for the edge segment is calculated using Equation (7), as below:

$$FLOOR(start\_y*2^4+Edge.Offset+Dy)-1 \quad (7)$$

The real edge crossing value, Xr(n), for an edge segment with Dx, Dy slope, starting at a point (Edge.X0, start_y+Edge.Offset) is determined using Equation (8) as shown below:

$$Xr(n)=Edge.X0/2^4+(n-Edge.Offset/2^4)*Dx/Dy, \quad (8)$$

where n is an integer representing the integer scan line offset from the scanline starting position start_y of the segment, and where 0<n<FLOOR(Edge.Offset+Dy).

Now let:

Xoi=INT(Edge.X0/$2^4$)(integer)

Xof=Edge.X0%$2^4$ (28.4 fixed-point)

Di=INT(Dx/Dy)(integer)

Df=Dx%Dy (28.4 fixed-point)

as shown in FIG. 26.

By substituting Xoi, Xof, Di, and Df into Equation (8) above, the real edge crossing value, Xr(n), for an edge segment can be determined in accordance with Equation (9) shown below:

$$Xr(n)=Xoi+n*Di+((Xof*Dy-Edge.Offset*Dx)/2^4+n*Df)/Dy \quad (9)$$

Using the integer Flooring Rule equation: FLOOR(a/b)=INT(a/b), an integer edge crossing Floor Equation (10), can be derived from Equation (9) as follows:

$$Xf(n)=FLOOR(Xr(n))=Xoi+n*Di+INT(((Xof*Dy-Edge.Offset*Dx)/2^4+n*Df)/Dy) \quad (10)$$

Similarly, using the Ceiling Rule equation, CEIL(a/b)=INT((a+b−1)/b), an integer edge crossing Ceiling Equation (11), can be derived from the real equation (9) as follows:

$$Xc(n)=CEIL(Xr(n))=Xoi+1+n*Di+INT(((Xof*Dy-Edge.Offset*Dx-1)/2^4+n*Df)/Dy) \quad (11)$$

Similarly, using the Rounding Rule equation, ROUND(a/b)=INT((a+b/2)/b), an integer edge crossing Rounding Equation (12), can be derived from of the real equation (9) as follows:

$$Xr1(n)=ROUND(Xr(n))=Xoi+n*Di+INT(((Xof*Dy-Yof*Dx+8*Dy)/2^4+n*Df)/Dy) \quad (12)$$

The Flooring, Ceiling and Rounding equations (10), (11), and (12), can be expressed in a simpler and more general form as follows:

Letting:

Dx, and Dy define an edge segment slope in 28.4 fixed point, where Dy is greater than zero;

Di=INT(Dx/Dy)—representing an integer part of Dx divided by Dy;

Df=Dx % Dy—representing the remainder of Dx divided by Dy;

Xa=an integer representing accumulated integer X-value;

Da=a 28.4 fixed-point number accumulated fractional X-value;

E=a 24.8 fixed-point number having a value between −16 and 16 exclusively, representing a small constant error of the edge segment;

Then an integer edge crossing X-value at a scan line n can be determined using any one of the three rounding rules described above, in accordance with Equation (13) below:

$$Xi(n)=Xa+n*Di+INT((E/2^4+Da+n*Df)/Dy) \quad (13)$$

For the Flooring Rule, Equation (10) can be transformed to Equation (13) by equating Equations (10) and (13) and considering n as a variable and any other parameters as constant. Therefore, for the Flooring Rule, an integer X-value, Xa, a constant error value, E, and a fractional X- value, Da, may be expressed as follows:

Xa=Xoi $$E=(Xof*Dy-Edge.Offset*Dx)\%2^4$$

$$Da=INT((Xof*Dy-Edge.Offset*Dx)/2^4) \quad (13A)$$

Similarly, for the Ceiling Rule, equation (11) can be transformed to Equation (13) by equating Equations (11) and (13) and considering n as a variable and any other parameters as constant. Therefore, for the Ceiling Rule, the integer X-value, Xa, the constant error, E, and fractional X-value, Da, may be expressed as follows:

$$Xa = Xoi + 1$$

$$E = (Xof*Dy - \text{Edge.Offset}*Dx - 1)\%2^4$$

$$Da = \text{INT}((Xof*Dy - \text{Edge.Offset}*Dx - 1)/2^4) \quad (13B)$$

Similarly, for the Rounding Rule, Equation (12) can be transformed to Equation (13) by equating Equations (12) and (13) and considering n as a variable and any other parameters as constant. Therefore, for the Rounding Rule, the integer X-value, Xa, the constant error, E, and fractional X-value, Da, are expressed as follows:

$$Xa = Xoi$$

$$E = (Xof*Dy - Yof*Dx + 8*Dy)\%2^4$$

$$Da = \text{INT}((Xof*Dy - Yof*Dx + 8*Dy)/2^4) \quad (13C)$$

An integer edge crossing value, Xi(n), for Equation (13) may be determined incrementally as shown below:

Letting Xa(n) and Da(n) represent an accumulated integer and fractional part of Equation (13), respectively, then Equation (13) may be expressed as Equation (14) below:

$$Xi(n) = Xa(n) + \text{INT}((Da(n) + E/2^4)/Dy) \quad (14)$$

where:

$$Xa(n) = Xa(n-1) + Di + \text{INT}(((Da(n-1) + Df))/Dy) \quad (14A)$$

$$Da(n) = (Da(n-1) + Df)\%Dy \quad (14B)$$

and initial conditions for Equation (14) are:

$$Xa(0) = Xa + \text{INT}(Da/Dy) \quad (14C)$$

$$Da(0) = Da\%Dy \quad (14D)$$

where:

$$Dy > 0 \& -Dy <= Da(n) <= Dy \& -2^4 < E < 2^4.$$

Equation (14C) and (14D) represent initial conditions for Equation (14). Equations (14A) and (14B) represent an accumulated integer part and a fractional part, respectively, for Equation (14). The following "normalisation conditions", (i) and (ii), ensure that the quotient part (i.e., $(E/2^4 + Da(n))/Dy)$) of Equation (14), remains between −1 and 1, exclusively:
(i) $-2^4 < E < 2^4$
(ii) $-Dy < Da(n) < Dy$ Based on the normalisation condition (i) and (ii), the integer edge crossing value, Xi(n), in Equation (14) may be determined using Table 1, below, when Xa(n) and Da(n) are known:

TABLE 1

|  | Da(n) < 0 | Da(n) = 0 | Da(n) > 0 |
|---|---|---|---|
| E < 0 | Xa(n) − 1 | Xa(n) − 1 | Xa(n) |
| E = 0 | Xa(n) − 1 | Xa(n) | Xa(n) |
| E > 0 | Xa(n) − 1 | Xa(n) | Xa(n) |

Accordingly, if both the constant error, E, and fractional X-value, Da(n), are less than zero, then the value of Xi(n) may be obtained from Table 1 as (Xa(n)−1). Pseudo code showing one implementation for determining the integer edge crossing value Xi(n) in accordance with Equation (14) is shown below:

```
IF Da(n)>0 OR Da(n)>=0 AND E>=0 THEN
    Xi(n)=Xa(n)
ELSE
    Xi(n)=Xa(n)-1
ENDELSE
```

The incremental equations (14A) and (14B) require integer multiplication and modulus operations which can be inefficient. Accordingly, based on the definition that Df equals (Dx % Dy), the value of Df is between −Dy and Dy exclusively, and the normalisation conditions (i) and (ii), the incremental equations (14A) and (14B) may be determined using addition and subtraction integer arithmetic. The following pseudo code shows one implementation for determining the current values of Xa(n) and Da(n) based on the previous values Xa(n−1) and Da(n−1):

```
Xa(n)=Xa(n-1)+Di
Da(n)=Da(n-1)+Df
IF Da(n)<-Dy THEN
    Da(n)=Da(n)+Dy
    Xa(n)=Xa(n)-1
ELSE IF Da(n)>Dy THEN
    Da(n)=Da(n)-Dy
    Xa(n)=Xa(n)+1
ENDELSE
```

Figure 28A:
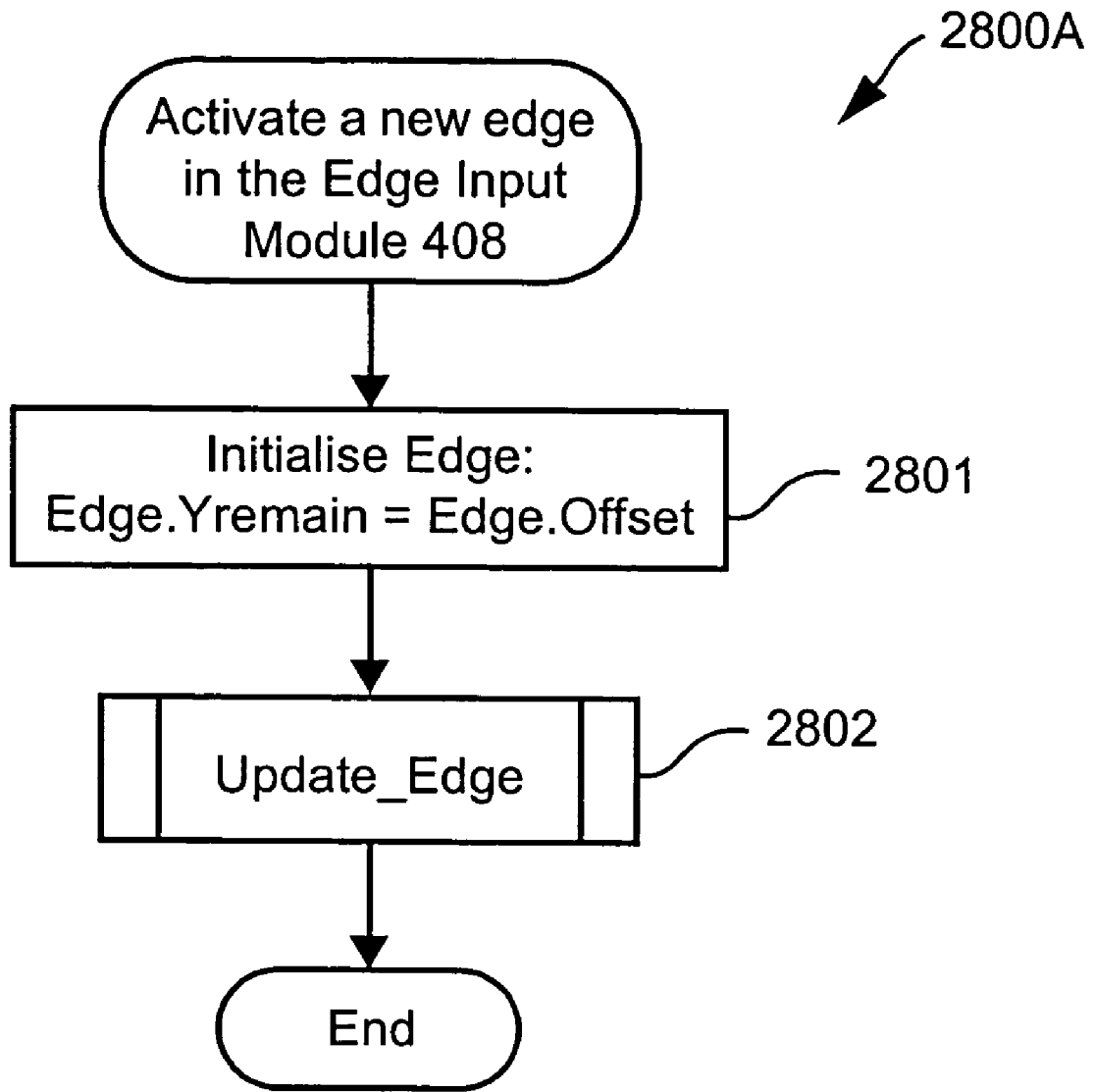
FIG. 28A is a flow diagram showing a method of determining an integer edge crossing X-value for a new edge crossed by a scanline.
Figure 28B:
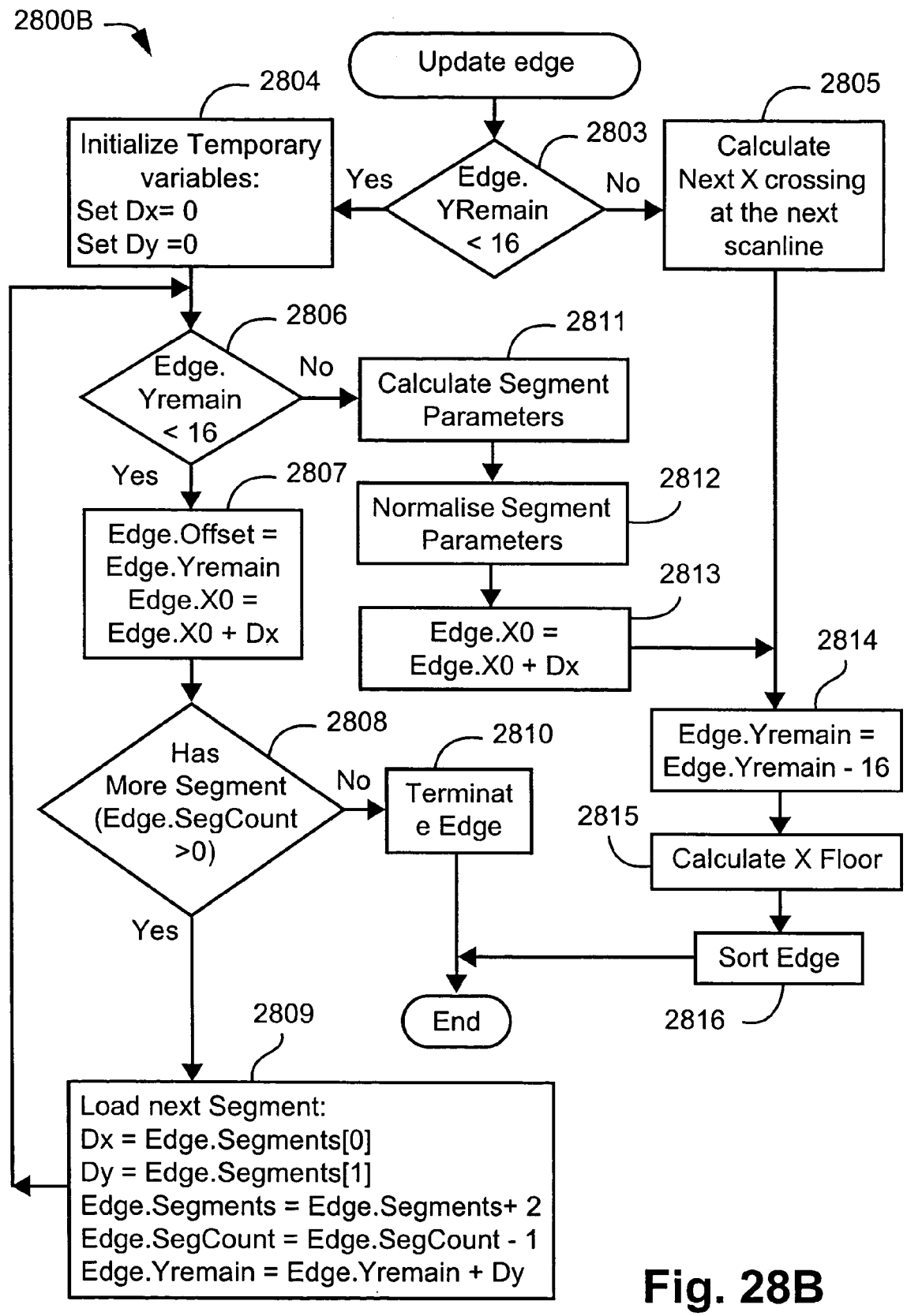
FIG. 28B is a flow diagram showing a method of determining an integer edge crossing X-value for an active edge crossed by a scanline.

FIG. 28A is a flow diagram showing a method 2800A of determining an integer edge crossing value, Xi, for a new edge crossed by a scanline (i.e., an inactive edge being crossed by the scanline for the first time). FIG. 28B is a flow diagram showing a method 2800B of determining an integer edge crossing value, Xi, for an active edge crossed by a scanline. Accordingly, as will be described in detail below, the difference between the methods 2800A and 2800B is that the new edge is initialised (i.e., essentially activated).

The integer edge crossing value, Xi, determined in accordance with the methods 2800A and 2800B is a 32 bit integer value and is determined in accordance with Equation (14). The methods 2800A and 2800B are preferably implemented as one or more software modules forming the edge update module 410 described above, executing on the host processor 2 with attached ROM 6 and RAM 3.

For the edge crossed by the scanline, intermediate variables (to be described below) are specified to allow the edge to be stored in the active edge record 418. As described above, the active edge record 418 includes the following fields:

Offset: a 28.4 fixed-point Y offset of a current edge segment;

X0: a 28.4 fixed-point start_x value for the current edge segment;

Dy: a 28.4 fixed-point number representing the difference between a next Y-value and a current Y-value for the current edge segment;

Segments: an array of SegCount segments, where each edge segment has Dx and Dy values in 28.4 fixed point format;

SegCount: number of edge segments in 'Segments' array. For example, if the monotonic curve has N points, then there is N−1 line segments, hence SegCount should be N−1;

Yremain: a 28.4 fixed-point number indicating the remaining distance in the Y direction for a current edge segment;

Di: a 32 bit integer representing an integer increase per Y step;

Df: a 28.4 fixed-point representation of fractional increase per Y step;

Xa: a 32 bit integer to store an accumulated value for 'Xa(n)' of Equation (14A);

Da a 28.4 fixed-point to store an accumulated value for 'Da(n)' of Equation (14B); and E: a 24.8 fixed-point representing fractional error which is always between −16 and +16 exclusively.

The methods 2800A and 2800B differ from Equation (14) in one minor aspect. In particular, when checking an edge segment terminated condition, instead of determining the value of 'FLOOR(start_y*$2^4$+Edge.offset+Dy)−1' as in Equation (7) and keeping track of a current scan line value, n, the value of the variable Yremain is used as a 28.4 fixed-point number representing the remaining distance in the Y direction from the current scan line to a segment end point. For each subsequent scan line, one unit (i.e., $2^4$) in 28.4 fixed-point is subtracted from the value of Yremain. If the value of Yremain is less than one unit in 28.4 fixed-point format, upon subtraction of the one unit, meaning that the current segment has been crossed for the last time, then the segment is terminated.

As seen in FIG. 28A, the method 2800A begins at step 2801, where an edge (i.e., the current edge) becomes active for a current scanline having a starting value (i.e.,. start_y), Y0. At step 2801, the variable Edge.Yremain is initialised by the processor 2 as Edge.Yremain=Edge.Offset and the current edge is added to the active edge record 418 configured within RAM 3. The segment data for a current segment of the current edge is then initialised by the processor 2. In particular, the variables Di, Df, E, Da, Xa and Dy are determined based on the current segment Dx and Dy values. Yremain is then set to the result of 'Dy+Offset'. The method 2800A then continues at step 2802, where an integer edge crossing value, Xi, is determined for the current edge.

The method 2800B for determining an integer edge crossing value, Xi, for the current edge as executed at step 2802, will now be described in detail with reference to FIG. 28B. The method 2800B proceeds to step 2803, where if the processor 2 determines that the variable Edge.Yremain is less than 16, then the method 2800B proceeds directly to step 2804. Otherwise, the method 2800B proceeds to step 2805 where the incremental values for a next accumulated fractional X-value, Da, and an accumulated integer X-value, Xa, are determined and then the method 2800B proceeds to step 2814. The Da and Xa values may be determined at step 2805 using Equations (14A) and (14B). In particular, the Da and Xa values may be determined based on the following optimised pseudo code implementing Equations (14A) and (14B):

Edge.Xa=Edge.Xa+Edge.Di
Edge.Da=Edge.Da+Edge.Df
IF Edge.Da<−Edge.Dy THEN
  Edge.Da=Edge.Da+Edge.Dy
  Edge.Xa=Edge.Xa−1
ELSE IF Edge.Da>Edge.Dy THEN
  Edge.Da=Edge.Da−Edge.Dy
  Edge.Xa=Edge.Xa+1
ENDELSE At step 2804, the processor 2 initialises intermediate variables, Dx and Dy, to zero. The Dx and Dy values may be used to temporarily store the slope of a next segment if there are segments indicated by the edge segment pointer 'Edge.Segments'. Following step 2804, the method 2800B proceeds to step 2806 where if 'Edge.YRemain' is less than 16, then the method 2800B proceeds to step 2807. Otherwise the method 2800B proceeds to step 2811. At step 2811, the processor 2 determines the segment parameters. In particular, the edge intermediate variables Di, Df, E, Da, Xa and Dy are determined based on the current segment temporary variables (i.e., Dx, Dy and 'Edge.Offset'). The Di and Df values are determined at step 2811 as shown below:

Edge.Dy=Dy
Edge.Di=INT(Dx/Dy) and
Edge.Df=Dx%Dy.

The variables E, Da(0), and Xa(0) are each affected by the edge rounding rule (i.e., Floor, Round or Ceil) used to determine the variables E, Da(0), and Xa(0).

For the Flooring Rule, equation (13A) is used to determine the variables E, Da(0), and Xa(0) as step 2811. Therefore,
Xa=Xoi;
E=(Xof*Dy−Edge.Offset*Dx)%$2^4$; and
Da=INT((Xof*Dy−Edge.Offset*Dx)/$2^4$).

For the Ceiling Rule, equation (13B) is used. Therefore,
Xa=Xoi+1;
E=(Xof*Dy−Edge.Offset*Dx−1)%$2^4$; and
Da=INT((Xof*Dy−Edge.Offset*Dx−1)/$2^4$).

For the Rounding Rule, equation (13C) is used. Therefore,
Xa=Xoi,
E=(Xof*Dy−Yof*Dx+8*Dy)%$2^4$ and
Da=INT((Xof*Dy−Yof*Dx+8*Dy)/$2^4$).

The value of Da determined at step 2811 may be outside the range [−Dy, Dy]. Therefore, at the next step 2812, the variables Xa and Da are normalised according to the conditions (i) and (ii) described above, as shown in the initial Equations (14c) and (14d):

Xa(0)=Xa+INT(Da/Dy); and
Da(0)=Da % Dy.

Then at the next step 2813, the processor 2 updates the variable 'Edge.X0' by adding Dx to the variable 'Edge.X0'. The new 'Edge.X0' value is the x start position of the next segment in Edge.Segments.

Following step 2813, at the next step 2814, the value of Edge.Yremain is decreased by 16 to indicate one edge crossing has been evaluated. Then step 2815 is executed to determine the current scanline integer edge crossing value using Table 1. Psuedocode showing one implementation of step 2815 is shown below.

IF Edge.Da>0 OR Edge.Da>=0 AND Edge.E>=0 THEN
  Edge.X=Edge.Xa
ELSE
  Edge.X=Edge.Xa−1
ENDELSE Then at the next step 2816 the active edges for the current scanline are sorted in an ascending X-value order. Preferably, one integer Y-value is stored in RAM 3 for edges starting at the same scan-line position (Y). The method 2800B concludes following step 2816.

At step 2807, the processor 2 updates the initial Edge.Offset and Edge.X0 values for the next segment. Edge.Offset is set to Edge.Yremain, which corresponds to the next segment start point Y offset. The Edge.X0 is also increased by the value of Dx, which corresponds to the next segment start point X-value.

Following step 2807, the method 2800B proceeds to step 2808 where if there are more segments in the Edge.Segments array (i.e. Edge.SegCount>0), then the method 2800B proceeds step 2809 to load the next segment being currently pointed to by the Edge.Segments pointer. Otherwise the method 2800 proceeds step 2810 to terminate the edge, (i.e., remove the edge from the active edge list). After the step 2810, the method 2800B is concluded.

At step 2809, the variables Dx and Dy are set for the next segment. The method 2800B assumes that the Edge.Segments[0] and Edge.Segments[1] store the Dx and Dy value of the next segment. The edge segment pointer, Edge.Segments, is increased by two to point to the next segment to be loaded, and the segment counter Edge.SegCount is reduced by one. Also at step 2809, the processor 2 increases the Edge.Yremain variable by the new segment Dy value. The method 2800 is then returns to step 2806.

Conventional edge tracking methods which use DX as an 18.14 fixed point number limit input points to an 18.14 fixed point number. If a point is outside an eighteen bit integer range, the point must be clipped. Furthermore, the DX term has conventionally been determined as an approximation of the segment slope Dx/Dy and hence is not accurate.

As described above, the methods 2800A and 2800B do not have any fixed point edge tracking limitations. The range of an input point format is the same as the input space (e.g., 28.4) for representing the integer part of a result, hence there is no clipping required. The methods 2800A and 2800B therefore allow a real line equation for a segment to be tracked in fractional form where integer and fractional parts are separated. The integer part and the fractional part are determined as described above so that the fractional part is always between −1 and +1 exclusively. Furthermore, the methods described above remove any rounding error which conventionally results from edge tracking calculations.

3.3 Priority Determination Module

Figure 5:
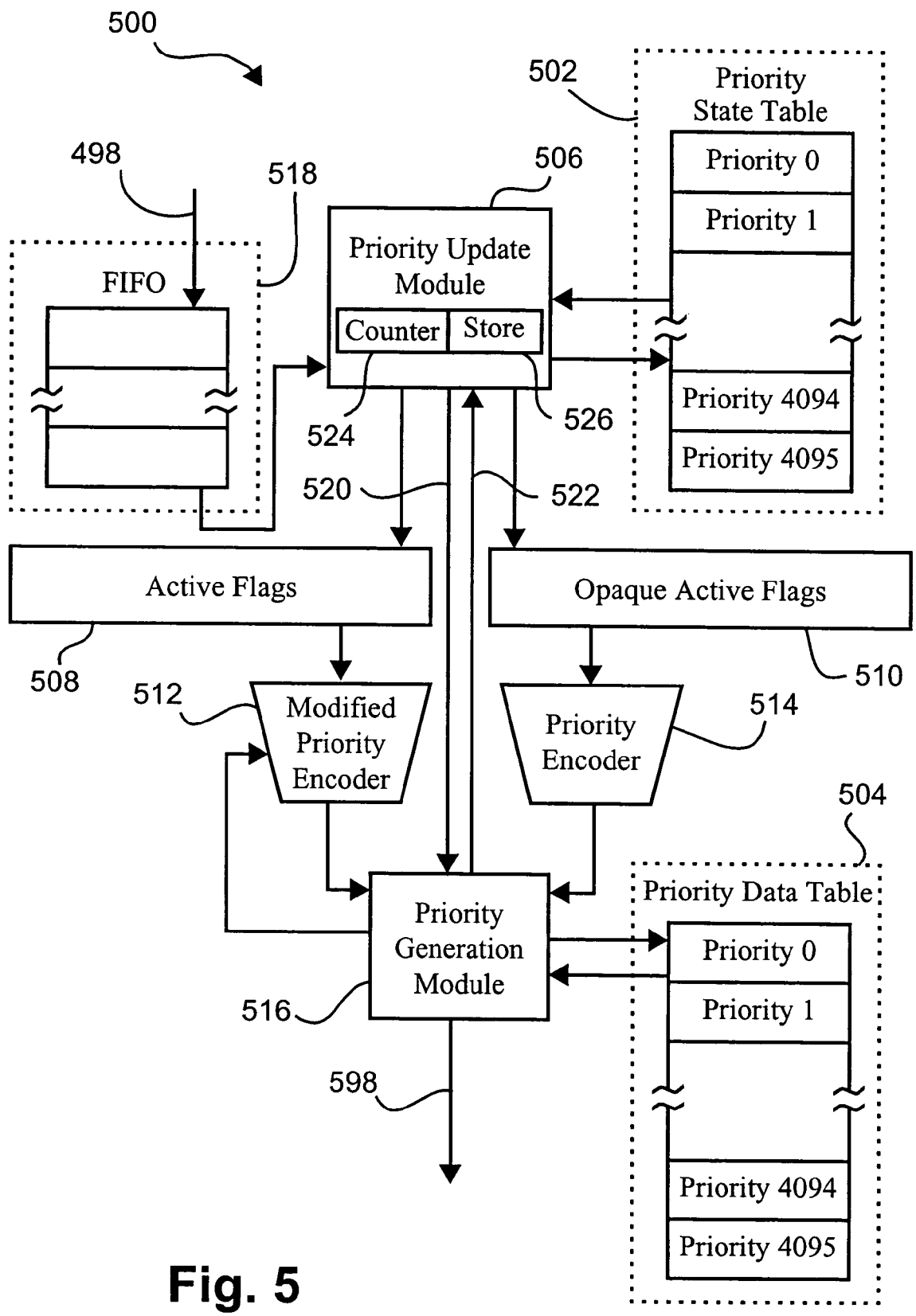
FIG. 5 is a schematic functional representation of the priority determination module of FIG. 3.

The operation of the priority determination module 500 will now be described with reference to FIG. 5. The primary function of the priority determination module 500 is to determine those objects that make a contribution to a pixel currently being scanned, order those contributing objects in accordance with their priority levels, and generate color composite messages for instructing the pixel compositing module 700 to composite the ordered objects to generate the required color and opacity for the current pixel.

The priority determination module 500 receives incoming messages 498 from the edge processing module 400. These incoming messages may include load priority data messages, load fill data messages, edge crossing messages, and end of scanline messages. These messages first pass through a first-in first-out (FIFO) buffer 518 before being read by a priority update module 506. The FIFO 518 acts to de-couple the operation of the edge processing module 400 and the priority determination module 500. Preferably the FIFO 518 is sized to enable the receipt from the edge processing module 400 and transfer of a full scanline of edge-crossings in a single action. Such permits the priority determination module 500 to correctly handle multiple edge-crossings at the same pixel (X) location.

The priority determination module 500 is also adapted to access a priority state table 502, and a priority data table 504. These tables are used to hold information about each priority. Preferably, the priority state and priority data tables 502, 504 are combined in memory as a single level activation table 530, as shown in FIG. 18. Alternatively these tables 502, 504 can be kept separate.

Preferably, the priority properties and status table 34 includes at least the following fields as shown in FIG. 18 for each priority level:

(i) a fill-rule flag (FILL_RULE_IS_ODD_EVEN) which indicates whether this priority is to have its inside versus outside state determined by the application of the odd-even fill rule or the non-zero winding fill rule;

(ii) a fill counter (FILL COUNT) for storing a current fill count which is modified in a manner indicated by the fill rule each time an edge effecting this priority is crossed;

(iii) a clipper flag (CLIPPER) which indicates whether this priority is to be used for clipping or filling;

(iv) a clip type flag (CLISP_OUT) which, for edges which have the clipper flag set, records whether the clipping type is a "clip-in" or a "clip-out";

(v) a clip counter (CLIP COUNT) for storing a current clip count which is decremented and incremented when a clip-in type clip region effecting this priority is entered and exited respectively, and incremented and decremented when a clip-out type clip region effecting this priority is entered and exited respectively; and (vi) a flag (NEED_BELOW) which records whether this priority requires levels beneath it to be calculated first, referred to as the "need-below" flag.

(vii) a fill table address (FILL INDEX), which point to an address where the fill of the priority is stored;

(viii) a fill type (FILL TYPE), (ix) a raster operation code (COLOR_OP), (x) an alpha channel operation code (ALPHA_OP) consisting of three flags (LAO_USE_D_OUT_S, LAO_USE_S_OUT_D and LAO_USE_S_ROP_D), (xi) a stack operation code (STACK_OP), and (xii) a flag (X_INDEPENDENT) which records whether the color of this priority is constant for a given Y, referred to here as the "x-independent" flag; and (xiii) other information (ATTRIBUTES) of the priority.

Clipping objects are known in the art and act not to display a particular new object, but rather to modify the shape of an another object in the image. Clipping objects can also be turned-on and turned-off to achieve a variety of visual effects. For example, the object 80 of FIG. 8A could be configured as a clipping object acting upon the object 90 to remove that portion of the object 90 that lies beneath the clipping object 80. This may have the effect of revealing any object or image beneath the object 90 and within the clipping boundaries that would otherwise be obscured by the opacity of the object 90. The CLIPPER flag is used to identify whether the priority is a clipping object. Also, the CLISP flag is used to determine whether the priority is a clip-in or a clip-out, and the CLIP COUNT is used in a similar fashion to FILL COUNT to determine whether the current pixel is within the clip region.

Figure 13A:
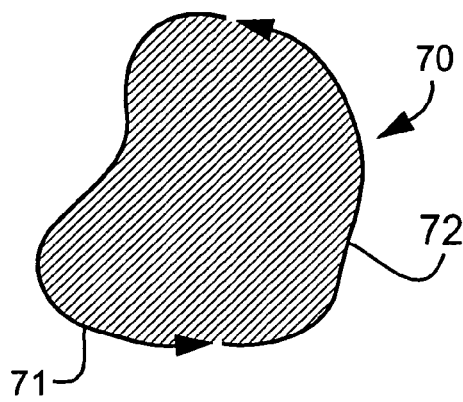
FIGS. 13A and 13B show the odd-even and non-zero winding fill rules.
Figure 13B:
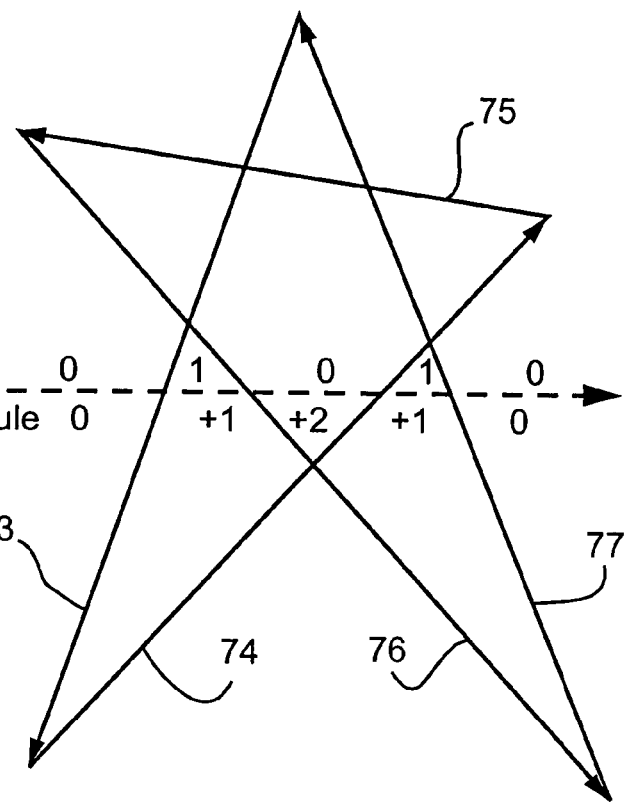

FIGS. 13A and 13B demonstrate the application of the odd-even and non-zero winding rules, for activating objects. The relevant rule to be used is determined by means of the fill-rule flag FILL_RULE_IS_ODD_EVEN.

For the purposes of the non-zero winding rule, FIG. 13A illustrates how the edges 71 and 72 of an object 70 are allocated a notional direction, according to whether the edges are downwards-heading or upwards-heading respectively. In order to form a closed boundary, edges link nose-to-tail around the boundary. The direction given to an edge for the purposes of the fill-rule (applied and described later) is independent of the order in which the segments are defined. Edge segments are defined in the order in which they are tracked, corresponding to the rendering direction.

FIG. 13B shows a single object (a pentagram) having two downwards-heading edges 73 and 76, and three upwards-heading edges 74, 75 and 77. The odd-even rule operates by simply toggling a Boolean value in the FILL COUNT as each edge is crossed by the scanline in question, thus effectively turning-on (activating) or turning-off (de-activating) an object's color. The non-zero winding rule increments and decrements a value stored in the fill counter FILL COUNT dependent upon the direction of an edge being crossed. In FIG. 13B, the first two edges 73 and 76 encountered at the scanline are downwards-heading and thus traversal of those edge increment the fill counter, to +1 and +2 respectively. The next two edges 74 and 77 encountered by the scanline are upwards-heading and accordingly decrement the fill counter FILL COUNT, to +1 and 0 respectively. The non-zero winding rule operates by turning-on (activating) an object's color when the fill counter FILL COUNT is non-zero, and turning-off (de-activating) the object's color when the fill counter FILL COUNT is zero.

The NEED_BELOW flag for a priority is established by the driver software and is used to inform the pixel generating system that any active priorities beneath the priority in question do not contribute to the pixel value being rendered, unless the flag is set. The flag is cleared where appropriate to prevent extra compositing operations that would otherwise contribute nothing to the final pixel value.

The raster operation code (COLOR_OP), alpha channel operation (ALPHA_OP) and stack operation (STACK_OP) together form the pixel operation (PIXEL_OP), that is to be performed by the pixel compositing module 700 on each pixel where the priority is active and exposed.

Preferably, most of the information contained in the combined table 34 is directly loaded by instructions from the driver software. In particular, the fill-rule flag, the clipper flag, the clip type flag, and the need-below flag, fill table address, fill type, raster operation, code, alpha channel operation code, stack operation code, x_independent flag, and other attributes may be handled in this manner. On the other hand, the fill counter, and clip counter are initially zero and are changed by the priority determination module 500 in response to edge crossing messages.

The priority determination module 500 determines that a priority is active at a pixel if the pixel is inside the boundary edges which apply to the priority, according to the fill-rule for that priority, and the clip count for the priority. A priority is exposed if it is the uppermost active priority, or if all the active priorities above it have their corresponding need-below flags set. In this fashion, pixel values may be generated using only the fill data of the exposed priorities. It is important to note that an object's priority designates the level location of the object in the z-order of the objects from the rearmost object to the foremost object. Preferably, a number of non-overlapping objects that have the same fill and compositing operation, and that form a contiguous sequence, may be designated as having the same priority. This effectively saves memory space in the fill table. Furthermore, the corresponding edge records of objects need only reference the corresponding priority in order to reference the corresponding fill and compositing operation.

Returning now to FIG. 5, the priority update module 506 maintains a counter 524 which records the scanline intersection coordinate up to which it has completed processing. This will be referred to as the current X of the priority update module 506. The initial value at the start of a scanline is zero.

Upon examining an edge crossing message received at the head of the FIFO 518, the priority update module 506 compares the edge crossing X-value in the edge crossing message with its current X. If the edge crossing X-value in the edge crossing message is less than or equal to the current X, the priority update module 506 processes the edge crossing message. Edge crossing message processing comes in two forms. "Normal edge processing" (described below) is used when the record in the priority state table 502 indicated by the priority in the edge crossing message has a clipper flag which indicates that this is not a clip priority. Otherwise, "clip edge processing" (described below) is performed.

"Normal edge processing" includes, for each priority in the edge crossing message and with reference to fields of the record of combined table 34 indicated by that priority, the steps of:

(i) noting the current fill count of the current priority;
(ii) either:
  (a) if the fill rule of the current priority is odd-even, setting the fill count to zero if it is currently non-zero, else setting it to any non-zero value, or
  (b) if the fill rule of the current priority is non-zero winding, incrementing or decrementing (depending on the edge direction flag) the fill count; and
(iii) comparing the new fill count with the noted fill count and if one is zero and the other is non-zero performing an "active flag update" (described below) operation on the current priority.

Some arrangements may use a separate edge crossing message for each priority rather than placing a plurality of priorities in each edge crossing message.

An active flag update operation includes first establishing a new active flag for the current priority. The active flag is non-zero if the fill count for the priority in the priority state table 502 is non-zero and the clip count for the priority is zero, else the active flag is zero. The second step in the active flag update operation is to store the determined active flag in an active flags array 508 at the position indicated by the current priority, then if the need-below flag in the priority state table for the current priority is zero, also storing the active flag in an opaque active flags array 510 at the position indicated by the current priority.

"Clip edge processing" includes, with reference to fields of the priority state table record indicated by the first priority in the edge crossing message, the steps of:

(i) noting the current fill count of the current priority;
(ii) either:
  (a) if the fill rule of the current priority is odd-even, setting the fill count to zero if it is currently non-zero else setting it to any non-zero value, or
  (b) if the fill rule of the current priority is non-zero winding, incrementing or decrementing (depending on the edge direction flag) the fill count; and
(iii) comparing the new fill count with the noted fill count and determining a clip delta value of:
  (a) zero, if both the new fill count is zero and the noted fill count is zero, or both the new fill count is non-zero and the noted fill count is non-zero,
  (b) plus one, if the clip type flag of the current priority is clip-out and the noted fill count is zero and the new fill count is non-zero, or the clip type flag of the current priority is clip-in and the noted fill count is non-zero and the new fill count is zero, or otherwise,
  (c) minus one; and
(iv) for every subsequent priority after the first in the edge crossing message, add the determined clip delta value to the clip count in the record in the priority state stable indicated by that subsequent priority, and if the clip count either moved from non-zero to zero, or from zero to non-zero in that process, performing an active flag update operation as described above on that subsequent priority. It should be noted that the initial value of each clip count is set by the LOAD_PRIORITY_PROPERTIES instruction described previously. The clip count is typically initialised to the number of clip-in priorities, which affect each priority.

Some arrangements do not associate a priority with a clip, but instead directly increment and decrement the clip count of all priorities given in the edge crossing message. This technique can be used, for example, when clip shapes are simple and do not require the application of a complex fill rule. In this specific application, the clip count of the level controlled by an edge is incremented for an upwards heading edge or decremented for a downwards heading edge. A simple closed curve, described anticlockwise, acts a clip-in, whereas a simple closed curve, described clockwise, acts as a clip-out.

When the edge crossing X-value in the edge crossing message is greater than the current X of the priority update module 506, the priority update module 506 forms a count of how many pixels to generate, being the difference between the edge crossing X-value in the edge crossing message and the current X, this count is formatted into a priority generation message, which is sent via a connection 520 to a priority generation module 516. The priority update module 506 then waits for a signal 522 from the priority generation module 516 indicating that processing for the given number of pixels has completed. Upon receipt of the signal 522, the priority update module 506 sets its current X to the edge crossing X-value in the edge crossing message and continues processing as described above.

Upon receipt of a priority generation message 520, the priority generation module 516 performs a "pixel priority generation operation" (described below) a number of times indicated by the count it has been supplied, thereupon it signals 522 the priority update module 506 that it has completed the operation.

Each pixel priority generation operation includes firstly using a priority encoder 514 (eg. a 4096 to 12 bit priority encoder) on the opaque active flags array 510 to determine the priority number of the highest opaque active flag. This priority (if any) is used to index the priority data table 504 and the contents of the record so referenced is formed into a fill priority message output 598 from the priority generation module 516 and sent to the fill color determination module 600. Further, if a priority was determined by the previous step (ie. there was at least one opaque active flag set), the determined priority is held, and is referred to as the "current priority". If no priority was determined the current priority is set to zero. The priority generation module 516 then repeatedly uses a modified priority encoder 512 on the active flag array 508 to determine the lowest active flag which is greater than the current priority. The priority so determined (if any) is used to index the level activation table 530 and the contents of the record so referenced is formed into a fill priority message. This fill priority message is then sent via the output 598 to the fill color determination module 600, then the determined priority is used to update the current priority. This step is used repeatedly until there is no priority determined (that is, there is no priority flagged in the active flags, which is greater than the current priority). Then the priority generation module 516 forms an end of pixel message and sends it to the fill color determination module 600. The priority determination module 500 then proceeds to the next pixel to generate another series of fill priority messages in similar fashion.

Figure 22A:
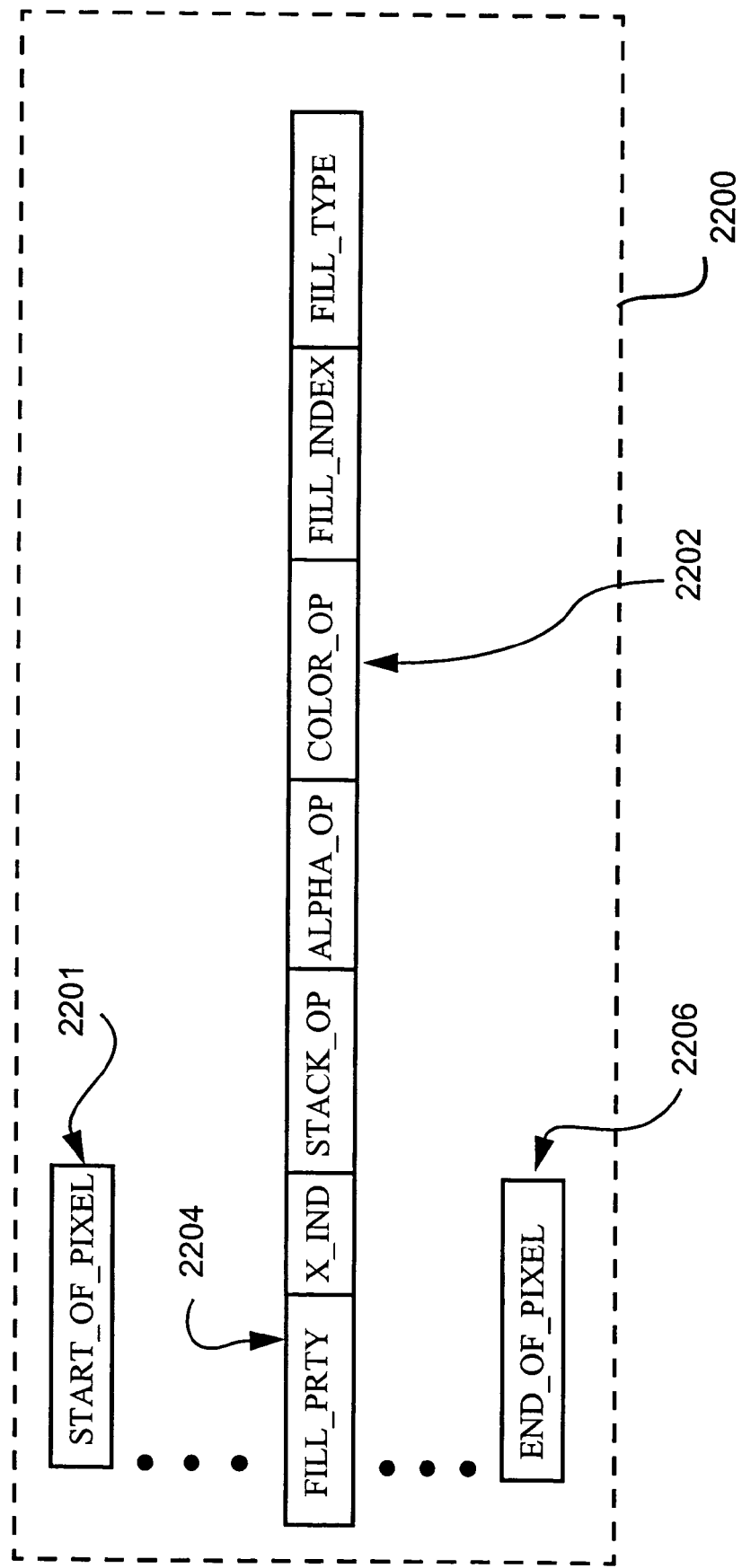
FIG. 22A shows a series of fill priority messages generated by the priority determination module.

Turning now to FIG. 22A, there is shown an example of such a series of fill priority messages 2200 generated by the priority determination module 500 for a single current pixel. As described above, these fill priority messages 2202 are first preceded by a START_OF_PIXEL command 2201. The fill priority messages 2202 are then sent in priority order commencing with the lowest exposed active priority level. When there are no more fill priority messages 2202 for the current pixel, the priority determination module 500 then sends an END_OF_PIXEL message 2206.

Each of one these fill priority messages 2202 preferably includes at least the following fields:

(i) An identifier code FILL_PRTY 2204 for identifying the message as a fill priority message. This code also includes an index LEVEL_INDX to the corresponding record in the level activation table 530, and also a code FIRST_PIXEL indicating whether or not this fill priority message belongs to a first pixel in a run of pixels having the same fill priority messages. The priority determination module 500 asserts the FIRST_PIXEL code for all those fill priority messages of a currently scanned pixel that is intersected by an edge as indicated by the edge crossing messages. The FIRST_PIXEL code is de-asserted for all fill priority messages of a currently scanned pixel if there is no edges intersecting that pixel as indicated by the edge crossing messages.

(ii) A fill table address FILL_INDEX, (iii) A fill type FILL_TYPE, (iv) A raster operation code COLOR_OP, (v) An alpha channel operation code Alpha_OP, (vi) A stack operation code STACK_OP, and (vii) A flag X_IND which records whether the color of this priority is constant for a given Y, referred to here as the "x-independent" flag. This flag is asserted when the color for this priority is constant.

The values of fields (ii) to (vii) for the fill priority message are retrieved from the corresponding record in the combined table 34.

Preferably, the priority generation module 516 notes the value of the x-independent flag of each fill priority message that it forwards to the fill color determination module 600 while it processes the first pixel of a sequence. If all the forwarded messages have the x-independent flag specified, all subsequent messages in the span of pixels between adjacent edge intersections can be replaced by a single repeat specification of count minus one. This is done by producing a repeat message and sending it to the fill color determination module 600 in place of all further processing in this sequence. It will be appreciated that if all the fill priority messages of a first pixel in a span of pixels between adjacent edges have their x-independent flag asserted, then the color and opacity of the pixels in the span of pixels will be constant. Thus in these cases, the pixel compositing module 700 need only composite the first pixel in the span of pixels to generate the required constant color and opacity and pass this onto the pixel output module 800. The generated repeat command is then passed to the pixel output module 800 which reproduces the constant color and opacity for the subsequent pixels in the span of pixels from the color and opacity of the first pixel. In this fashion, the number of compositing operations performed by the pixel compositing module 700 is reduced.

As another preferred feature to the basic operation described above, the priority generation module 516 sends the highest opaque priority via the connection 522 to the priority update module 506 after each edge crossing message. The priority update module 506 holds this in a store 526. The priority determination module 506 then, instead of a simple test that the edge crossing X-value in the message is greater than the current X, performs a test that the edge crossing X-value in the message is greater than the current X and that at least one of the levels in the message is greater than or equal to the highest opaque priority, before producing a fill priority message. By doing this, fewer pixel priority determination operations may be done and longer repeat sequences may be generated.

Figure 9B:
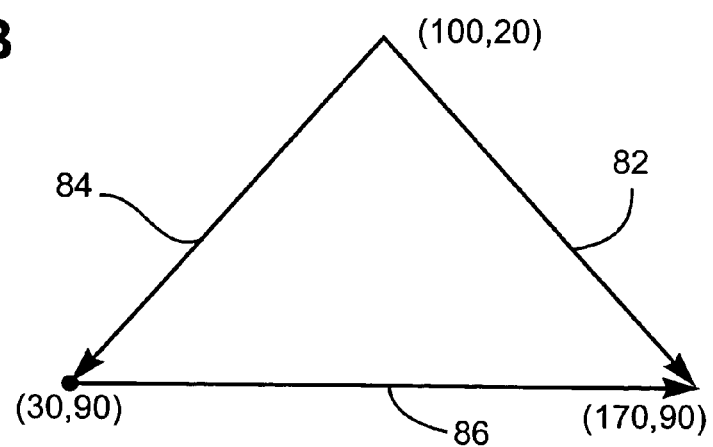

Using the example of the graphic objects shown in FIGS. 8A, 9A and 9B, the priority update process described above can be illustrated, for scanline 35 using the edge crossings seen from FIGS. 12C to 12J, as seen in FIGS. 15A to 15E.

FIGS. 15A to 15E illustrate operation of the priority tables 502 and 504 which, in a preferred implementation are merged into a single table (see FIG. 18), referred to as the level activation table (LAT) 530 and which is depicted together with arrays 508, 510 and encoders 512 and 514.

As seen in FIG. 15A, edge crossing messages are received in order for a scanline from the edge processing module 400 and are loaded into the table 530, which is arranged in priority order. The edge crossing messages include, in this example, an incrementing direction according to the non-zero winding rule of the edge traversal. It is possible for no entries in the level activation table 530 to be set.

The level activation table 530 includes column entries for fill count, which are determined from the edge according to the non-zero winding rule or, where appropriate, the odd-even rule. The need-below flag is a property of a priority and is set as part of the LOAD_PRIORITIES_PROPERTIES instruction. The need-below is set for all priority levels when the table 530 is loaded. Other columns such as "clip count" and "fill index table" may be used, but for this example are omitted for simplicity of explanation. Where no level is active the corresponding entries are set to zero. Further, the values of the arrays 510 and 508 are updated from the table 530 after receiving a subsequent edge crossing.

From FIG. 15A, it will be apparent that, for convenience, a number of records have been omitted for clarity. As described previously, the contents of the table 530, where not used in the priority determination module 500, are passed as messages to each of the fill color determination module 600 for pixel generation, and to the pixel compositing module 700 for compositing operations.

The first edge crossing for scanline 35 (FIG. 12E) is seen in FIG. 15A where for P=1, the fill count is updated to the value of the edge according to the non-zero winding rule. The "need-below" flag for this level has been set to zero by the driver software as the object in question is opaque.

Because a previous state of the table 530 was not set, the arrays 510 and 508 remain not set and the priority encoder 514 is disabled from outputting a priority. This is interpreted by priority generation module 516 which outputs a count n=40 (pixels) for a "no object" priority (eg: P=0), being the first, blank, portion of the scanline 35.

FIG. 15B shows the arrangement when the edge crossing of FIG. 12F is received. The fill count is updated. The arrays 510 and 508 are then set with the previous highest level from the table 530. At this time, the module 516 outputs a count n=45, P=1 representing the edge 96 of the opaque red object 90 before intersection with the semitransparent triangle 80.

Figure 15C:
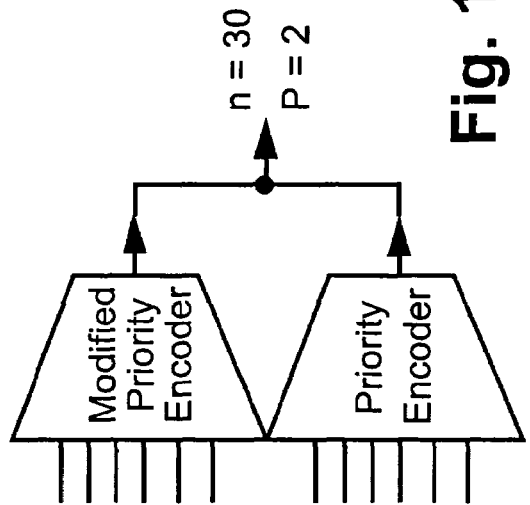

FIG. 15C shows the arrangement when the edge crossing of FIG. 12G is received. Note that the fill count has been adjusted downwardly because of the non-zero winding rule. Because the object that is valid prior to receiving the current edge crossing is not opaque, the modified priority encoder 512 is used to select the priority P=2 as the highest active level which is output as is current for n=(115−85)=30 pixels.

Figure 15D:
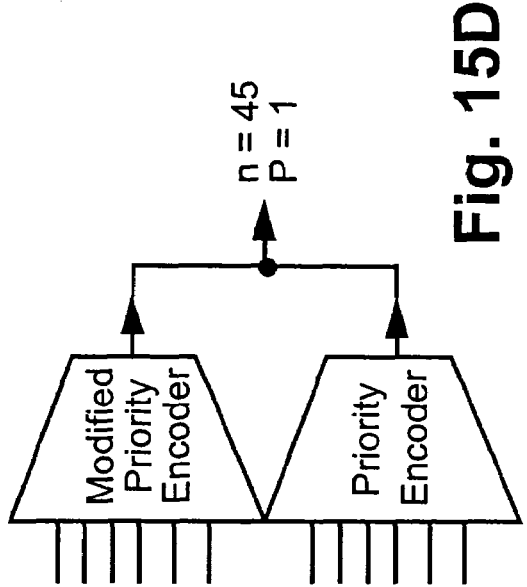

FIG. 15D shows the arrangement when the edge crossing of FIG. 12H is received. Note that previously changed "need-below" for P=2 has been transferred to the active array 508, thus permitting the priority encoder to output a value P=1 current for n=(160−115)=45 pixels.

Figure 15E:
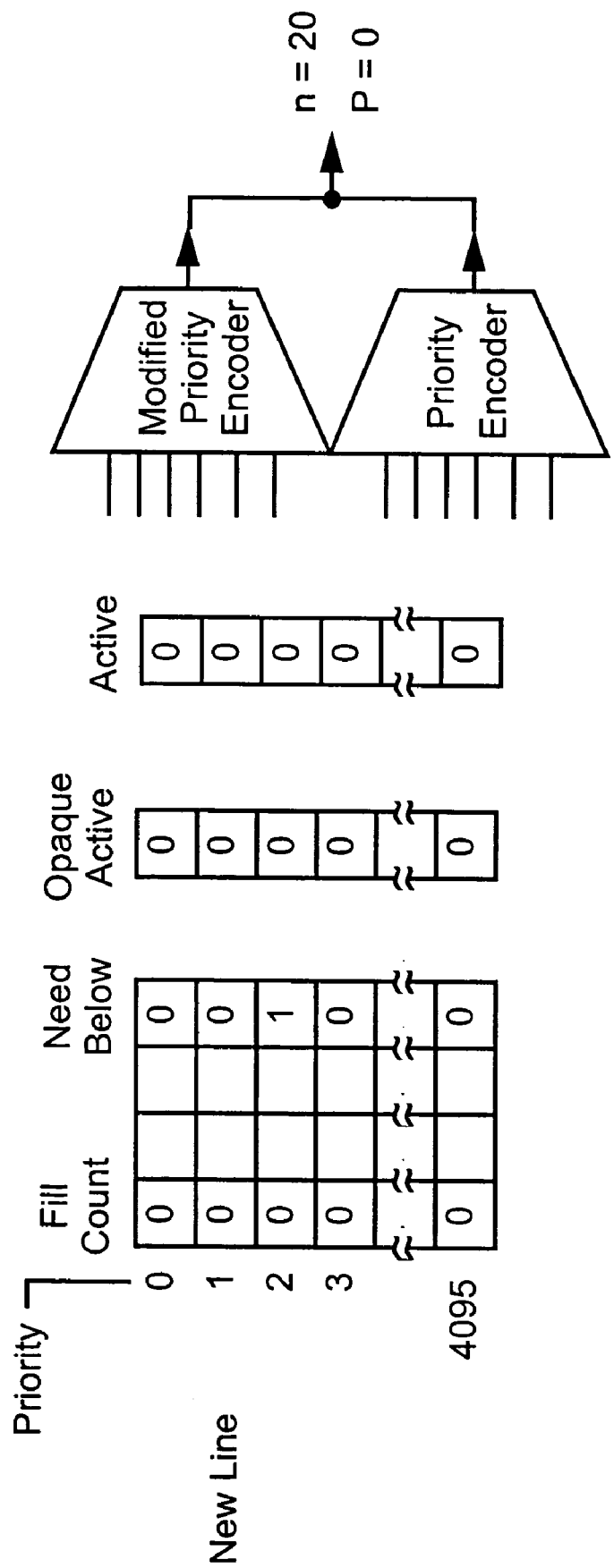

FIG. 15E shows the result when the edge crossing of FIG. 12I is received, providing for an output of P=0 for n=(180−160)=20 pixels.

As such, the priority module 500 outputs counts of pixels and corresponding priority display values for all pixels of a scanline.

3.4 Fill Color Determination Module

Figure 6:
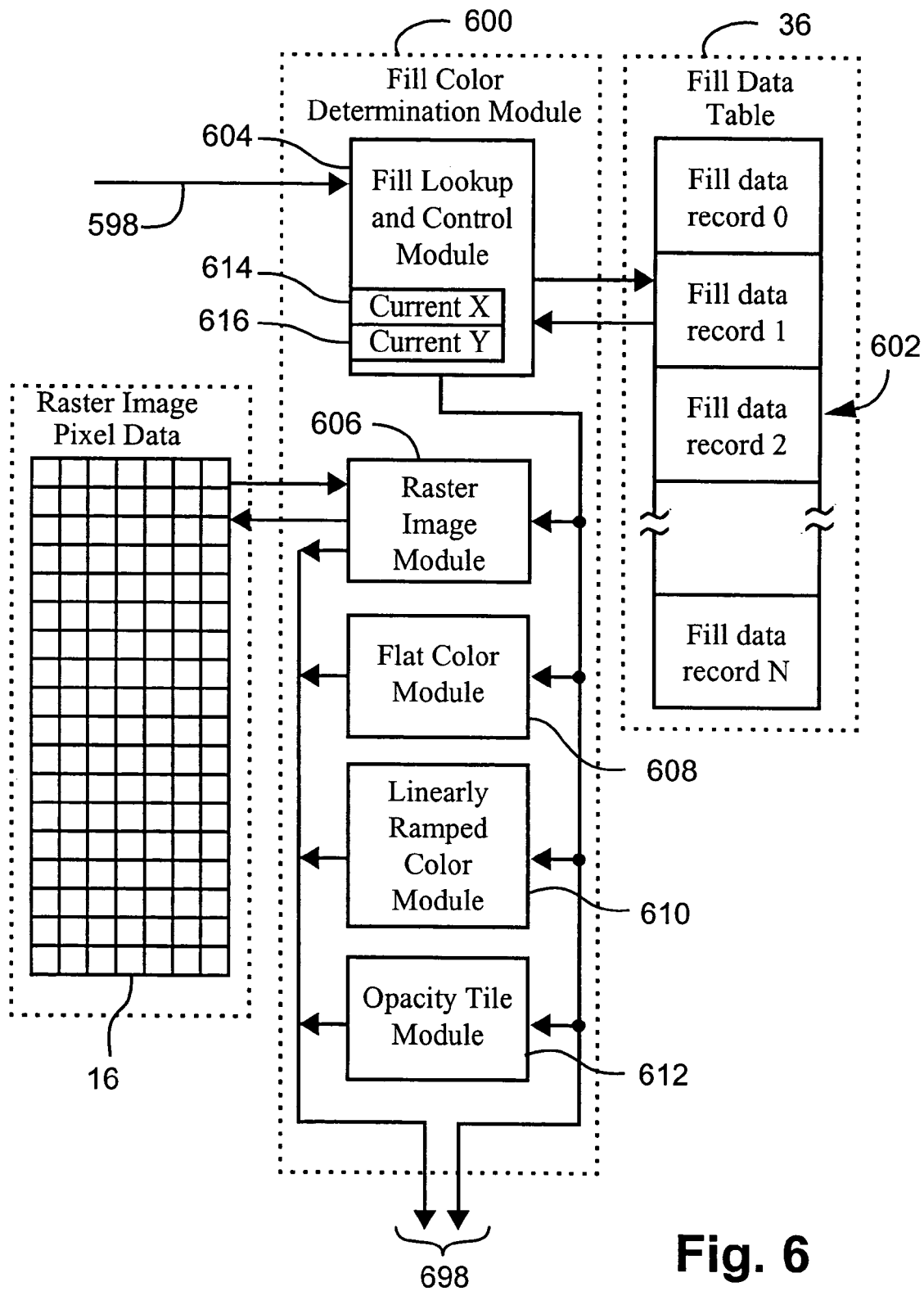
FIG. 6 is a schematic functional representation of the fill color determination module of FIG. 3.

The next module in the pipeline is the fill color determination module 600, the operation of which will now be described with reference to FIG. 6. Incoming messages 598 from the priority determination module 500, which include set fill data messages, repeat messages, fill priority messages, end of pixel messages, and end of scanline messages, first pass to a fill lookup and control module 604. The fill lookup and control module 604 maintains a current X position counter 614 and a current Y position counter 616 for use by various components of the fill color determination module 600.

Upon receipt of an end of scanline message, the fill lookup and control module 604 resets the current X counter 614 to zero and increments the current Y counter 616. The end of scanline message is then passed to the pixel compositing module 700.

Upon receipt of a set fill data message, the fill lookup and control module 604 stores the data in the specified location 602 of the fill data table 36.

Upon receipt of a repeat message, the fill lookup and control module 604 increments the current X counter 614 by the count from the repeat message. The repeat message is then passed to the pixel compositing module 700.

Upon receipt of an end of pixel message 2202, the fill lookup and control module 604 again increments the current X counter 614, and the end of pixel message is then passed to the pixel compositing module 700.

Upon receipt of a fill priority message, the fill lookup and control module 604 performs operations which include:
(i) the fill type from the fill priority message is used to select a record size in the fill data table 36;
(ii) the fill table address from the fill priority message, and the record size as determined above, is used to select a record from the fill data table 36;
(iii) the fill type from the fill priority message is used to determine and select a sub-module to perform generation of the fill color. The sub-modules may include a raster image module 606, a flat color module 608, a linearly ramped color module 610, and an opacity tile module 612;
(iv) the determined record is supplied to the selected sub-module 606-612;
(v) the selected sub-module 606-612 uses the supplied data to determine a color and opacity value;
(vi) the determined color and opacity is combined with remaining information from the fill color message, namely the raster operation code, the alpha channel operation code, the stack operation code, to form a color composite message 2208, which is sent to the pixel compositing module 700 via the connection 698.

Figure 22B:
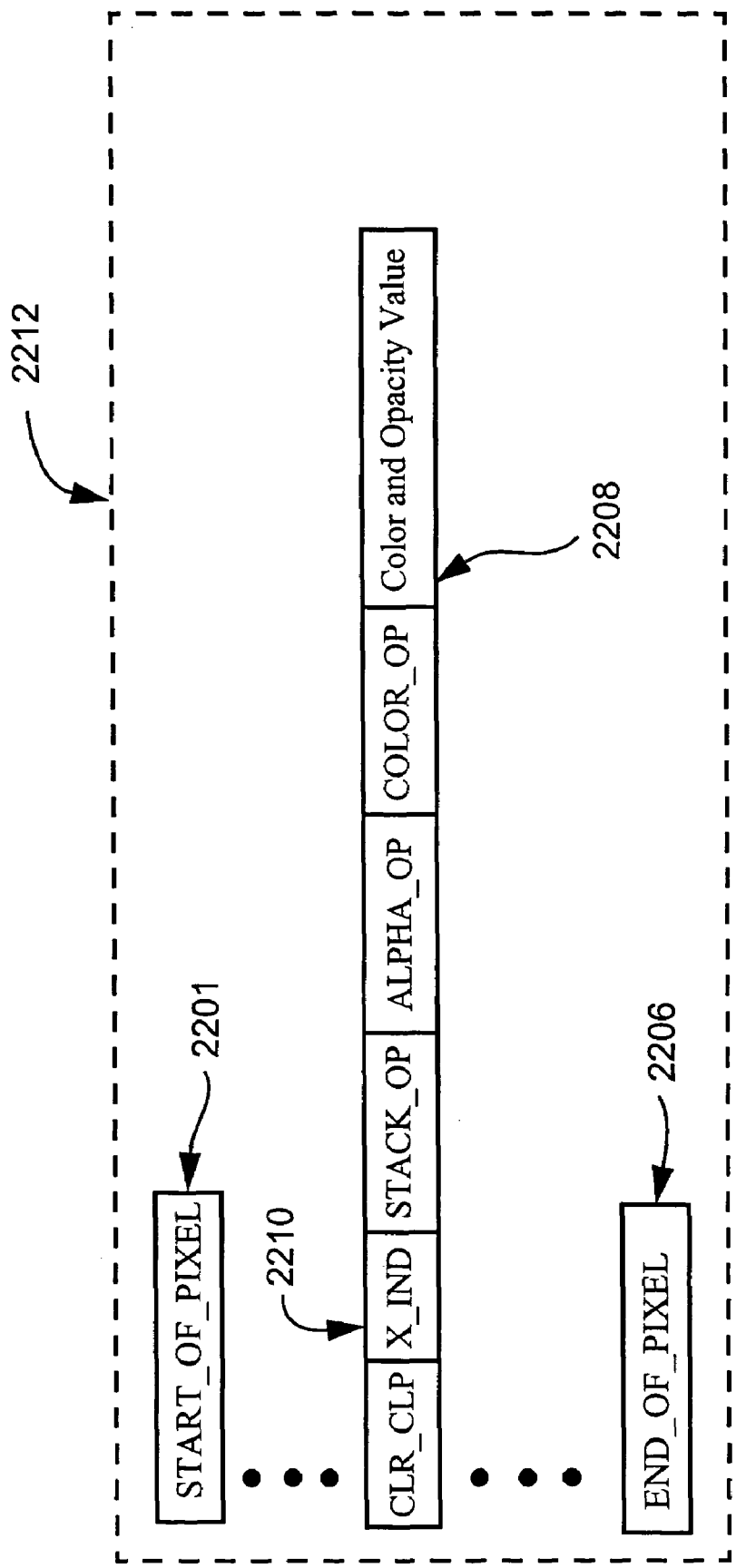
FIG. 22B shows a series of color composite messages generated by the fill color determination module.

Thus, a message sequence 2200 of FIG. 22A starting with a start of pixel message 2201 message, then fill priority messages 2202 followed by an end of pixel message 2206 is transformed into a message sequence 2212 of FIG. 22B comprising a start of pixel message 2201, color composite messages 2208 followed by an end of pixel message 2206. These color composite messages 2202 preferably includes the same fields as the fill priority messages 2202, with the following exceptions:
(i) code CLR_CMP 2210 for identifying the message as a color composite message. This CLR_CMP code also includes the index to the corresponding record in the level activation table 530;
(ii) a color and opacity field for containing the color and opacity value of the priority. The latter replaces the fill index and fill type fields of the fill priority messages; and In the preferred arrangement, the determined color and opacity is a red, green, blue and opacity quadruple with 8-bit precision in the usual manner giving 32 bits per pixel. However, a cyan, magenta, yellow and black quadruple with an implied opacity, or one of many other known color representations may alternatively be used. The red, green, blue and opacity case is used in the description below, but the description may also be applied to other cases.

The operation of the raster image module 606, the flat color module 608, the linearly ramped color module 610, and the opacity tile module 612 will now be described.

The flat color module 608 interprets the supplied record as a fixed format record containing three 8-bit color components (typically interpreted as red, green and blue components) and an 8-bit opacity value (typically interpreted as a measure of the fraction of a pixel which is covered by the specified color, where 0 means no coverage, that is complete transparency, and 255 means complete coverage, that is, completely opaque). This color and opacity value is output directly via the connection 698 and forms the determined color and opacity without further processing.

The linearly ramped color module 610 interprets the supplied record as a fixed format record containing four sets of three constants, cx, cy, and d, being associated with the three color and one opacity components. For each of these four sets, a result value r is computed by combining the three constants with the current X count, x, and the current Y count, y, using the formula:

$$r = \text{clamp }(cx^*x + cy^*y + d)$$

Where the function "clamp" is defined as:

$$\text{clamp }(x) = \begin{cases} 255 & 255 < x \\ \lfloor x \rfloor & 0 <= x <= 255 \\ 0 & x < 0 \end{cases}$$

The four results so produced are formed into a color and opacity value. This color and opacity value is output directly via the connection 698 and forms the determined color and opacity without further processing.

The opacity tile module 612 interprets the supplied record as a fixed format record containing three 8-bit color components, an 8-bit opacity value, an integer X phase, (px), a Y phase, (py), an X scale, (sx), a Y scale, (sy), and a 64 bit mask. These values originate in the display list generation and contained typically in the original page description. A bit address, a, in the bit mask, is determined by the formula:

$$a = ((x/2^{sx} + px) \bmod 8) + ((y/2^{sy} + py) \bmod 8) \times 8$$

The bit at the address "a" in the bit mask is examined. If the examined bit is one, the color and opacity from the record is copied directly to the output of the module 612 and forms the determined color and opacity. If the examined bit is zero, a color having three zero component values and a zero opacity value is formed and output as the determined color and opacity.

The raster image module 606 interprets the supplied record as a fixed format record containing six constants, a, b, c, d, tx, and ty; an integer count of the number of bits (bpl) in each raster line of the raster image pixel data 16 to be sampled; and a pixel type. The pixel type indicates whether the pixel data 16 in the raster image pixel data is to be interpreted as one of:
 (i) one bit per pixel black and white opaque pixels;
 (ii) one bit per pixel opaque black or transparent pixels;
 (iii) 8 bits per pixel grey scale opaque pixels;
 (iv) 8 bits per pixel black opacity scale pixels;
 (v) 24 bits per pixel opaque three color component pixels;, or
 (vi) 32 bits per pixel three color component plus opacity pixels.

Many other formats are possible.

The raster image module 606 uses the pixel type indicator to determine a pixel size (bpp) in bits. Then a bit address, a, in the raster image pixel data 16 is calculated having the formula:

$$a = bpp^* \lfloor a^*x + c^*y + tx \rfloor + bpl^* \lfloor b^*x + d^*y + ty \rfloor$$

A pixel interpreted according to the pixel type from the record 602 is fetched from the calculated address "a" in the raster image pixel data 16. The pixel is expanded as necessary to have three eight bit color components and an eight bit opacity component. By "expanded", it is meant for example, that a pixel from an eight bit per pixel grey scale opaque raster image would have the sampled eight bit value applied to each of the red, green and blue component, and the opacity component set to fully opaque. This then forms the determined color and opacity output 698 to the pixel compositing module 700.

As a consequence, the raster pixel data valid within a displayable object is obtained through the determination of a mapping to the pixel image data within the memory 16. This effectively implements an affine transform of the raster pixel data into the object-based image and is more efficient than prior art methods which transfer pixel data from an image source to a frame store where compositing with graphic object may occur.

As a preferred feature to the above, interpolation between pixels in the raster image pixel data 16 may optionally be performed by first calculating intermediate results p, and q according to the formulae:

$$p = a^*x + c^*y + tx$$

$$q = b^*x + d^*y + ty$$

Next the bit addresses, a00, a01, a10, and a11, of four pixels in the raster image pixel data 16 are determined according to the formulae:

$$a00 = bpp^* \lfloor p \rfloor + bpl^* \lfloor q \rfloor$$

$$a01 = a00 + bpp$$

$$a10 = a00 + bpl$$

$$a11 = a00 + bpl + bpp$$

Next, a result pixel component value, r, is determined for each color and opacity component according to the formula:

$$r = \text{interp}(\text{interp}(\text{get}(a00), \text{get}(a01), p), \text{interp}(\text{get}(a10), \text{get}(a11), p), q)$$

where the function "interp" is defined as:

$$\text{interp}(a, b, c) = a + (b-a)^*(c - \lfloor c \rfloor)$$

In the above equations, the representation $\lfloor \text{value} \rfloor = \text{floor}$ (value), where a floor operation involves discarding the fractional part of the value.

The get function returns the value of the current pixel component sampled from the raster image pixel data 16 at the given bit address. Note that for some components of some image types this can be an implied value.

As a preferred feature to the above, image tiling may optionally be performed by using x and y values in the above equations which are derived from the current X and Y counters 614,616 by a modulus operation with a tile size read from the supplied record.

Many more such fill color generation sub-modules are possible.

3.5 Pixel Compositing Module

The operation of the pixel compositing module 700 will now be described. The primary function of the pixel compositing module is to composite the color and opacity of all those exposed object priorities that make an active contribution to the pixel currently being scanned.

Figure 21:
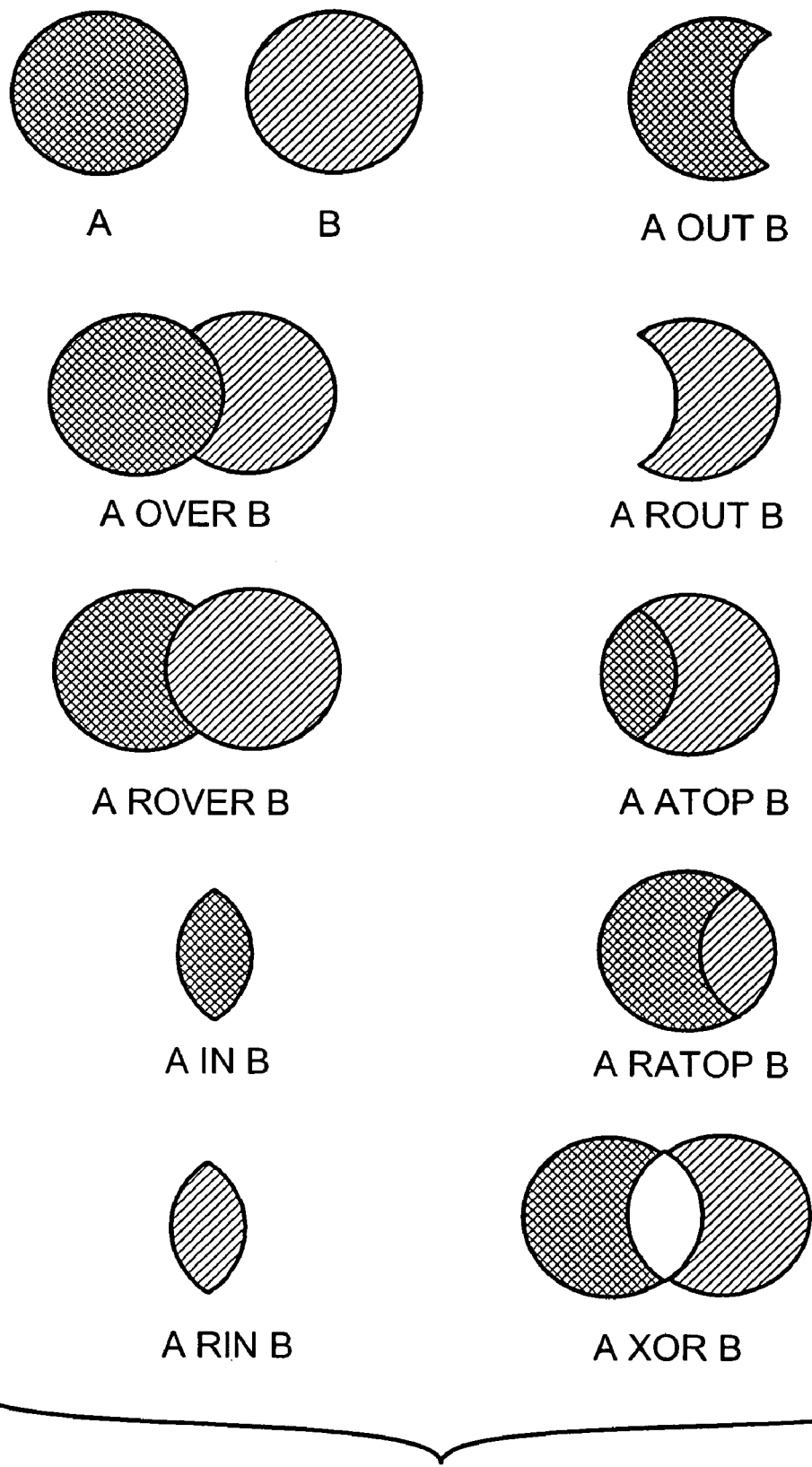
FIG. 21 shows the result of a number of compositing operations.

Preferably, the pixel compositing module 700 implements a modified form of the compositing approach as described in "Compositing Digital Images", Porter, T: Duff, T; Computer Graphics, Vol 18 No 3 (1984) pp 253-259 ("Porter And Duff"). Examples of Porter and Duff compositing operations are shown in FIG. 21. However, such an approach is deficient in that it only permits handling a source and destination color in the intersection region formed by the composite, and as a consequence is unable to accommodate the influence of transparency outside the intersecting region. The described arrangement overcomes this by effectively padding the objects with completely transparent pixels. Thus the entire area becomes in effect the intersecting region, and reliable Porter and Duff compositing operations can be performed. This padding is achieved at the driver software level where additional transparent object priorities are added to the combined table. These Porter and Duff compositing operations are implemented utilising appropriate color operations as will be described below in more detail with reference to FIGS. 20A, 20B, and 19.

Preferably, the images to be composited are based on expression trees. Expression trees are often used to describe the compositing operations required to form an image, and typically comprise a plurality of nodes including leaf nodes, unary nodes and binary nodes. A leaf node is the outermost node of an expression tree, has no descendent nodes and represents a primitive constituent of an image. Unary nodes represent an operation which modifies the pixel data coming out of the part of the tree below the unary operator. A binary node typically branches to left and right subtrees; wherein each subtree is itself is an expression tree comprising at least one leaf node. An example of an expression tree is shown in FIG. 17C. The expression tree shown in FIG. 17C comprises four leaf nodes representing three objects A, B, and C, and the page. The expression tree of FIG. 17C also comprises binary nodes representing the Porter and Duff OVER operation. Thus the expression tree represents an image where the object A is composited OVER the object B, the result of which is then composited OVER object C, and the result of which is then composited OVER the page.

Figure 17A:
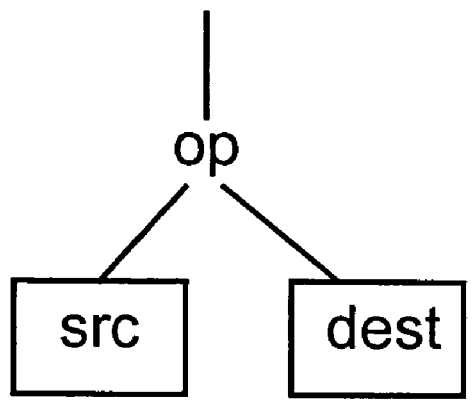
FIGS. 17A and 17B show a simple compositing expression illustrated as an expression tree and a corresponding depiction.
Figure 17B:
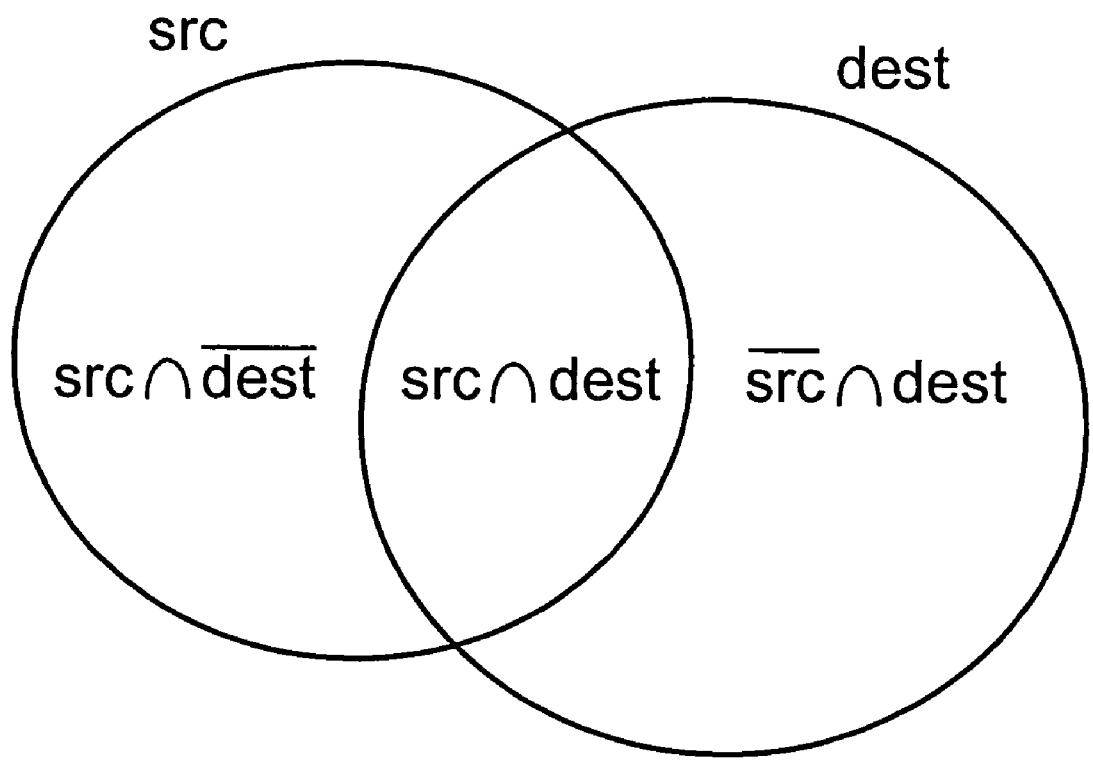
Figure 17C:
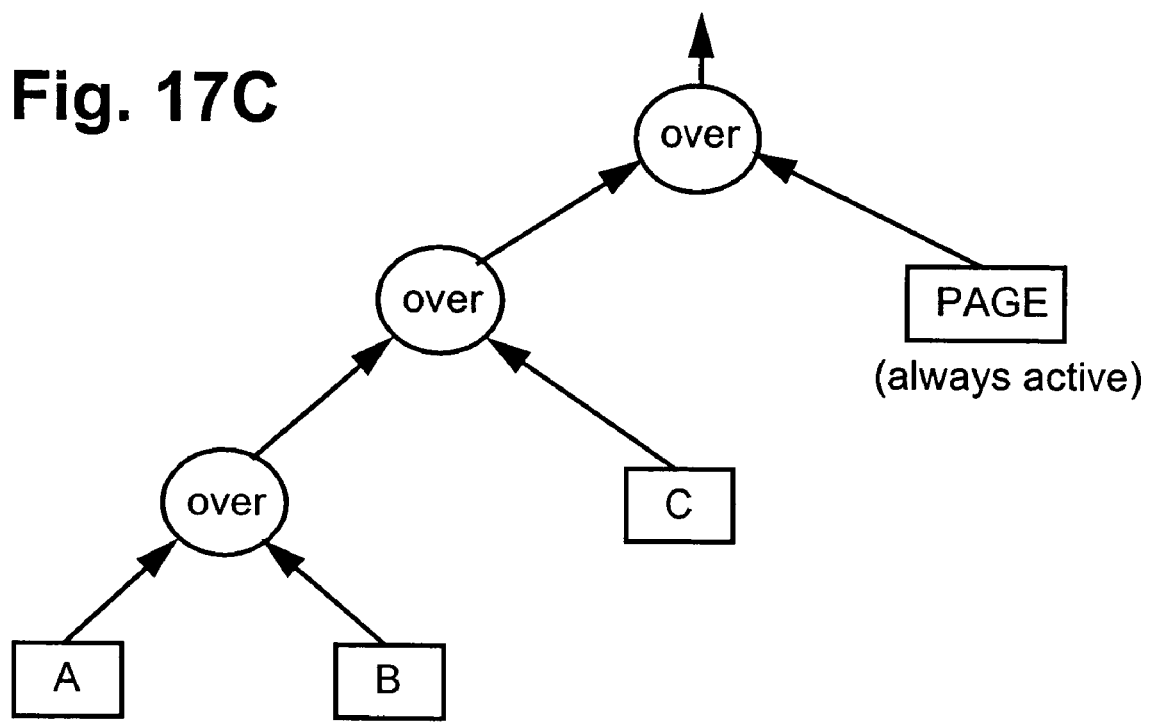
FIG. 17C shows an example of an expression tree.

Turning now to FIGS. 17A and 17B, there is shown a typical binary compositing operation in an expression tree. This binary operator operates on a source object (src) and a destination object (dest), where the source object src resides on the left branch and the destination object (dest) resides on the right branch of the expression tree. The binary operation is typically a Porter and Duff compositing operation. The area src∩dest represents the area on the page where the objects src and dest objects intersect (ie both active), the area src∩$\overline{dest}$ where only the src object is active, and the area $\overline{src}$∩dest where only the dest object is active.

The compositing operations of the expression tree are implemented by means of the pixel compositing stack 38, wherein the structure of the expression tree is implemented by means of appropriate stack operations on the pixel compositing stack 38.

Figure 23:
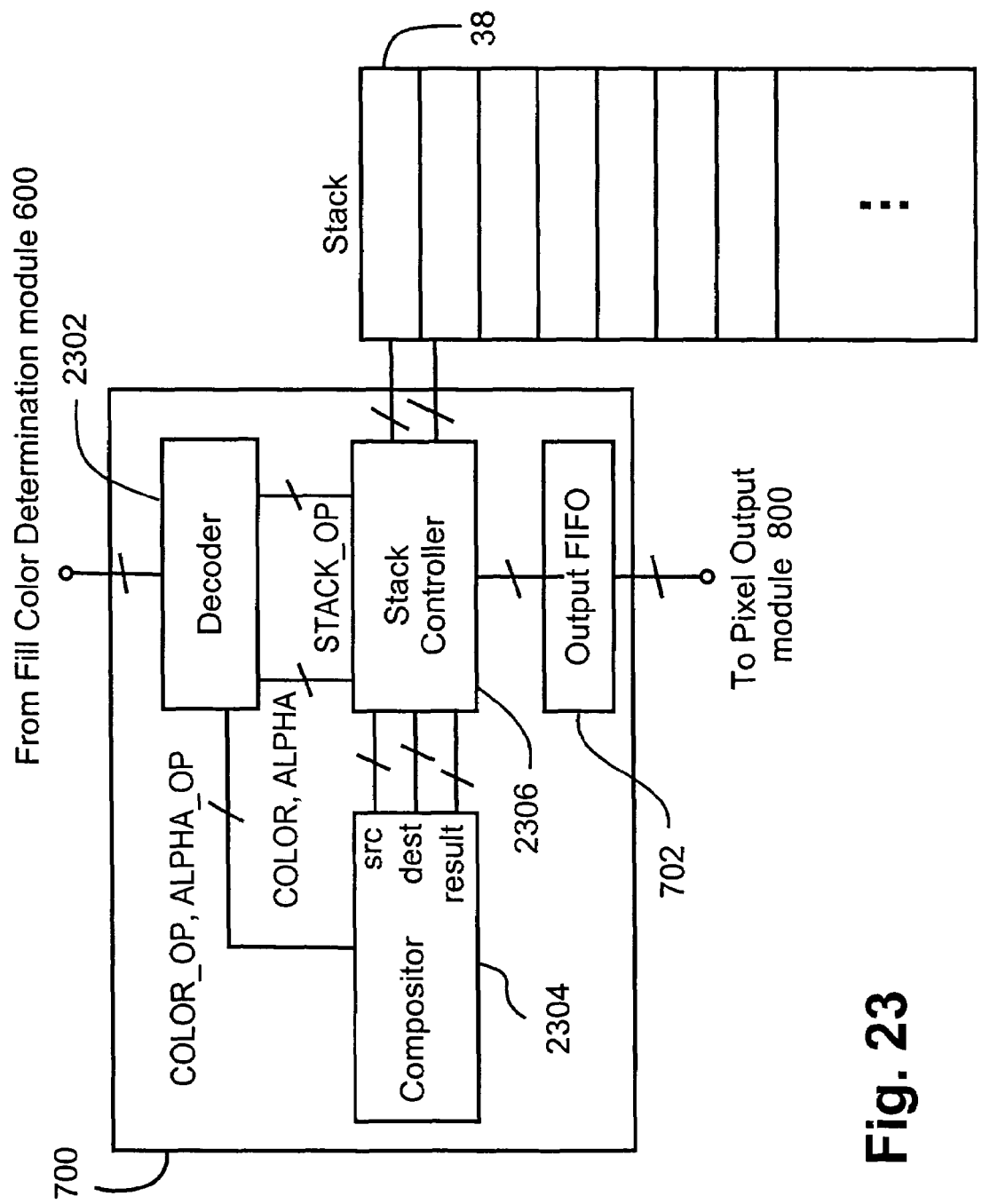
FIG. 23 is a schematic functional representation of one arrangement of the pixel compositing module of FIG. 3.

Turning now to FIG. 23, there is shown the pixel compositing module 700 in more detail. The pixel compositing module 700 receives incoming messages from the fill color determination module 600. These incoming messages include repeat messages, series of color composite messages (see FIG. 22B), end of pixel messages, and end of scanline messages, and are processed in sequence.

The pixel compositing module 700 includes a decoder 2302 for decoding these incoming messages, and a compositor 2303 for compositing the colors and opacities contained in the incoming color composite messages. Also included is a stack controller 2306 for placing the resultant colors and opacities on a stack 38, and an output FIFO 702 for storing the resultant color and opacity.

During the operation of the pixel compositing module 700, the decoder 2302, upon the receipt of a color composite message, extracts the raster operation COLOR_OP and alpha channel operation codes ALPHA_OP and passes them to the compositor 2304. The decoder 2302 also extracts the stack operation STACK_OP and color and opacity values COLOR, ALPHA of the color composite message and passes them to the stack controller 2306. Typically, the pixel composing module 700 combines the color and opacity from the color composite message with a color and opacity popped from the pixel compositing stack 38 according to the raster operation and alpha channel operation from the color composite message. It then pushes the result back onto the pixel compositing stack 38. More generally, the stack controller 2306 forms a source (src) and destination (dest) color and opacity, according to the stack operation specified. If at this time, or during any pop operation from the pixel compositing stack, the pixel compositing stack 38 is found to be empty, an opaque white color value is used without any error indication. These source and destination colors and opacity are then made available to the compositor 2304 which then performs the compositing operation in accordance with the COLOR_OP and ALPHA_OP codes. The resultant (result) color and opacity is then made available to the stack controller 2306, which stores the result on the stack 38 in accordance with the STACK_OP code. These stack operations are described below in more detail below.

During the operation of the pixel compositing module 700, if the decoder 2302 receives an end of pixel message, it then instructs the stack controller 2306 to pop a color and opacity from the pixel compositing stack 38. If the stack 38 is empty an opaque white value is used. The resultant color and opacity is then formed into an pixel output message which is forwarded to the pixel output FIFO 702. If the decoder 2302 receives a repeat message or an end of scanline message, the decoder 2302 by-passes (not shown) the compositor 2304 and stack controller 2306 and forwards the messages to the pixel output FIFO 702 without further processing.

Figure 24A:
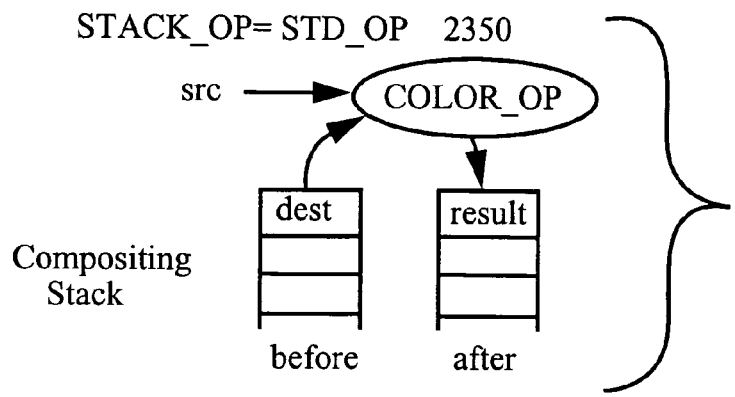
FIGS. 24A-24D show the operation performed on the stack for each of the various stack operation commands in the Pixel Compositing Module of FIG. 3.

FIGS. 24A, B, C, and D show the operation performed on the pixel compositing stack 38 for each of the various stack operation commands STACK_OP in the color composite messages.

FIG. 24A shows the standard operation STD_OP 2350 on the pixel compositing stack 38, where the source color and opacity (src) are obtained from the color composite message, and the destination color and opacity (dest) is popped from the top of the pixel compositing stack 38. The source color and opacity (src) is taken from the value in a current color composite message for the current operation, and destination color and opacity (dest) is popped from the top of the stack 38. The result of the COLOR_OP operation performed by the compositor 2304 is pushed back onto the stack 38.

Figure 24B:
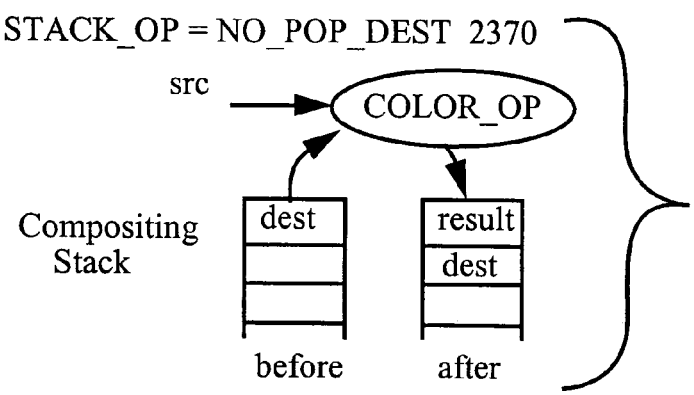

FIG. 24B shows the NO_POP_DEST stack operation 2370 on the pixel compositing stack 38. The source color and opacity (src) is taken from the value in a current composite message for the current operation, and the destination color and opacity (dest) is read from the top of the stack 38. The result of the COLOR_OP operation performed by the compositor 2304 is pushed onto the top of the stack 38.

Figure 24C:
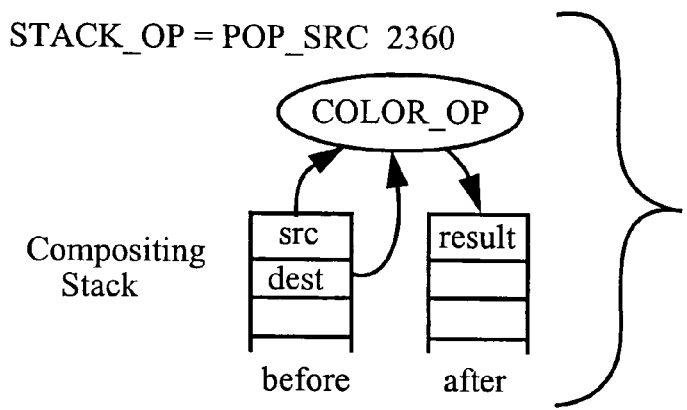

FIG. 24C shows the POP_SRC stack operation, where the source color and opacity are popped from the top of the stack, and the destination color and opacity is popped from the next level down the stack. The result of the COLOR_OP operation performed by the compositor 2304 is pushed onto the top of the stack.

Figure 24D:
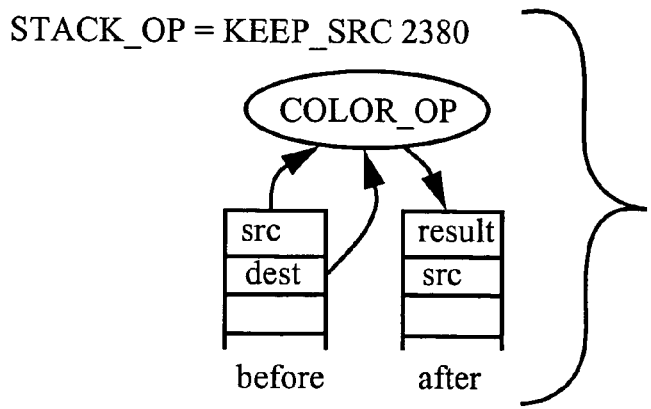

FIG. 24D shows the KEEP_SRC stack operation, where the source color and opacity are popped from the top of the stack, and the destination color and opacity is popped from the next level down the stack. The result of the COLOR_OP operation performed by the compositor 2304 is pushed onto the top of the stack.

Other stack operations can be used.

Figure 7A:
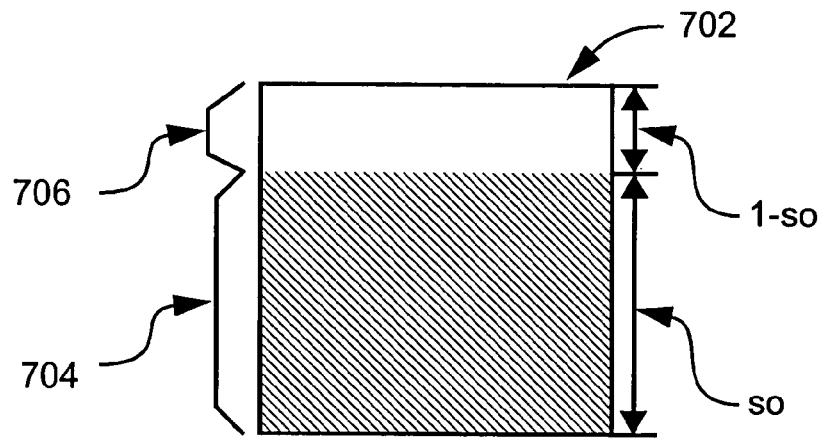
FIGS. 7A to 7C show pixel combinations between source and destination.
Figure 7B:
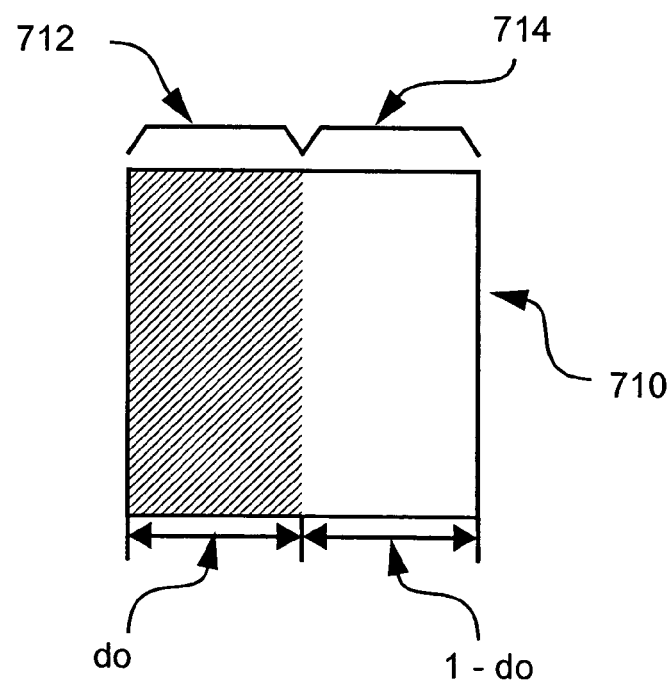
Figure 7C:
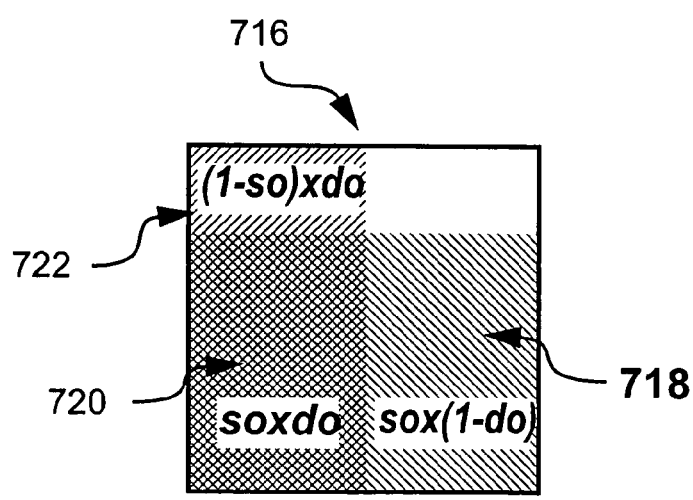

The manner in which the compositor 2304 combines the source (src) color and opacity with the destination (dest) color and opacity will now be described with reference to FIGS. 7A to 7C. For the purposes of this description,. color and opacity values are considered to range from 0 to 1, (ie: normalised) although they are typically stored as 8-bit values in the range 0 to 255. For the purposes of compositing together two pixels, each pixel is regarded as being divided into two regions, one region being fully opaque and the other fully transparent, with the opacity value being an indication of the proportion of these two regions. FIG. 7A shows a source pixel 702 which has some three component color value not shown in the Figure and an opacity value, (so). The shaded region of the source pixel 702 represents the fully opaque portion 704 of the pixel 702. Similarly, the non-shaded region in FIG. 7A represents that proportion 706 of the source pixel 702 considered to be fully transparent. FIG. 7B shows a destination pixel 710 with some opacity value, (do). The shaded region of the destination pixel 710 represents the fully opaque portion 712 of the pixel 710. Similarly, the pixel 710 has a fully transparent portion 714. The opaque regions of the source pixel 702 and destination pixel 710 are, for the purposes of the combination, considered to be orthogonal to each other. The overlay 716 of these two pixels is shown in FIG. 7C. Three regions of interest exist, which include a source outside destination 718 which has an area of so*(1−do), a source intersect destination 720 which has an area of so*do, and a destination outside source 722 which has an area of (1−so)*do. The color value of each of these three regions is calculated conceptually independently. The source outside destination region 718 takes its color directly from the source color. The destination outside source region 722 takes its color directly from the destination color. The source intersect destination region 720 takes its color from a combination of the source and destination color.

The process of combining the source and destination color, as distinct from the other operations discussed above is termed a raster operation and is one of a set of functions as specified by the raster operation code from the pixel composite message. Some of the raster operations included in the described arrangement are shown in FIG. 19. Each function is applied to each pair of color components of the source and destination colors to obtain a like component in the resultant color. Many other functions are possible.

The alpha channel operation from the composite pixel message is also considered during the combination of the source and destination color. The alpha channel operation is performed using three flags LAO_USE_D_OUT_S, LAO_USE_S_OUT_D, LAO_USE_S_ROP_D, which respectively identify the regions of interest (1−so)*do, so*(1−do), and so*do in the overlay 716 of the source pixel 702 and the destination pixel 710. For each of the regions, a region opacity value is formed which is zero if the corresponding flag in the alpha channel operation is not set, else it is the area of the region.

The resultant opacity is formed from the sum of the region opacities. Each component of the result color is then formed by the sum of the products of each pair of region color and region opacity, divided by the resultant opacity.

As shown in FIG. 20, the Porter and Duff operations may be formed by suitable ALPHA_OP flag combinations and raster operators COLOR_OP, provided that both operands can be guaranteed to be active together. Because of the way the table is read, if only one of the operands is not active, then the operator will either not be performed, or will be performed with the wrong operand. Thus objects that are to be combined using Porter and Duff operations must be padded out with transparent pixels to an area that covers both objects in the operation. Other transparency operations may be formed in the same way as the Porter and Duff operations, using different binary operators as the COLOR_OP operation.

The resultant color and opacity is passed to the stack controller circuit and pushed onto the pixel compositing stack 38. However, if the stack operation is STACK_KEEP_SRC, the source value is pushed onto the stack before the result of the color composite message is pushed.

When an end of pixel message is encountered, the color and opacity value on top of the stack is formed into a pixel output message, and sent to the pixel output module 800. Repeat pixel messages are passed through the pixel compositing module 700 to the pixel output module 800.

3.6 Pixel Output Module

The operation of the pixel output module 800 will now be described. Incoming messages are read from the pixel output FIFO, which include pixel output messages, repeat messages, and end of scanline messages are processed in sequence.

Upon receipt of a pixel output message the pixel output module 800 stores the pixel and also forwards the pixel to its output. Upon receipt of a repeat message the last stored pixel is forwarded to the output 898 as many times as specified by the count from the repeat message. Upon receipt of an end of scanline message the pixel output module 800 passes the message to its output.

The output 898 may connect as required to any device that utilizes pixel image data. Such devices include output devices such as video display units or printers, or memory storage devices such as hard disk, semiconductor RAM including line, band or frame stores, or a computer network. However, as will be apparent from the foregoing, a method and apparatus are described that provide for the rendering of graphic objects with full functionality demanded by sophisticated graphic description languages without a need for intermediate storage of pixel image data during the rendering process.

It should be apparent to the person skilled in the art that any of these modules may be used in a software implementation of a pixel-sequential renderer, without departing from the principles of this invention.

The aforementioned preferred processes implemented by the computer system 1 comprise a particular control flow. There are many other variants of the preferred processes, which use different control flows without departing from the spirit or scope of the invention. Furthermore one or more of the steps of the preferred method(s) may be performed in parallel rather than sequentially.

INDUSTRIAL APPLICABILITY

It is apparent from the above that the arrangements described are applicable to computer graphics and printing industries.

The foregoing describes only some arrangements of the present invention, and modifications and/or changes can be made thereto without departing from the scope and spirit of the invention, the arrangements being illustrative and not restrictive.

The claims defining the invention are as follows:

1. A method of rendering a graphic object by a computer that uses a coordinate of an edge crossing of a scan line with at least one edge of the graphic object, said method comprising the steps of:
   providing a first point and a second point on the edge of the graphic object;
   determining an integer part and a fractional part of a ratio of a horizontal difference between the first point and the second point of the edge to a vertical difference between the first point and the second point of the edge;
   utilizing the fractional part of the ratio to determine a fractional part of the coordinate at an intermediate scan line between the first point and the second point, wherein a rounded version of the coordinate at the intermediate scan line is determined according to a rounding rule utilizing integer arithmetic excluding integer division;
   utilizing at least the integer part of the ratio to determine an integer part of the coordinate at the intermediate scan line; and
   storing the integer part and the fractional part of the coordinate of the edge crossing in an edge record configured within a computer memory associated with the computer, wherein the integer part and the fractional part of the coordinate stored in the edge record are used by the computer to render the graphic object,
   wherein the rounded version of said coordinate is determined based on (a) an accumulated fractional part of said coordinate and (b) a predetermined value dependent on said rounding rule.

2. A method according to claim 1, wherein the rounded version Xi of the coordinate at the intermediate scan line, n, is determined utilizing the following steps:
   IF $Da(n)>0$ OR $Da(n)>=0$ AND $E>=0$ THEN
      $Xi(n)=Xa(n)$
   ELSE
      $Xi(n)=Xa(n)-1$
   ENDELSE,
   wherein $Xa(n)=Xa(n-1)+Di$ is an accumulated integer part of the coordinate, Di being the integer part of the ratio, and $Da(n)=Da(n-1)+Df$ is an accumulated fractional part of the coordinate, Df being the fractional part of the ratio, and E is a predetermined value dependent on the rounding rule, and wherein $n>=0$.

3. A method according to claim 2, wherein the rounding rule is a Flooring rule and wherein
   $Xoi=INT(Edge.X0/2^4)$;
   $Xof=Edge.X0\% 2^4$;
   $Xa=Xoi$;
   $E=(Xof*Dy-Edge.Offset*Dx)\% 2^4$; and
   $Da=INT((Xof*Dy-Edge.Offset*Dx)/2^4)$,
   where Edge.X0 is the horizontal coordinate of the first point, Dx is the horizontal difference between the first point and the second point, Dy is the vertical difference between the first point and the second point, and Edge.Offset is the difference between the vertical coordinate of the first point and an integer value of the vertical coordinate.

4. A method according to claim 2, wherein the rounding rule is a Ceiling rule and wherein
   $Xoi=INT(Edge.X0/2^4)$;
   $Xof=Edge.X0\% 2^4$;
   $Xa=Xoi+1$;
   $E=(Xof*Dy-Edge.Offset*Dx-1) \% 2^4$; and
   $Da=INT((Xof*Dy-Edge.Offset*Dx-1)/2^4)$,
   where Edge.X0 is the horizontal coordinate of the first point, Dx is the horizontal difference between the first point and the second point, Dy is the vertical difference between the first point and the second point, and Edge.Offset is the difference between the vertical coordinate of the first point and an integer value of the vertical coordinate.

5. A method according to claim 2, wherein the rounding rule is a Rounding rule and wherein
   $Xoi=INT(Edge.X0/2^4)$;
   $Xof=Edge.X0\% 2^4$;
   $Xa=Xoi$;
   $E=(Xof*Dy-Edge.Offset*Dx+8*Dy) \% 2^4$; and
   $Da=INT((Xof*Dy-Edge.Offset*Dx+8*Dy)/2^4)$,
   where Edge.XO is the horizontal coordinate of the first point, Dx is the horizontal difference between the first point and the second point, Dy is the vertical difference between the first point and the second point, and Edge.Offset is the difference between the vertical coordinate of the first point and an integer value of the vertical coordinate.

6. A method according to any of claims 3, 4, or 5, wherein
   $Xa(0)=Xa+INT(Da/Dy)$, and
   $Da(0)=Da \% Dy$.

7. A method according to claim 2, wherein
   IF $Da(n)<-Dy$ THEN
      $Da(n)=Da(n)+Dy$
      $Xa(n)=Xa(n)-1$
   ELSE IF $Da(n)>Dy$ THEN
      $Da(n)=Da(n)-Dy$
      $Xa(n)=Xa(n)+1$
   ENDELSE,
   where Dy is the vertical difference between the first point and the second point and wherein $n>=1$.

8. An apparatus for rendering a graphic object using a coordinate of an edge crossing of a scan line with at least one edge of the graphic object, said apparatus comprising:
   first point determining means for providing a first point and a second point on the edge of the graphic object;
   slope determining means for determining an integer part and a fractional part of a ratio of a horizontal difference between the first point and the second point of the edge to a vertical difference between the first point and the second point of the edge;
   fractional part determining means for utilizing the fractional part of the ratio to determine a fractional part of the coordinate at an intermediate scan line between the first point and the second point, wherein a rounded version of the coordinate at the intermediate scan line is determined according to a rounding rule utilizing integer arithmetic excluding integer division;
   integer part determining means for utilizing at least the integer part of the ratio to determine an integer part of the coordinate at the intermediate scan line; and
   storing means for storing the integer part and the fractional part of the coordinate of the edge crossing in an edge record, wherein the integer part and the fractional part of the coordinate stored in the edge record in use to render the graphic object, wherein the rounded version of said coordinate is determined based on (a) an accumulated fractional part of said coordinate and (b) a predetermined value dependent on said rounding rule.

9. A computer readable medium, having a computer program recorded thereon, where the program is configured to make a computer execute a procedure to render a graphic object, using a coordinate of an edge crossing of a scan line with at least one edge of the graphic object, said program comprising:

code for providing a first point and a second point on the edge of the graphic object;

code for determining an integer part and a fractional part of a ratio of a horizontal difference between the first point and the second point of the edge to a vertical difference between the first point and the second point of the edge;

code for utilizing the fractional part of the ratio to determine a fractional part of the coordinate at an intermediate scan line between the first point and the second point, wherein a rounded version of the coordinate at the intermediate scan line is determined according to a rounding rule utilizing integer arithmetic excluding integer division;

code for utilizing at least the integer part of the ratio to determine an integer part of the coordinate at the intermediate scan line; and code for storing the integer part and the fractional part of the coordinate of the edge crossing in an edge record, wherein the integer part and the fractional part of the coordinate stored in the edge record are used to render the graphic object, wherein the rounded version of said coordinate is determined based on (a) an accumulated fractional part of said coordinate and (b) a predetermined value dependent on said rounding rule.

* * * * *